US007267518B2

(12) United States Patent
Kinzer

(10) Patent No.: US 7,267,518 B2
(45) Date of Patent: Sep. 11, 2007

(54) GUIDE APPARATUS AND METHOD FOR CONVEYOR(S)

(76) Inventor: Dwight Eric Kinzer, 413 29th Ave. N., Fargo, ND (US) 58102-1508

(*) Notice: Subject to any disclaimer, the term of this patent is extended or adjusted under 35 U.S.C. 154(b) by 0 days.

(21) Appl. No.: 11/527,354

(22) Filed: Sep. 25, 2006

(65) Prior Publication Data
US 2007/0031221 A1 Feb. 8, 2007

Related U.S. Application Data

(60) Division of application No. 11/190,362, filed on Jul. 27, 2005, now Pat. No. 7,125,215, which is a continuation-in-part of application No. 10/771,807, filed on Feb. 3, 2004, now Pat. No. 7,074,001.

(60) Provisional application No. 60/445,760, filed on Feb. 5, 2003.

(51) Int. Cl.
*B65G 65/00* (2006.01)
(52) U.S. Cl. ................. 414/272; 414/283; 198/588; 198/861.6
(58) Field of Classification Search ......... 414/272, 414/283; 198/587, 588, 861.6
See application file for complete search history.

(56) References Cited

U.S. PATENT DOCUMENTS 2,721,665 A * 10/1955 Goeke ............... 198/861.6
3,197,044 A * 7/1965 Hozak ................ 414/268

(Continued)

FOREIGN PATENT DOCUMENTS

DE 270042 B1 10/1912

GB 752 816 A 7/1956

OTHER PUBLICATIONS

Kinzer, D. Feb. 5, 2003. PPA: "Polygonal Storage Silo(s) and Process Tower". 78 Pages, U.S. Appl. No. 60/445,760.
Kinzer, D. 2003. "Five case studies: A cost comparision of silos—hexagon, round, and square." 21 pages. Copyright Process Equipment & Design LLC.

*Primary Examiner*—Joe Dillon, Jr.

(57) ABSTRACT

An guide apparatus and method for collecting and moving material into or away from a selected bin (30a, 30b, 30c) that resides within an array of storage bins. The guide apparatus comprises three or more trolleys (90, 91, 92, 93, 94, 95a, 95b, 96, 97, 98, 99, 100, 101, 102, 103, 104, 105, 106, 107, 108) that move along at least one track (79, 80, 81, 82, 83, 84, 86a, 86b, 86c, 86d, 86e, 86f, 87a, 87b, 88a, 88b, 89) to create a guide assembly for a conveyor (60) or conveyor groups (67, 68, 69, 70). By moving the trolleys (90, 91, 92, 93, 94, 95a, 95b, 96, 97, 98, 99, 100, 101, 102, 103, 104, 105, 106, 107, 108) along the track (79, 80, 81, 82, 83, 84, 86a, 86b, 86c, 86d, 86e, 86f, 87a, 87b, 88a, 88b, 89), or track (79, 80, 81, 82, 83, 84, 86a, 86b, 86c, 86d, 86e, 86f, 87a, 87b, 88a, 88b, 89) along the trolleys (90, 91, 92, 93, 94, 95a, 95b, 96, 97, 98, 99, 100, 101, 102, 103, 104, 105, 106, 107, 108), the conveyor (60) or conveyor groups (67, 68, 69, 70) can distribute material to or reclaim material from a selected storage bin (30a, 30b, 30c) using minimal amount of linear meters of conveyance (60). The guide apparatus and method can have multiple layers of guide assemblies (110, 112, 114, 120, 122, 124, 126, 128, 130, 132, 134, 136, 138, 140, 142, 144, 146, 148, 150, 152, 154, 156, 158, 160, 162) to guide conveyor (60) or conveyor groups (67, 68, 69, 70). The guide apparatus and method can have the guide assemblies (110, 112, 114, 120, 122, 124, 126, 128, 130, 132, 134, 136, 138, 140, 142, 144, 146, 148, 150, 152, 154, 156, 158, 160, 162) combined in a wide variety of configurations that best suits a particular application.

6 Claims, 21 Drawing Sheets

U.S. PATENT DOCUMENTS

| | | | |
|---|---|---|---|
| 3,435,967 A | * | 4/1969 | Sackett, Sr. .................. 414/295 |
| 4,330,232 A | * | 5/1982 | McClaren .................... 198/306 |
| 4,491,216 A | * | 1/1985 | Sawby ..................... 198/861.4 |
| 4,619,576 A | * | 10/1986 | George et al. .............. 414/300 |
| 4,813,526 A | * | 3/1989 | Belanger .................... 198/313 |
| 6,676,357 B2 | * | 1/2004 | Stafford et al. ............. 414/306 |
| 2003/0113194 A1 | | 6/2003 | Stafford |
| 2004/0154901 A1 | | 8/2004 | Kinzer |
| 2005/0258015 A1 | | 11/2005 | Kinzer |

* cited by examiner

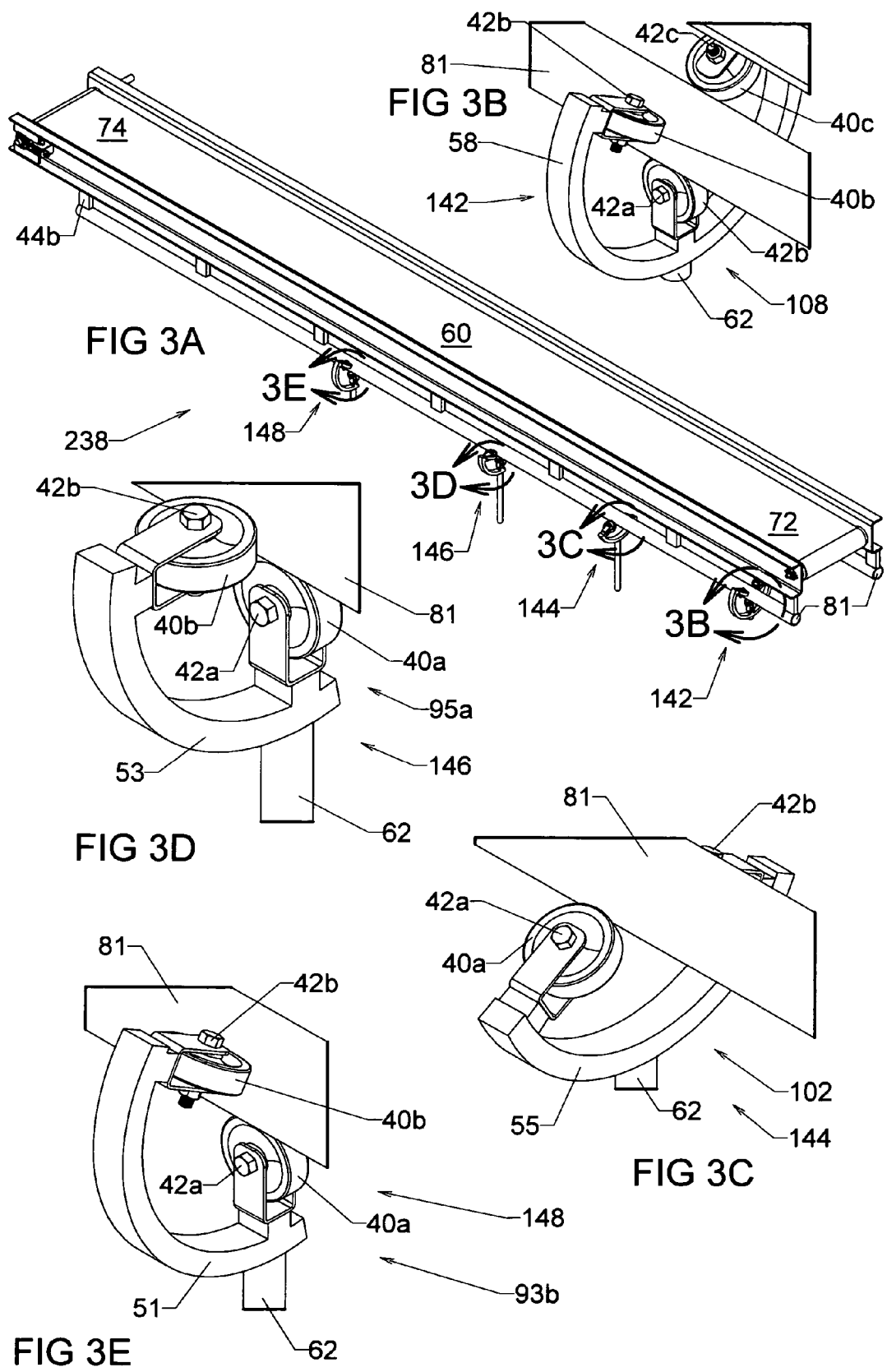

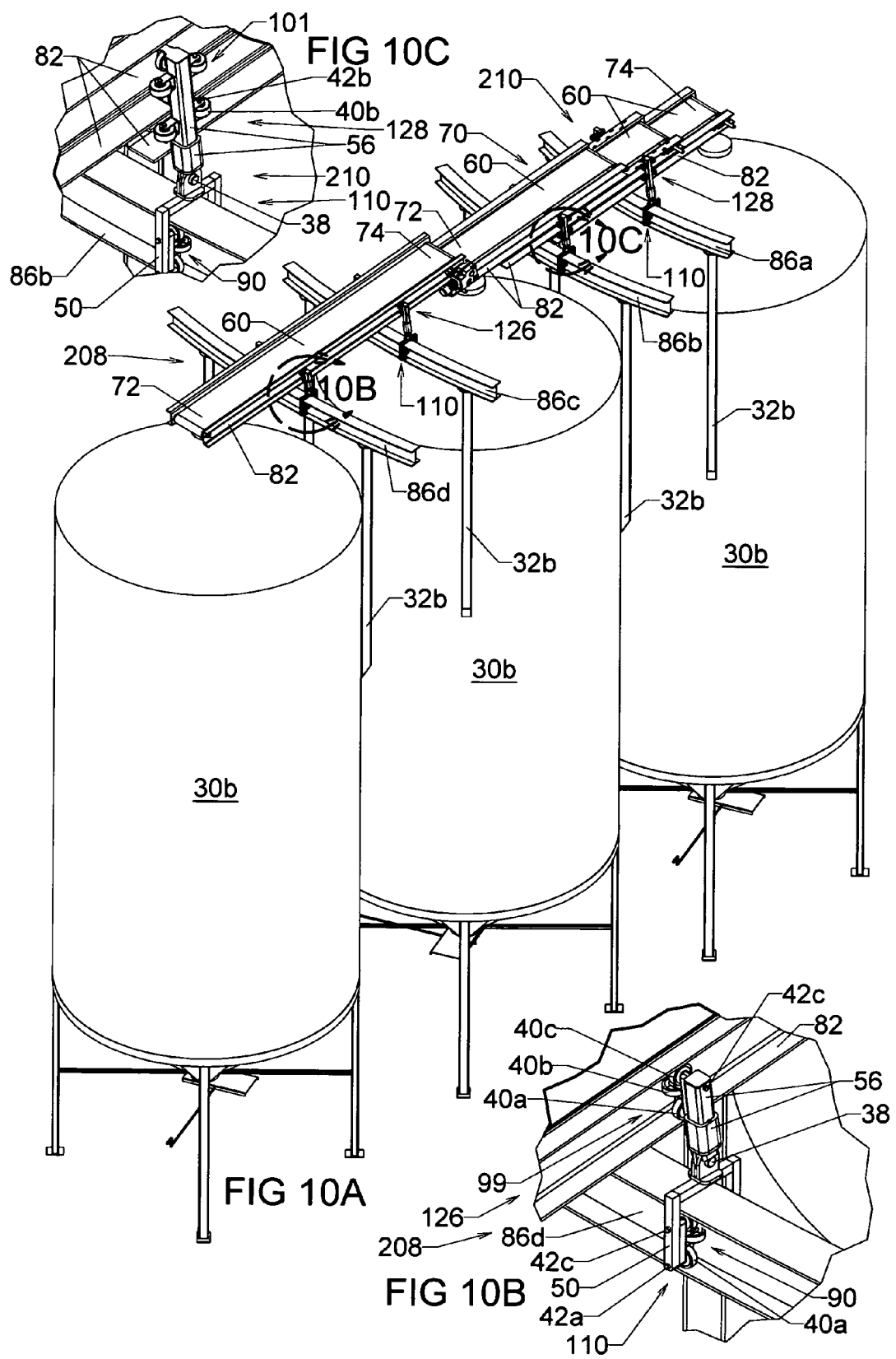

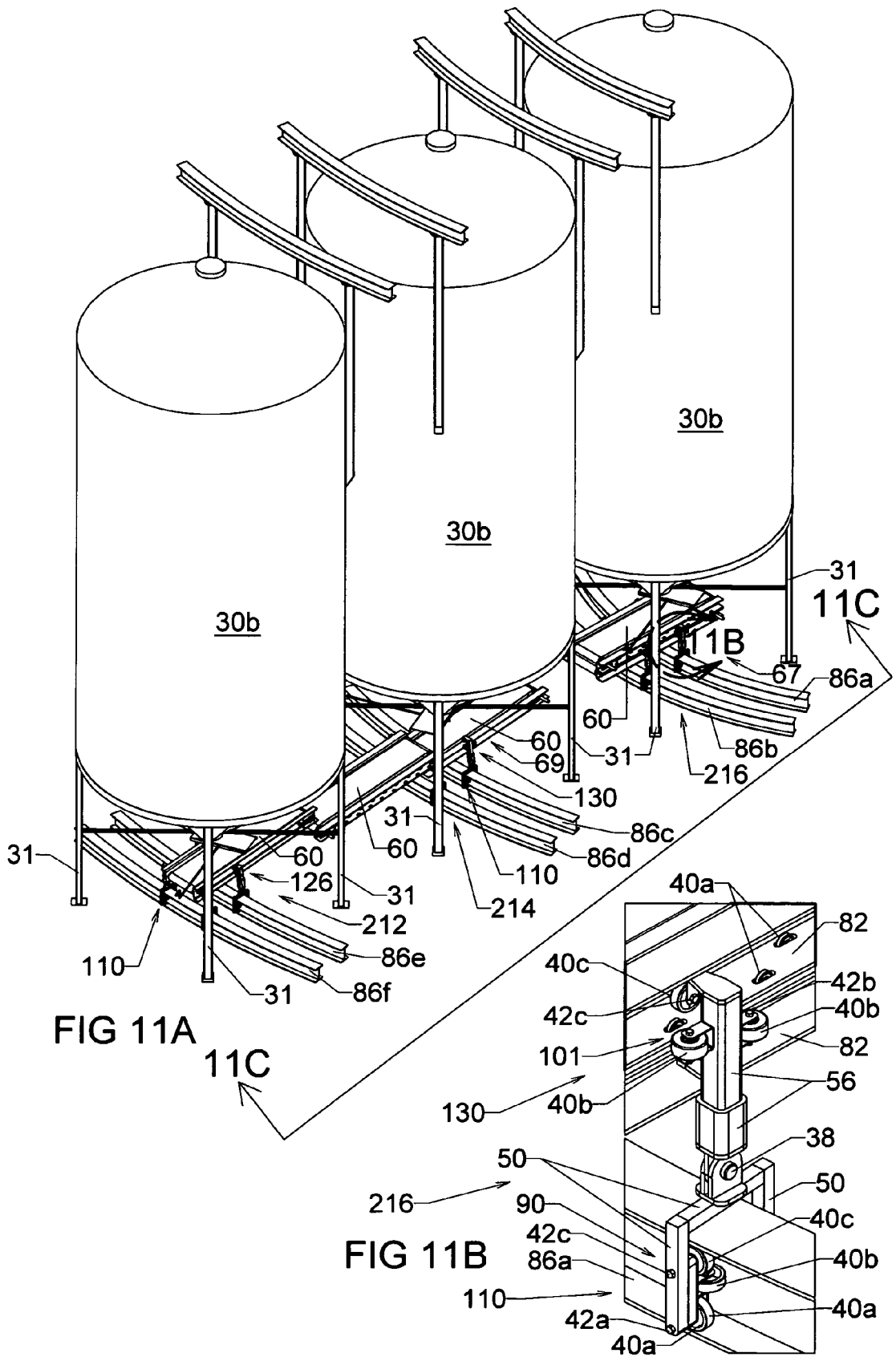

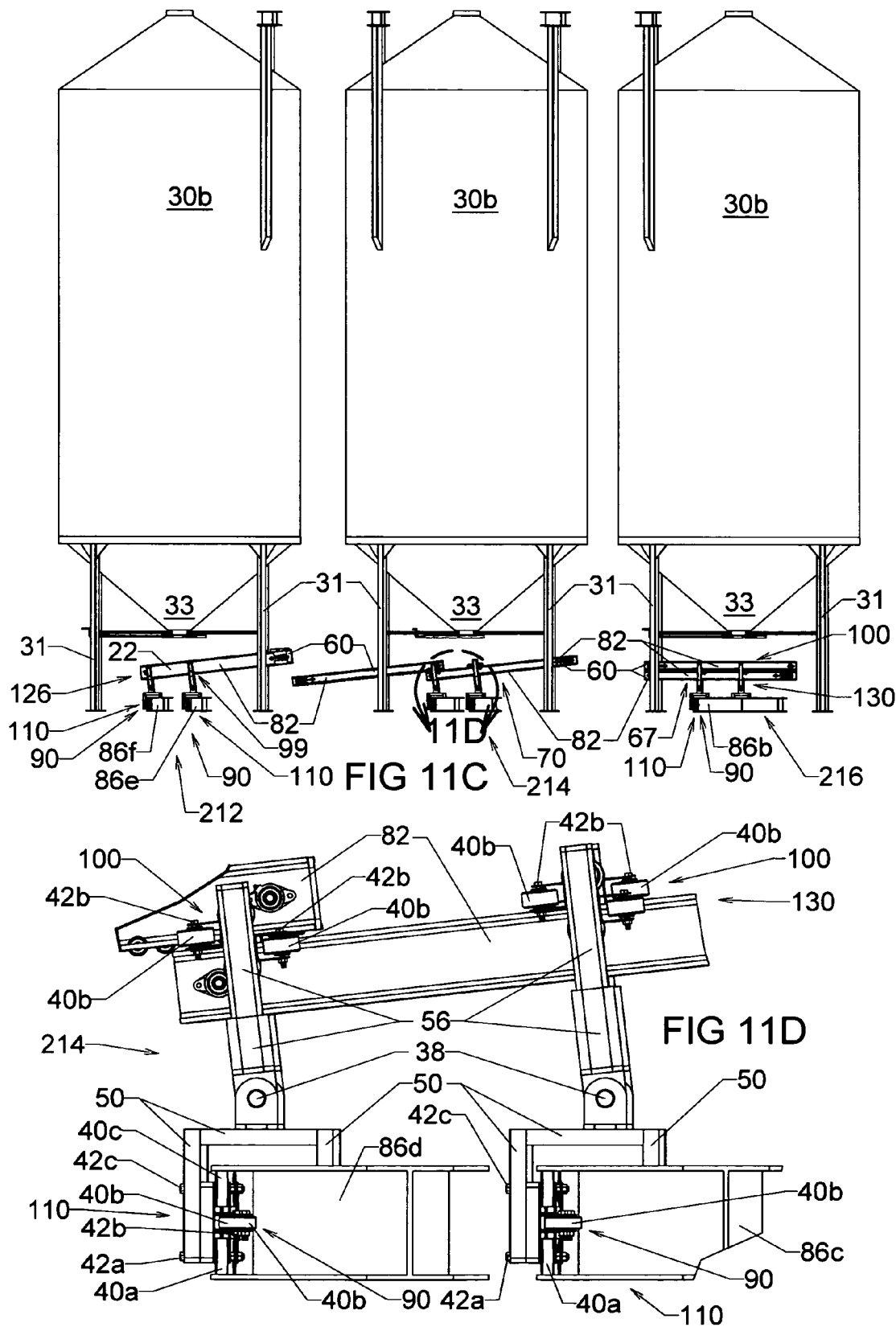

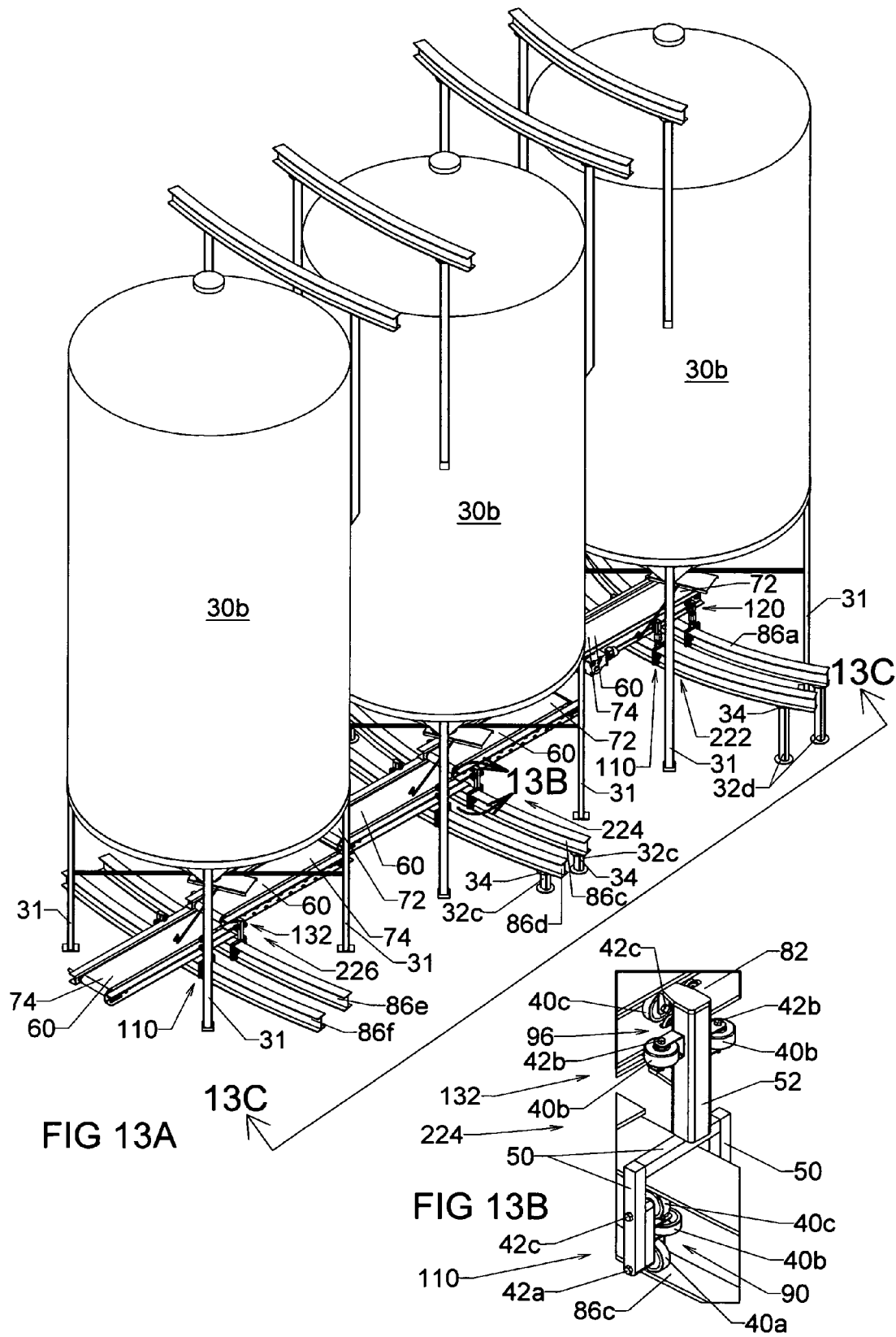

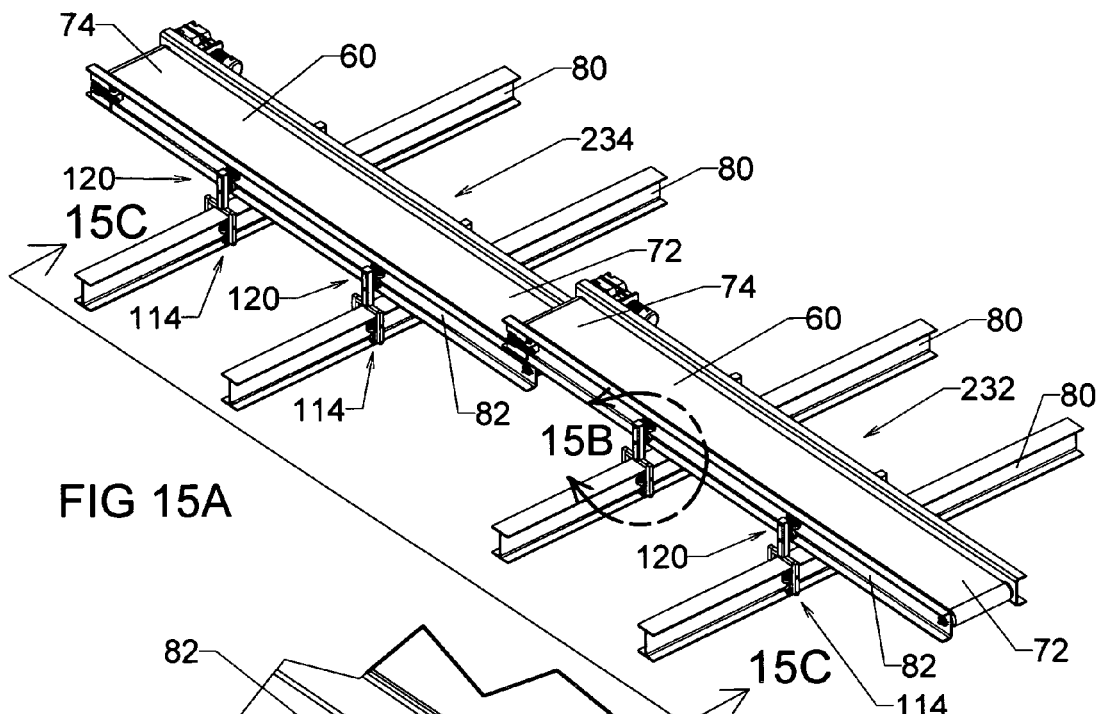
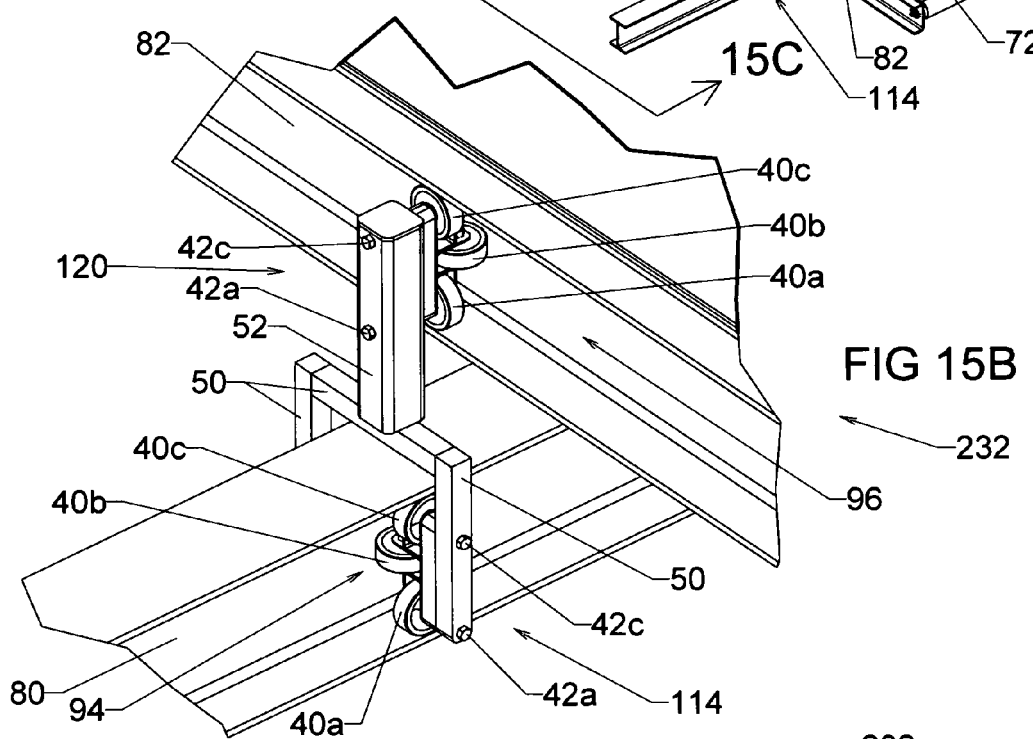
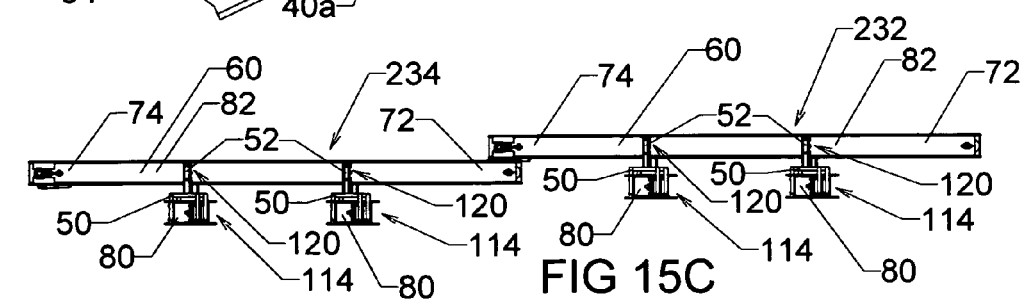

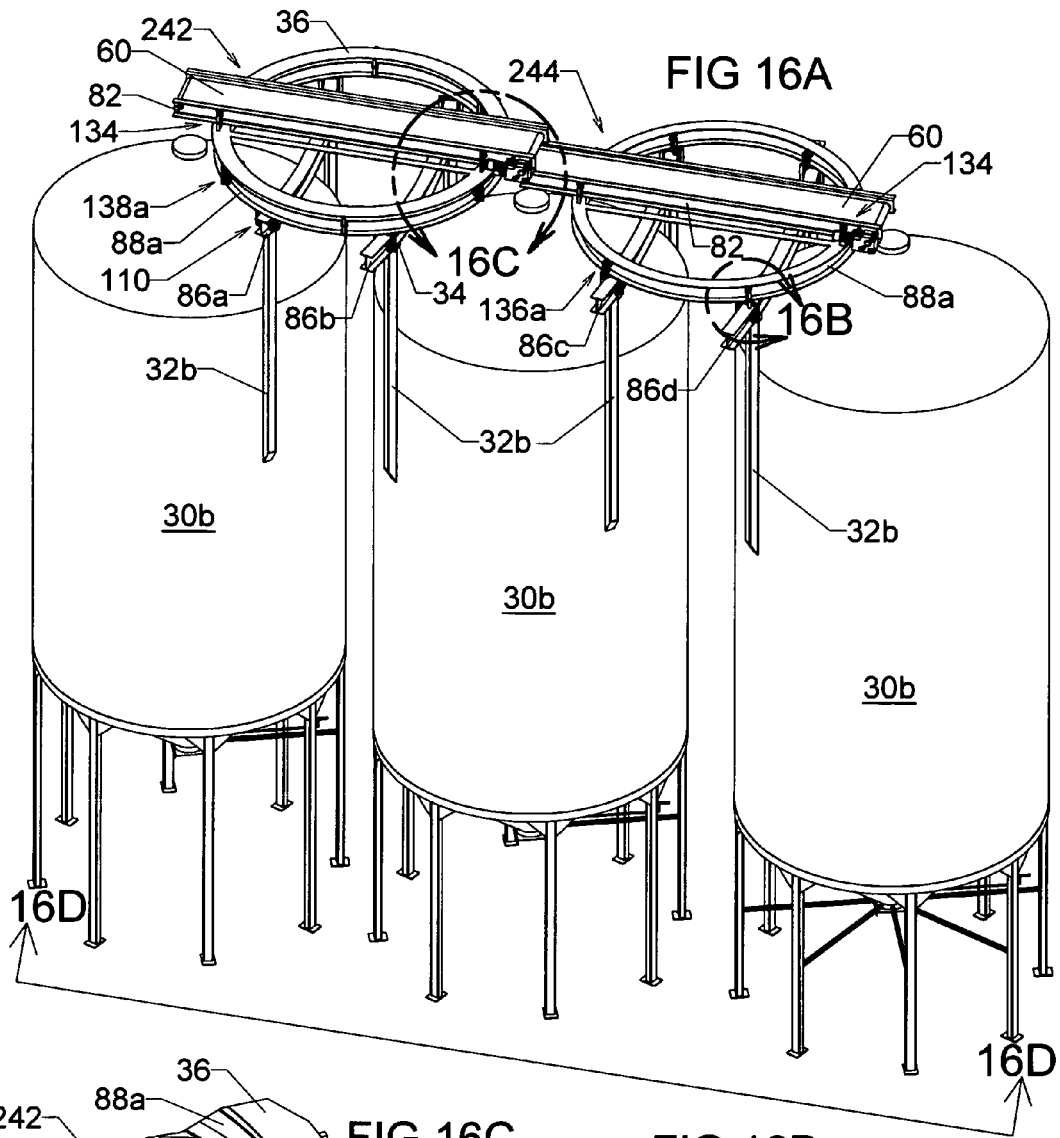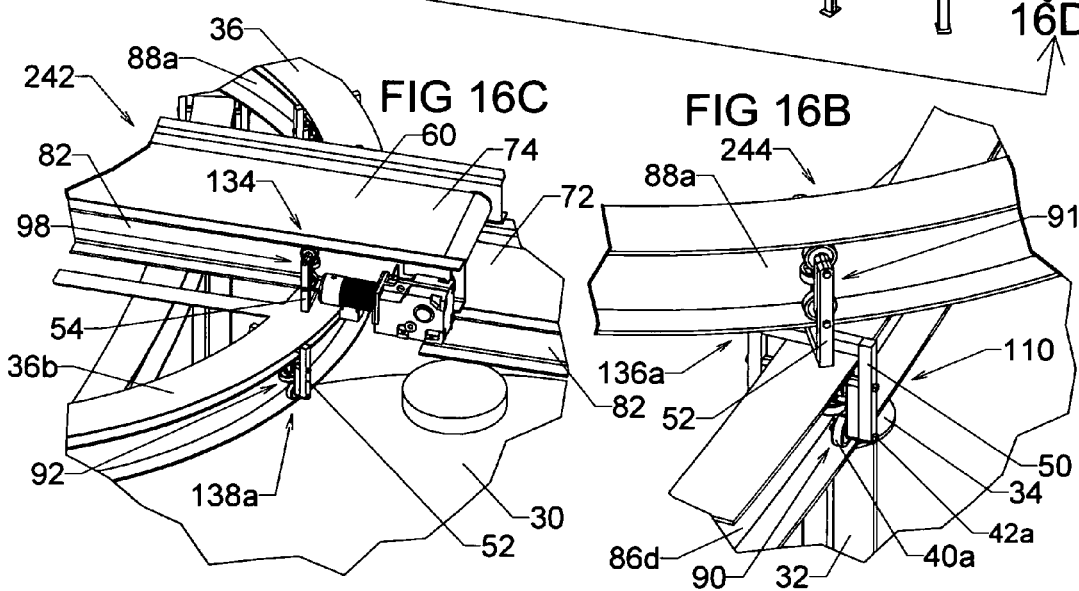

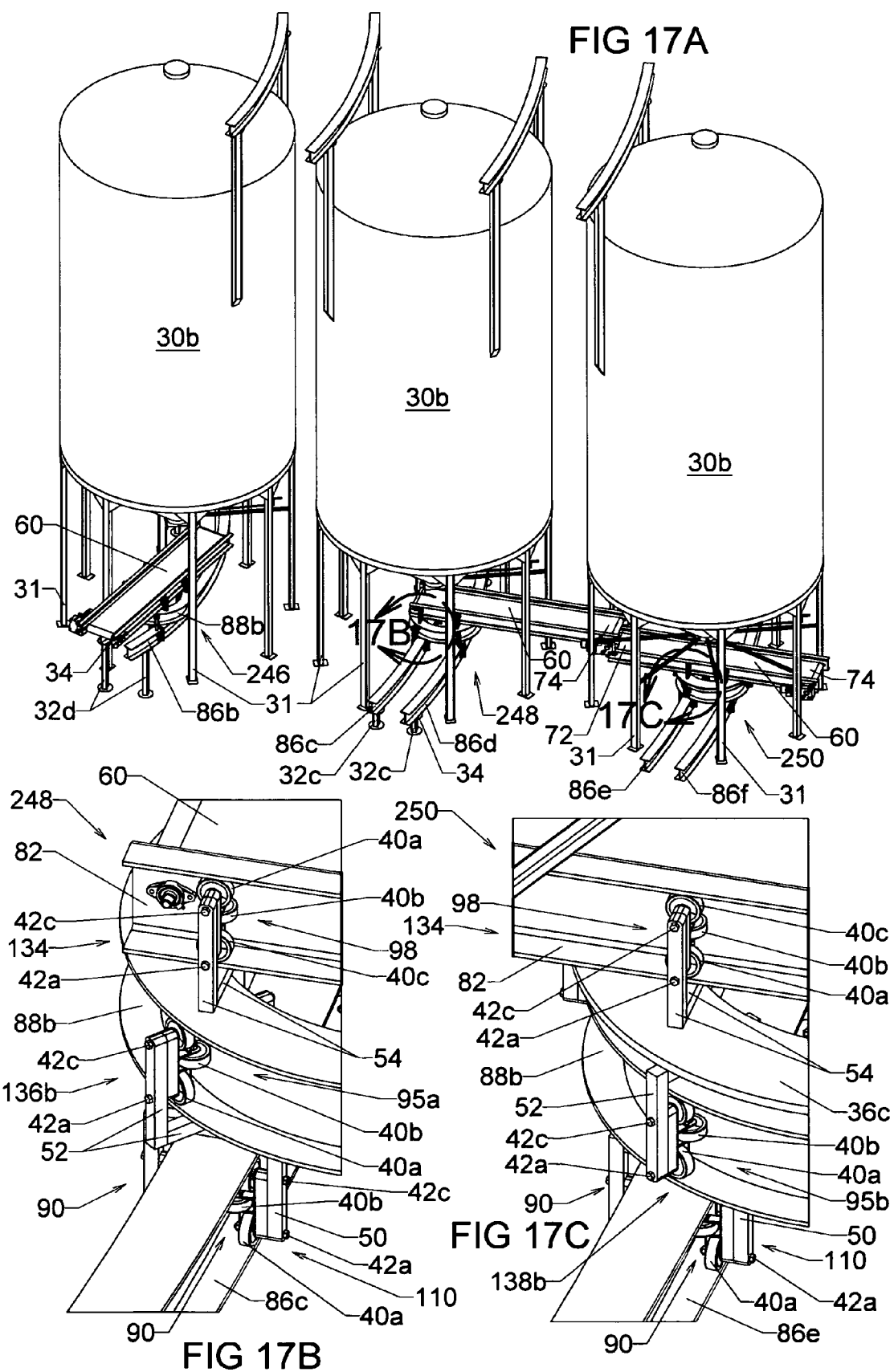

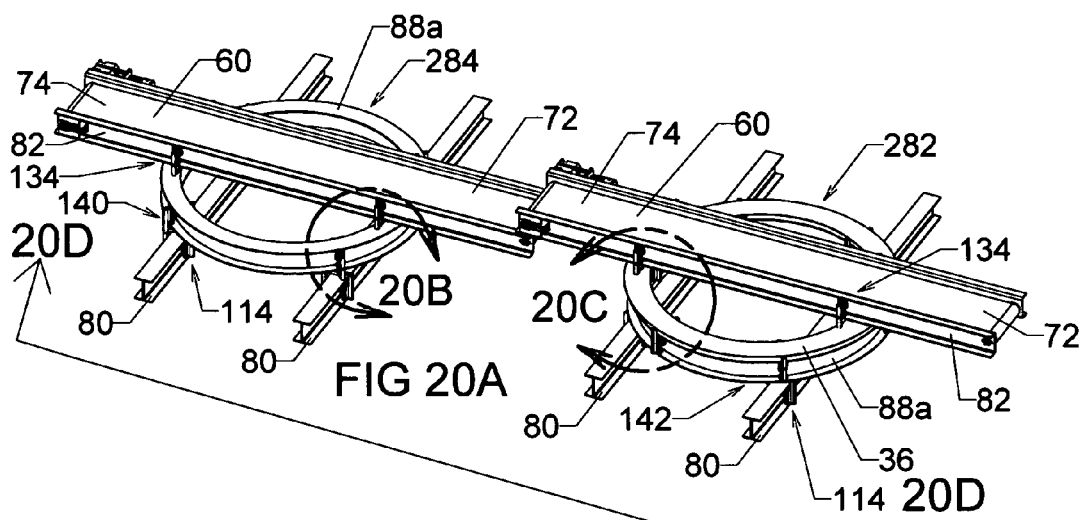
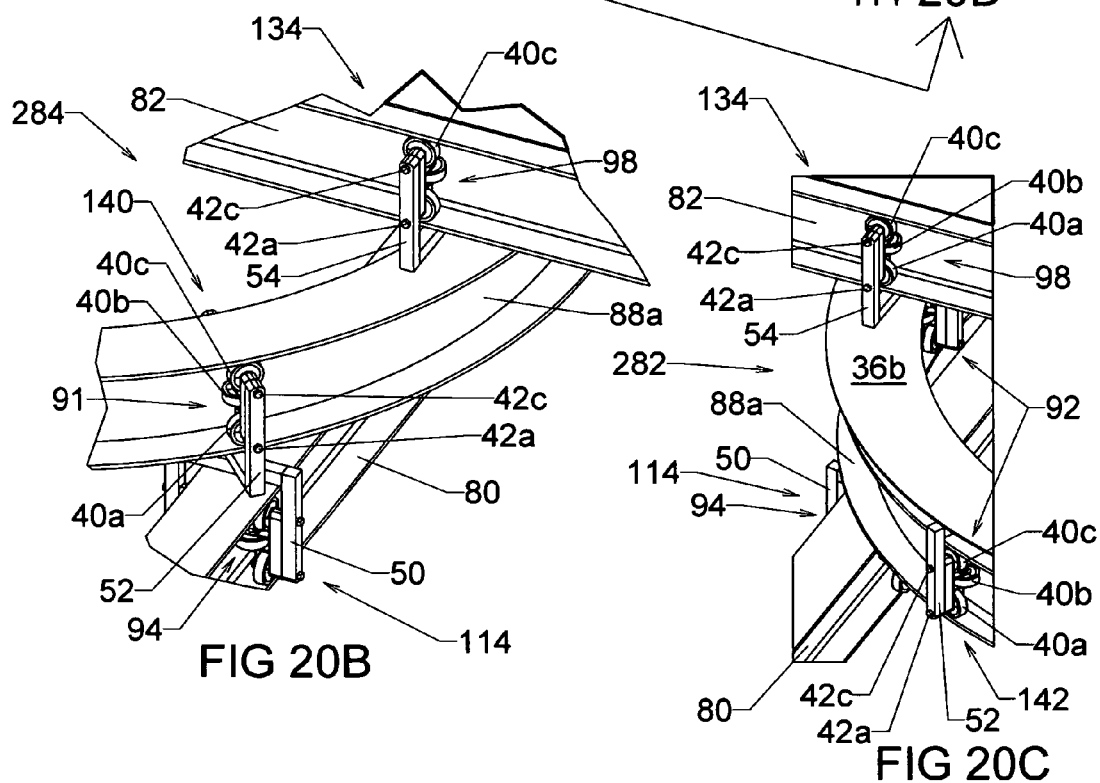
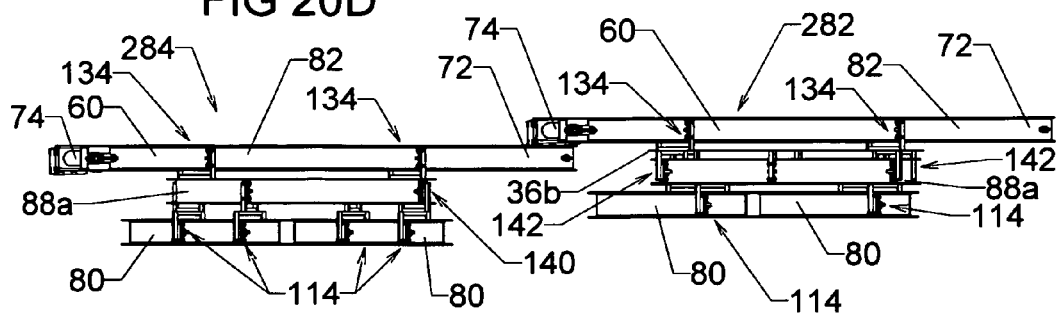

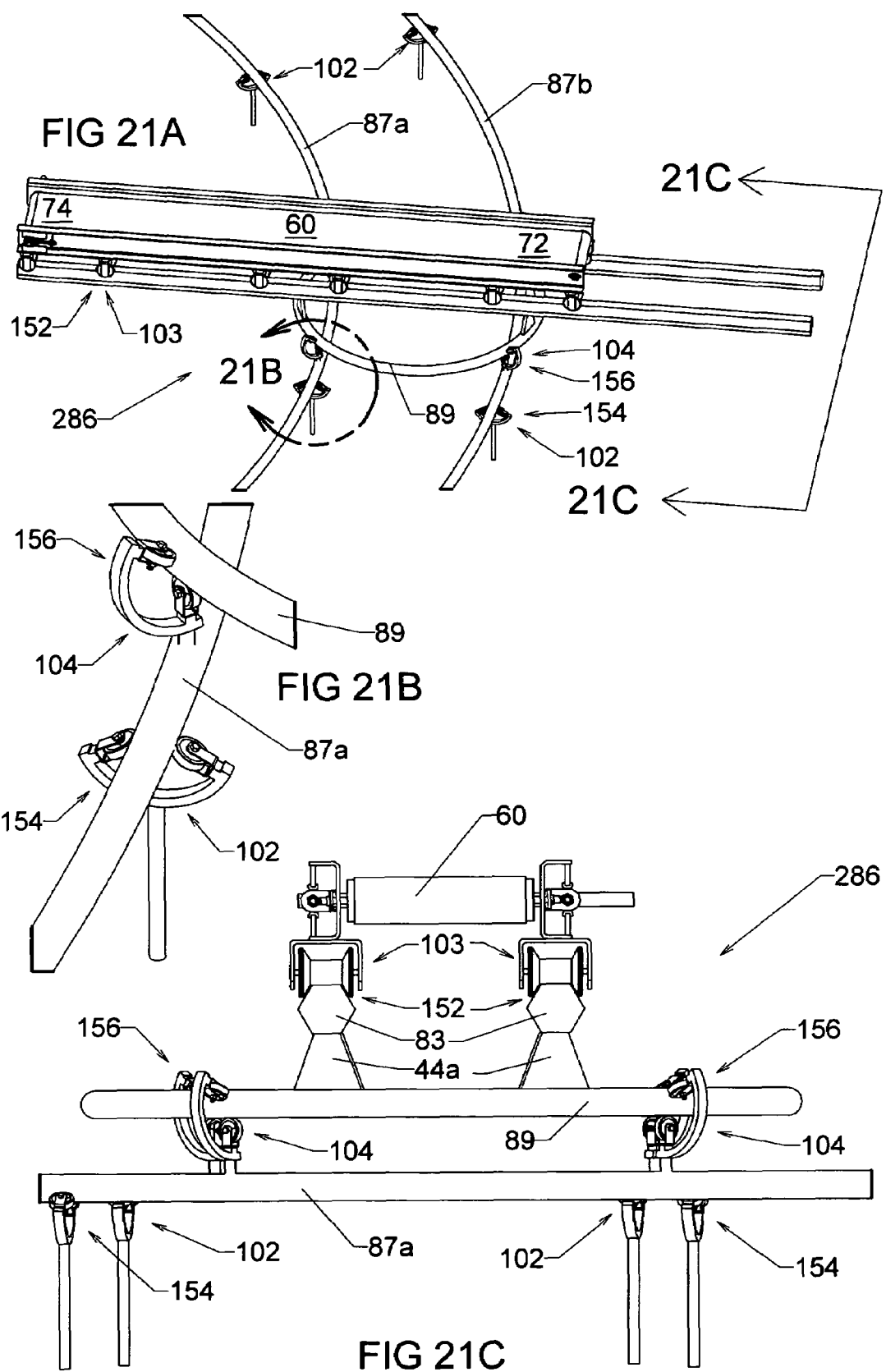

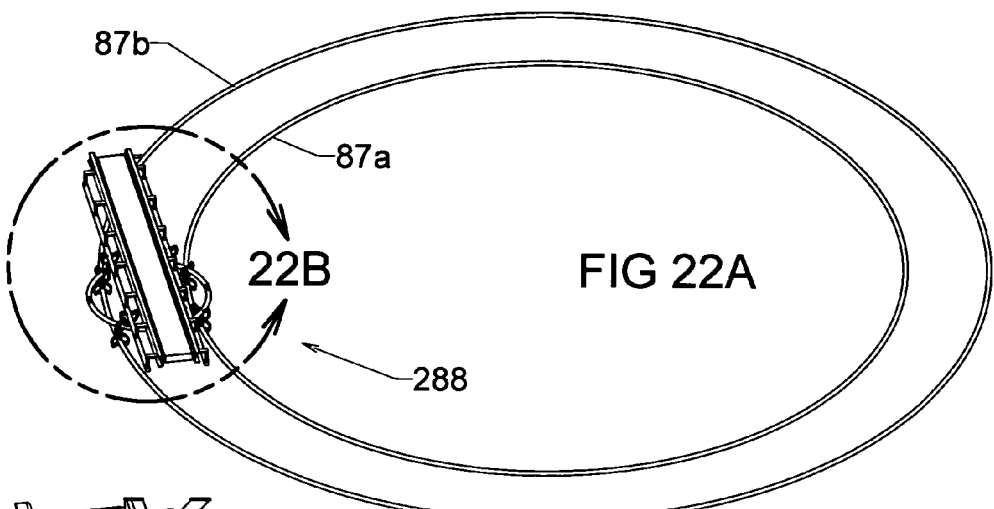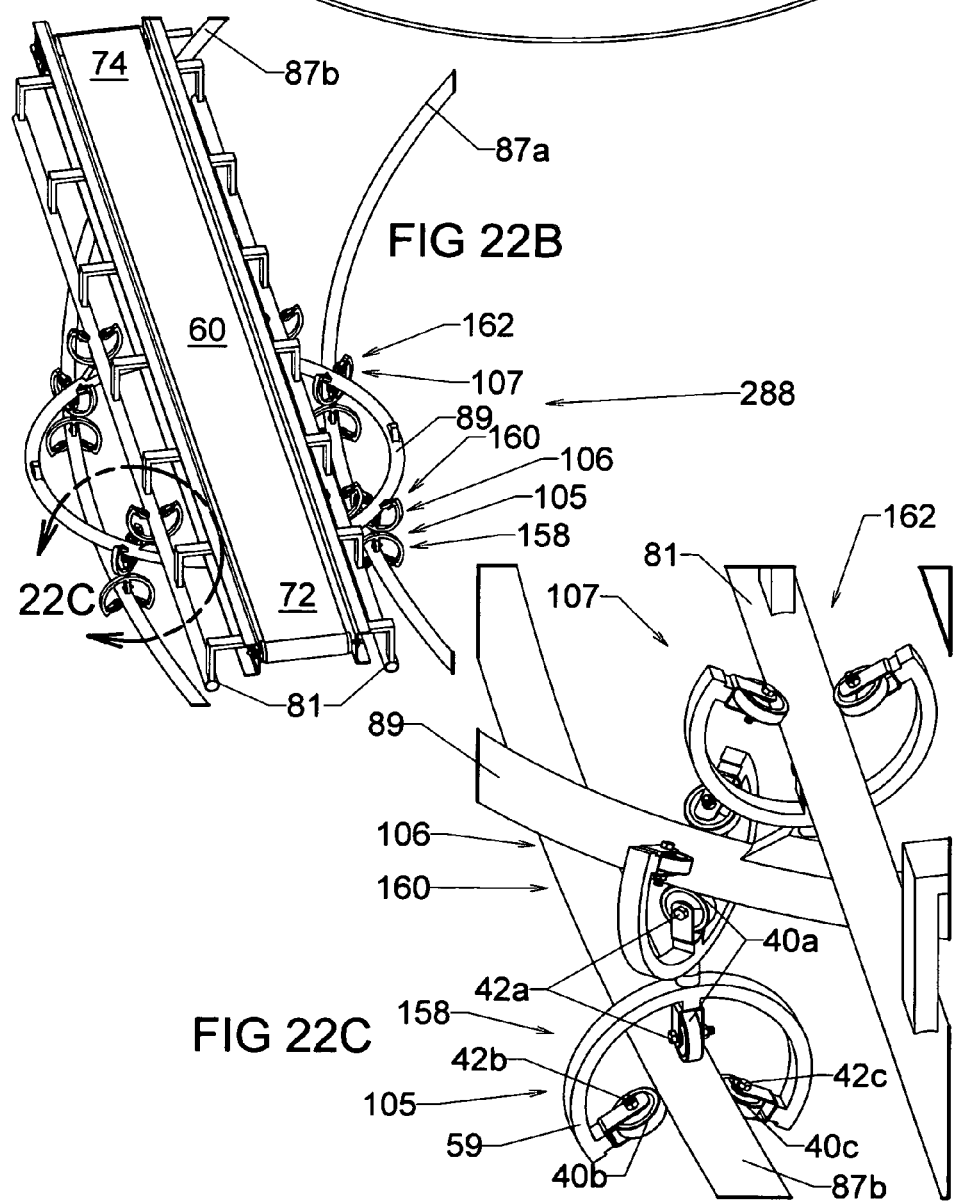

GUIDE APPARATUS AND METHOD FOR CONVEYOR(S)

CROSS-REFERENCE TO RELATED APPLICATIONS

This application is a divisional application of U.S. patent application Ser. No. 11/190,362, filed Jul. 27, 2005, now U.S. Pat. No. 7,125,215 which is a continuation-in-part application of and claims the benefit of U.S. patent application Ser. No. 10/771,807, filed Feb. 3, 2004, now U.S. Pat. No. 7,074,001 which claims the benefit of U.S. Provisional Application Ser. No. 60/445,760, filed Feb. 5, 2003.

FEDERALLY SPONSORED RESEARCH

Not applicable

SEQUENCE LISTING OR PROGRAM

Not applicable

BACKGROUND OF THE INVENTION

1. Field of the Invention

This invention relates to track-and-trolley conveyor guide apparatus, specifically to such systems that fill material into or recover material from a plurality of storage bins.

2. Discussion of Prior Art

A significant cost in designing feed mills, grain elevators, seed conditioning plants, industrial bulk material handling, storage, and processing facilities, and the like is the conveying system. These facilities generally use a conveying system to distribute or reclaim material. A distribution conveying system normally retrieves material from process equipment or another conveyor and moves it to a bin, another conveyor, or process equipment. A reclaim conveyor system generally collects material from the discharge opening of a storage bin and moves it away from the storage bin. Facilities with distribution or reclaim conveying systems typically require many linear meters of conveying equipment to serve the material handling requirements. Such equipment can be costly, not only in actual price, but also in terms of maintenance and energy requirements.

With the onset of increased purity requirements worldwide, one must also consider cross-contamination issues when choosing methods of conveyance for distribution or reclaim. Cross-contamination is the inadvertent intermingling of one product with another. In storage facilities that handle many different types of products, preventing or minimizing cross-contamination can be of particular concern, not only for product quality reasons, but also to minimize liability purposes. Efficiency and good cleanout, where little or no product remains on the conveyor after it reaches its destination, are two characteristics of conveying systems that are highly desirable in the these types of industries.

Current methods of conveying products to or from storage bins generally require a relatively large amount of linear meters of conveyors. Often, the design of the distribution system requires multiple points of discharge prior to the end discharge of the conveyor. These intermediate discharge gates can often be sources of cross-contamination since they are hard to cleanout. Filling into or recovering material from an array of bins using conventional methods often requires many linear-meters of conveying equipment, multiple intermediate discharge gates for distribution (which are sources of cross-contamination), and a relatively large amount of energy to run the equipment.

Preventing cross-contamination has become a priority in the animal feed, grain, and seed industries. Cross-contamination issues have become prevalent in recent years due to several factors, such as increased demand for identity preserved traits, the development of transgenic organisms, and food security in general. Transgenic organisms specifically refer to organisms that have genes that were transferred from an unrelated organism. The term genetically modified organisms (GMO) is a broader term that includes transgenic organisms. For the purpose of this disclosure, a distinction between these two terms will not be made. Processors increasingly demand quality products with characteristics that are best suited for a desired end product. Governments have more strict purity requirements regarding the amount of GMO allowed in conventional (non-transgenic) products. Consumers also desire segregation of transgenic from non-transgenic products. Other security concerns include trace-to-origin and other traceability requirements and issues, as well as ensuring that varieties or hybrids with different end-use purposes are not commingled. Thus, the more conveyors that are used to distribute or reclaim materials, the more opportunity for cross-contamination. Efficiency and good cleanout, where little or no product remains on the conveyor after it reaches its destination, are two characteristics of conveying systems that are highly desirable in the these types of industries.

Mounting international pressure to trace ingredients to points of origin has also contributed to the need to further prevent cross-contamination, and to segregate ingredients. Segregated storage is a concept that is gaining acceptance in the grain and feed industries since it can enhance value of stored products and help minimize the potential risks associated with foodborne diseases and bioterrorism. Products can be differentiated by such characteristics as the following: (a) ingredient origin, (b) plant variety, (c) protein level, (d) moisture level, (e) quality, (f) particle size, (g) field origin, (i) growing conditions, (k) foreign matter level, and (l) transgenetic status. Segregated storage and tracing ingredients to their points of origin have recently become even more important in these industries, not only because of regulations put forward by the European Union, but also due to the first documented case of Bovine Spongiform Encephalopathy, or Mad Cow Disease, in the United States. A diseased dairy cow is believed to have contracted the illness from contaminated feed. Efficient segregated storage, aided with a conveying system that greatly reduces or virtually eliminates the chance of cross-contamination, is a fundamental tool in complying with trace-to-origin regulations, and in reducing risks associated with cross-contamination in general.

Attempts have been made to reduce the number of linear meters of conveyor required to distribute to or reclaim from a plurality of bins. Examples of such conveying systems include those disclosed in the following patents: U.S. Pat. No. 4,330,232 to McClaren et al., 1982; U.S. Pat. No. 3,197,044 to Hozak et al., 1965; U.S. Pat. No. 4,491,216 to Sawby et al., 1985 US 2003/0113194 to Stafford & Elder et al., 2003; U.S. Pat. No. 3,435,967 to Sackett et al., 1969; U.S. Pat. No. 2,721,665 to Goeke et al., 1955; U.S. Pat. No. 4,619,576 to Kurudamannil et al., DE Patent 270,042 to Muth-Schmidt et al., 1912; and GB Patent 752, 816 A to Hessling et al., 1956.

McClaren attempts to fill a plurality of bins arranged in circular arcs about a central pad with one-wheel trolleys.

Limitations of this arrangement include the following: (1) the use of steep incline screw conveyors creates cross-contamination issues, since they are not easily completely cleaned of product; (2) rotation is limited by product receiving area requirements; (3) multiple conveyors are needed to reach outlying bins; (4) the design requires a relatively large footprint, which may be limiting in many facilities; and (5) the rotational axis is controlled by a center support.

Hozak shows a device somewhat similar to McClaren's, except it uses belt conveyors. In Hozak's design, the system once again requires a relatively large footprint, and as the height of the bins increase, so does the floor space requirement. This system also requires significant space above the bins. Consequently, very tall roofs, known as head houses, are required if this system were used in enclosed multi-silo structures. The rotational axis of Hozark's conveying system is also controlled and maintained by a central support device.

Sawby shows a swiveling conveying system for filling or reclaiming material from a plurality of storage bins. This system has an extendable auger at the end of a boom that pivots around a mast, and is limited to filling only one arc of receptacles. This system also requires a large footprint, and cleanout is relatively difficult. Although this system has the ability to both distribute to and reclaim from a plurality of bins, a fixed mast and boom locates the permanent axial position of the conveyor. Sawby's apparatus would not be practical for multiple rows of bins, or for conveyors with high volumes that would create heavy loads onto the boom and mast.

The conveying system disclosed by Sackett is functionally limited to square or rectangular bins, and it requires multiple conveyors. Although this system does not rely on a central support device, the one wheel trolley's rest on a track. There are not any provisions in this apparatus for the conveyor to withstand uneven downward, upward, or lateral forces. There are no provisions for use on an arcuate trace.

Stafford and Elder's device requires a large footprint and is limited to one type of structure. This apparatus also pivots about a central axis. The wheels rest upon a track and do not provide significant guidance.

The Goeke system has one wheel trolleys resting upon a track and does not have a mechanism at a central axis but its conveyor does not have any means of staying on the track if it is subjected to upward, uneven downward, lateral, or radial forces. Goeke's apparatus would have difficulty with a cantilevered conveyor or an inclined conveyor. If a foreign object were on the track of this system, the wheels would have a tendency to jump over the object and depart from the track, rather than being blocked and coming to a stop.

The Kurudamannil system is very similar to Sackett's, with one-wheel trolleys resting on a track, but with a conveyor pivoting on a shaft to transfer to other conveyors. The trolley system is not designed to provide any contribution beyond providing a linear guidance and weight support.

Muth-Schmidt uses a circular track that is fully supported and controlled by a central support and control mechanism. The one-wheel trolley system does not provide for significant guidance but is instead primarily used for supporting the weight. A circular track that is supported and controlled from a central mechanism has several limitations such as the following:

a. incline conveyor stresses a central mechanism,
b. the cantilevered conveyors stresses the central support, and
c. difficult to control long conveyors from a central mechanism.

Hessling's apparatus is a traversing conveyor that is controlled by a central support mechanism that maintains a fixed central axis supporting a circular track. The upper conveyor has a fixed location. The one-wheel trolley on a circular track is not used for guidance, but is instead primarily used for weight support of the upper conveyor. The lower conveyor rotational capability is less than 180° due to the supports of the upper conveyor resting on the track. Hessling's apparatus would not be suitable for multiple concentric tracks, tall silos, long-heavy-high-volume conveying systems, or systems that require more than 180° of rotational capability.

The majority of the prior art cited rotates around a central axis for support, control, and placement of conveyor. The remaining relevant prior art relies on a simple trolley system that does not provide significant guidance to the conveyor when subjected to uneven, lateral, or radial forces. As far as I am aware, there is not a track-and-trolley conveyor guidance system designed to withstand uneven, lateral, or radial loads without a central support mechanism while maintaining guidance to the conveyor. All of the prior art cited uses a one-wheel trolley.

Other conventional methods of distributing material to or reclaiming material from multiple silos include belt, drag chain, or screw conveyors. These traditional conveyor systems have at least one stationary conveyor positioned above or below the length of the silos to distribute material into or recover material from the silos. This requires many linear meters of conveyance. These traditional distribution conveyor systems incorporate multiple intermediate discharge gates so the conveyor can discharge at multiple points along the conveyor. The problem with conventional distribution conveyors is that the intermediate discharge gates tend to have carryover problems that can cause potential cross-contamination. If the entire product does not fall through the open intermediate discharge gate, the product can be conveyed to an unintended storage bin. Also, intermediate discharge gates on a conventional conveyor tend to seal imperfectly with the conveyor trough, creating further cross contamination potential.

An alternative to using conveying systems to fill bins, like those described above, is down-spouting. Down-spouting is typically pipe at a 38 degree or steeper angle that flows the grain or ingredients to a silo. However, down-spouting requires a relatively tall head house if it is to be enclosed, often about 10 m to 20 m above the bins to be filled. Material moving along long lengths of down-spouting can reach relatively high speeds, and thus can land harshly within a bin. Such impacts can significantly lower product quality, and so, in many cases, down-spouting is undesirable. There are also cross-contamination issues with the conventional methods of directing grain or ingredient flow to one of multiple downspouts.

In summary, the following are typical disadvantages of conventional conveying or spouting systems that are used to fill a plurality of bins:

(a) multiple long conveyors are usually needed, requiring many linear meters of conveyor, which increase cross-contamination risk and adds to energy and maintenance costs;

(b) multiple discharge gates on the conveyor are often necessary for distribution, which increases risk of cross-contamination; and (c) some of the prior-art apparatuses have inherent cross-contamination or commingling problems.

In summary, the following are typical disadvantages of conventional trolley assisted conveying systems to fill a bin residing within a cluster of bins:

(a) a central shaft or central support mechanism is usually required to maintain the center of axis;
(b) existing trolley designs do not show mechanisms to withstand upward, downward, lateral, uneven, and/or radial forces, while maintaining desired guidance;
(c) prior art systems do not confine movement to only the desired linear or radial path;
(d) a central support device that can withstand substantial loads when supporting and/or controlling long and/or heavy conveyance systems might not be feasible with most storage silos;
(e) a single wheel trolley assembly that only rests on a track cannot withstand upward, uneven downward, lateral, and/or radial forces;
(f) many of the prior art systems increase the roof height requirements above the silos;
(g) some of the cited prior art would only be practical with one type of conveyance such as a screw type conveyor and would not be suited for other types of mechanical conveyors; and
(h) some of the prior art apparatuses have inherent cross-contamination or commingling flaws.

One reason a track-and-trolley guided reclaim conveyor system has not been incorporated to collect and convey material from storage receptacles in the past is because of the requirement to move the conveyor between the bin support legs. As a result, the traditional bin reclaim system has had a stationary conveyor(s) positioned under the length of the silos to reclaim the material from the silos and then discharge the material away from or near the perimeter of the silos. This requires many linear meters of conveyance.

In summary, the following are typical disadvantages of conventional conveying systems to recover material from a plurality of bins:

(a) many linear meters of conveyor are needed, which increases cross-contamination risk and adds to energy and maintenance costs;
(b) some of the prior art apparatuses have inherent cross-contamination or commingling flaws;
(d) conventional conveying systems may require a central shaft or mechanism to maintain an axis, support the conveyor, or to control the conveyor; and
(e) conventional conveying systems have no mechanism to move a conveying device under storage bins and between storage bin support legs.

Objects and Advantages

Accordingly, several objects and advantages of the present invention include the following:
(a) to provide an improved conveying guidance system;
(b) to provide an improved conveying system that can fill material into or recover material from a plurality of storage bins with minimal conveyor lengths, thus lowering associated cross-contamination issues, energy requirements, and maintenance costs;
(c) to provide a conveying system that eliminates a need for multiple discharge openings and intermediate discharge gates, thus reducing risks associated with cross-contamination;
(d) to provide a conveying system that decreases linear meters of conveyor required, which reduces energy and maintenance costs;
(e) to provide a conveying system that reduces or eliminates inherent cross-contamination or commingling flaws;
(f) to provide a conveyor guidance apparatus that can move under storage bins and between bin support legs; and
(g) to provide a conveying system in which product quality is preserved.

Further objects and advantages are to provide a conveying system that has a reduced capital cost expenditure; that does not require a central shaft or mechanism to maintain an axis, support the conveyor, or to control the conveyor; and that preserves product quality. The conveying system provides can operate simultaneously on the same track and allows stackable conveyors that can to feed another conveyor. The conveyor guidance system can receive product at any point around or within a cluster of bins and distribute it to an infinite number of discharge points within a given perimeter without a central shaft or mechanism to maintain an axis, support the conveyor, or to control the conveyor. The conveying system can withstand upward, downward, lateral, and/or radial forces while maintaining position and/or guidance. The track-and-trolley design allows multiple conveyors to work in conjunction with each other.

The conveying system can also be automated, with electrical location sensors that can position the discharge end(s) of the conveyor at an infinite number of discharge or receiving locations, to expand its efficiencies. Further objects will become apparent from a consideration of the ensuing description and drawings.

SUMMARY

In accordance with the present invention, a conveying system for collecting material and conveying it to or from a plurality of storage bins, with or without shared walls, comprises a conveyor that is supported by and shuttles along linear and/or arcuate tracks. The track-and-trolley guided conveyor system allows the conveyor to withstand upward, downward, lateral, or radial forces or any combination of one or more of these forces, while maintaining position, or guidance, or both. The trolley, if desired, can restrict all freedom of movement except to a path parallel to the designated arcuate or linear track(s).

DRAWINGS—FIGURES

FIG. 3A is an isometric view of a conveying system according to the invention showing a track-and-trolley guidance system that has a linear guidance assembly and a conveyor, in a resting position.

FIG. 3B is an enlarged isometric view of the area indicated by line 3B of FIG. 3A, to more clearly show a three wheel trolley configured for a linear pipe.

FIG. 3C is an enlarged isometric view of the area indicated by line 3C of FIG. 3A, to more clearly show a two wheel trolley configured for a linear pipe.

FIG. 3D is an enlarged isometric view of the area indicated by line 3D of FIG. 3A, to more clearly show a two wheel trolley configured for a linear pipe.

FIG. 3E is an enlarged isometric view of the area indicated by line 3E of FIG. 3A, to more clearly show a two wheel trolley configured for a linear pipe.

FIG. 10A is an isometric view showing a plurality of round bins with a dual layer track-and-trolley system comprising a first layer or lower arcuate track-and-trolley assembly that supports a second layer or upper linear track-and-trolley system.

FIG. 10B is an enlarged isometric view of the area indicated by line 10B of FIG. 10A showing one of the two layer track-and-trolley systems in FIG. 10A.

FIG. 10C is an enlarged isometric view of the area in FIG. 10A indicated by line 10C of FIG. 10A showing one of the two layer track-and-trolley systems in FIG. 10A.

FIG. 11A is an isometric view that illustrates an alternative embodiment of a dual layer track-and-trolley guided conveyor system that reclaims material from storage bins.

FIG. 11B is an enlarged isometric view of the area in FIG. 11A indicated by line 11B of FIG. 11A showing one of the track-and-trolley guided reclaim conveyor systems in FIG. 11A.

FIG. 11C is a front view taken in the direction of the area indicated by line 11C-11C of FIG. 11A.

FIG. 11D is an enlarged front elevational view of the area in FIG. 11C indicated by line 11D of FIG. 11C showing one of the track-and-trolley guided conveyor systems in FIG. 11C.

FIG. 13A is an isometric view that illustrates another additional embodiment of the track-and-trolley guided conveyor system used to reclaim material from at least one storage bin.

FIG. 13B is an enlarged isometric view of the area in FIG. 13A indicated by line 13B of FIG. 13A showing one of the track-and-trolley guided reclaim conveyor systems in FIG. 13A.

FIG. 15A is an isometric view of an additional embodiment that shows a dual layer track-and-trolley system that comprises a linear track-and-trolley supporting a linear track-and-trolley with a conveyor that can be used for filling into or reclaiming from a plurality of bins.

FIG. 15B is an enlarged view of the area indicated by line 15B of FIG. 15A showing one of the track-and-trolley guided conveyor in FIG. 15A.

FIG. 15C is a front elevation view taken in the direction of the area indicated by line 15C-15C of FIG. 15A.

FIG. 16A is an isometric view of an alternative embodiment that shows a plurality of round bins with a triple layer track-and-trolley system that comprises a first layer arcuate track-and-trolley assembly supporting a second layer arcuate track-and-trolley, which in turn supports a third layer linear track-and-trolley assembly that supports a conveyor.

FIG. 16B is an enlarged isometric view of the area indicated by line 16B of FIG. 16A that shows the lower two track-and-trolley assembly layers of one of the conveyor guidance systems in FIG. 16A.

FIG. 16C is an enlarged isometric view of the area indicated by line 16C of FIG. 16A that shows the upper two track-and-trolley assembly layers of the second guidance system.

FIG. 17A is an isometric view that illustrates an alternate embodiment of the track-and-trolley guided conveyor system used for reclaiming material.

FIG. 17B is an enlarged isometric view of the area indicated by line 17B of FIG. 17A of the triple layer track-and-trolley guided conveyor system in FIG. 17A.

FIG. 17C is an enlarged isometric view of the area indicated by line 17C of FIG. 17A showing the triple layer track-and-trolley guided conveyor system for reclaiming material from bins in FIG. 17A.

FIG. 20A is an isometric view of an alternative embodiment that shows two triple layer track-and-trolley conveyor guidance systems that each comprise a lower layer linear track-and-trolley, which in turn supports a middle layer arcuate track-and-trolley supporting an upper layer linear track with attached conveyor.

FIG. 20B is an enlarged isometric view of the area indicated by line 20B of FIG. 20A showing one of the triple layer track-and-trolley systems of FIG. 20A.

FIG. 20C is an enlarged view of the area indicated by line 20C of FIG. 20A that shows one of the triple layer track-and-trolley systems of FIG. 20A.

FIG. 20D is a front elevation view taken in the direction of the area indicated by line 20D-20D of FIG. 20A.

FIG. 21A is an isometric view of an alternative embodiment that shows a triple layer track-and-trolley conveyor guidance system that uses two wheel trolley assemblies for the lower and middle guidance assembly layers, pipe for all tracks, and a one wheel trolley assembly for the upper layer guidance assembly.

FIG. 21B is an enlarged isometric view of the area indicated by line 21B of FIG. 21A that more clearly shows the lower and middle layer track-and-trolley guidance assemblies.

FIG. 21C is a front elevation view taken in the direction of the area indicated by line 21C-21C of FIG. 21C.

FIG. 22A is an isometric view similar to FIGS. 18 and 19 except that the tracks are comprised of pipe and the trolleys are configured for pipe.

FIG. 22B is an enlarged isometric view of the area indicated by line 22B of FIG. 22A that more clearly shows the triple layer track-and-trolley conveyor guidance system in FIG. 22A.

FIG. 22C is an enlarged isometric view of the area indicated by line 22C of FIG. 22B that more clearly shows the lower, middle, and upper guidance assembly layers.

Figure 1:
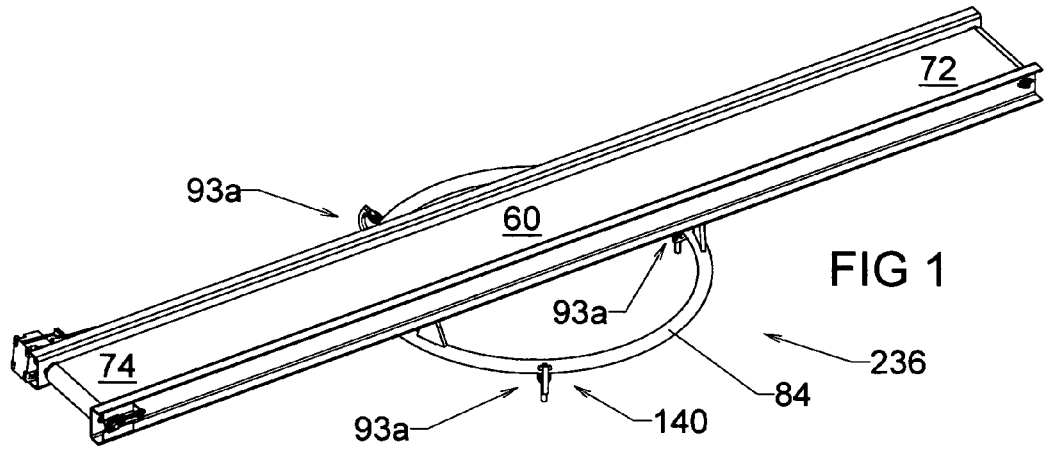
FIG. 1 is an isometric view of a conveying system according to the invention showing a track-and-trolley guidance system that has an arcuate guidance assembly and a conveyor, in a resting position.

DRAWING REFERENCE NUMERALS 30a bin, polygonal, shared wall
30b bin, round, eight support legs
30c bin, round, four support legs
31 bin support leg
32a column from shared wall bins
32b column from round bins
32c column for reclaim
32d column for reclaim, taller than 32c
33 bin discharge hopper
34 column cap
36a load plate
36b load plate
36c load plate
38 pivot point
40a wheel
40b wheel
40c wheel
41 wheel
42a wheel rod
42b wheel rod
42c wheel rod
43 wheel rod
44a track support
44b track support
50 first load bar
51 first load bar
52 second load bar
53 first load bar
54 third load bar
55 first load bar
56 adjustable load bar
57 second load bar
58 first load bar
60 conveyor
62 trolley support
67 group of two conveyors that are retracted
68 group of three conveyors that are retracted
69 group of two conveyors that are extended
70 group of three conveyors that are extended
72 conveyor incoming end
74 conveyor discharge end
78 catwalk
79 linear track, I-beam
80 linear track, I-beam
81 linear track, tubular
82 linear track, C-beam
83 linear track, hexagonal
84 arcuate track, tubular
86a arcuate track, I-beam
86b arcuate track, I-beam
86c arcuate track, I-beam
86d arcuate track, I-beam
86e arcuate track, I-beam
86f arcuate track, I-beam
87a arcuate track, tubular
87b arcuate track, tubular
88a arcuate track, I-beam
88b arcuate track, I-beam
89 arcuate track, tubular
90 trolley for arcuate track
91 trolley for arcuate track
92 trolley for arcuate track
93a trolley for arcuate track
93b trolley a for linear track
94 trolley for linear track
95a trolley for middle arcuate track
95b trolley for middle arcuate track
96 trolley for linear track
97 trolley for linear track for group of two conveyors
98 trolley for linear track
99 trolley for linear track with bar 56 for one conveyor
100 trolley for linear track with bar 56 and conveyor group 67
101 trolley for linear track with bar 56 and conveyor group 70
102 two-wheel trolley for lower guidance assembly
103 one-wheel trolley for upper linear guidance assembly
104 two-wheel trolley for middle guidance assembly
105 three-wheel trolley for lower guidance assembly
106 three-wheel trolley for middle guidance assemby
107 three-wheel trolley for upper guidance assembly
108 three-wheel trolley for guidance assembly
110 lower guide assembly comprising track 86 and trolley 90
112 lower guide assembly comprising track 80 and trolley 94
114 lower guide assembly comprising track 80 and trolley 95
120 upper guide assembly comprising track 82 and trolley 96
122 upper guide assembly comprising track 82 and trolley 94
124 upper guide assembly comprising track 88 and trolley 92
126 upper guide assembly comprising track 82 and trolley 99
128 upper guide assembly comprising track 82 and trolley 100

130 upper guide assembly comprising track 82 and trolley 101
132 upper assembly comprising track 82 and trolley 97
134 upper guide assembly comprising track 82 and trolley 98
136 middle guide assembly comprising track 88 and trolley 91
138 middle guide assembly comprising track 88 and trolley 92
140 lower guide assembly comprising track 84 and trolley 93a
142 lower guide assembly comprising track 81 and trolley 108
144 lower guide assembly comprising track 81 and trolley 102
146 lower guide assembly comprising track 81 and trolley 95
148 lower guide assembly comprising track 81 and trolley 93
150 lower guide assembly comprising track 84 and trolley 93
152 upper guide assembly comprising track 83 and trolley 103
154 lower guide assembly comprising track 87 and trolley 102
155 middle guide assembly comprising track 89 and trolley 104
156 lower guide assembly comprising track 87 and trolley 105
160 middle guide assembly comprising track 89 and trolley 106
162 upper guide assembly comprising track 81 and trolley 107
200 system comprising assemblies 110 and 120 and conveyor 60
202 system comprising assemblies 110 and 122 and conveyor 60
204 system comprising assemblies 110 and 122 and conveyor 60
206 system comprising assemblies 112 and 124 and conveyor 60
208 system comprising assemblies 110 and 126 and conveyor 60
210 system comprising assemblies 110 and 128 and conveyor group 70
212 system comprising assemblies 110 and 126 and conveyor 60
214 system comprising assemblies 110 and 130 and conveyor group 69
216 system comprising assemblies 110 and 130 and conveyor group 67
218 system comprising assemblies 110 and 132 and conveyor group 69
220 system comprising assemblies 110 and 120 and conveyor 60
222 system comprising assemblies 110 and 120 and conveyor 60
224 system comprising assemblies 110 and 132 and conveyor 60
226 system comprising assemblies 110 and 132 and conveyor 60
228 system comprising assemblies 114 and 126 and conveyor 60
230 system comprising assemblies 114 and 126 and conveyor 60
232 system comprising assemblies 114 and 120 and conveyor 60
234 system comprising assemblies 114 and 120 and conveyor 60
236 system comprising assembly 140 and conveyor 60
238 system comprising assemblies 142, 144, 146, and 148, and conveyor 60
240 system comprising assemblies 150 and 152 and conveyor 60
242 system comprising assemblies 110, 138, and 126 and conveyor 60
244 system comprising assemblies 110, 136, and 126 and conveyor 60
246 system comprising assemblies 110, 136, and 134 and conveyor 60
248 system comprising assemblies 110, 136, and 134 and conveyor 60
250 system comprising assemblies 110, 138, and 134 and conveyor 60
262 system comprising assemblies 110, 136, and 134 and conveyor group 70
264 system comprising assemblies 110, 138, and 126 and conveyor group 70
266 system comprising assemblies 110, 136, and 134 and conveyor group 70
268 system comprising assemblies 110, 136, and 134 and conveyor group 70
270 system comprising assemblies 110, 136, and 134 and conveyor group 68
282 system comprising assemblies 114, 138, and 134 and conveyor 60
284 system comprising assemblies 114, 136, and 134 and conveyor 60
286 system comprising assemblies 154, 156, and 152 and conveyor 60
288 system comprising assemblies 158, 160, and 162

DETAILED DESCRIPTION—FIGS. 1, 2A, AND 2B

All of the of the prior art cited, whether with or without a central support and/or control mechanism, only uses a one-wheel trolley. The addition of a second wheel to a trolley that is a component of a multiple trolley guide assembly provides significant advantages to a track-and-trolley conveyor guidance system. FIG. 1 shows an apparatus of a track-and-trolley conveyor guidance system 236 that comprises a guide assembly 140 attached to a conveyor 60. System 236 is the simplest embodiment of this invention while providing all of the desired characteristics. System 236 guides conveyor 60 along the radial path of a track 84, as conveyor 60 is subjected to forces or loads associated and not associated with moving conveyor 60. System 236 can refer to a method or to an apparatus. System 236 can serve a plurality of bins, primarily for distributing material to the bins, and, to a limited degree, to reclaim material from the bins.

Figure 2A:
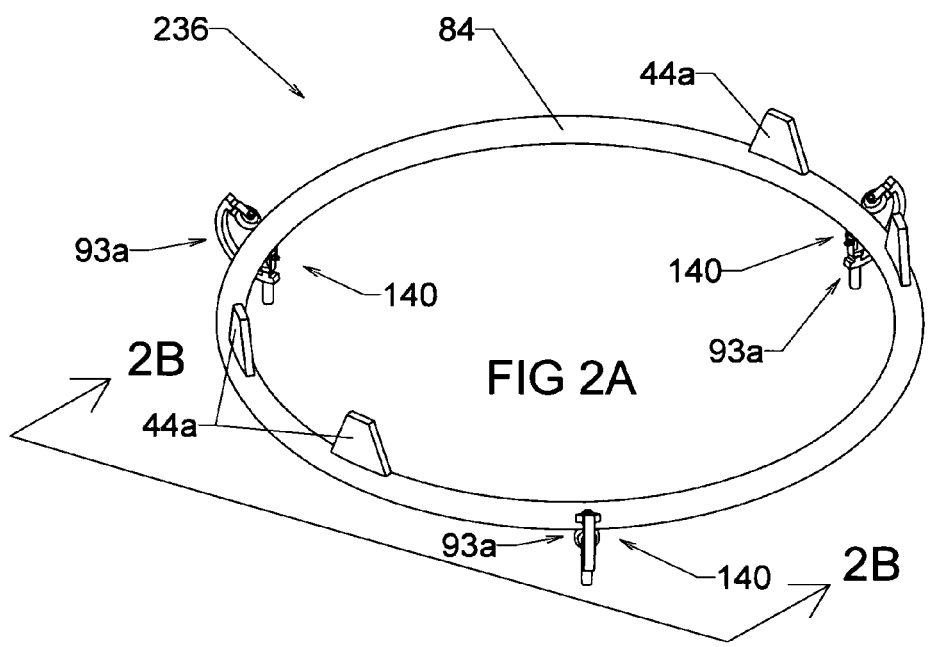
FIG. 2A is an isometric view of the track-and-trolley assembly shown in FIG. 1 without the conveyor.

FIG. 2A is an isometric view that shows system 236 without conveyor 60 depicted in FIG. 1 to more clearly illustrate an assembly 140. Assembly 140 comprises a single arcuate track 84, three first trolley assemblies 93a, and support bars 44a.

Figure 2B:
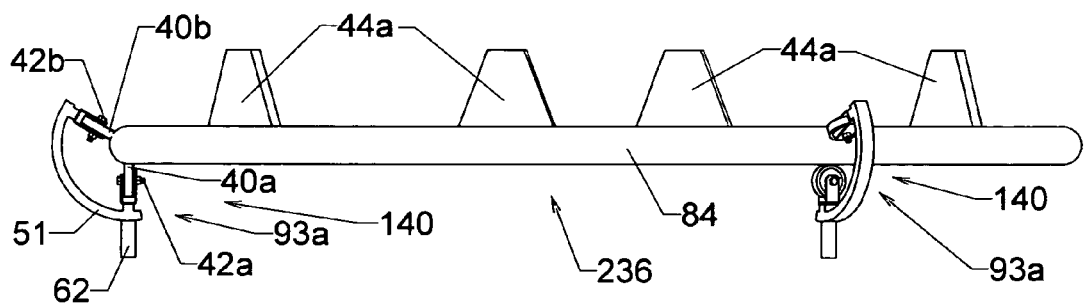
FIG. 2B is a front view taken in the direction of the area indicated by line 2B-2B of FIG. 2A.

FIG. 2B is an enlarged front elevation view of the area taken in the direction indicated by line 2B-2B of FIG. 2A showing system 236. A first trolley 93a comprises a load bar 51, a load support bar 62, two wheels 40a and 40b, and two wheel rods 42a and 42b. Wheels 40a and 40b, and wheel rods 42a and 42b of trolley 93a are about 120° apart. Wheels 40a and 40b of trolley 93a are tangent to track 84. Wheel 40*a* is upright at about a six o'clock position in relation to track 84 and supports the weight load of track 84 and conveyor 60. Wheel 40*b* is at about a 10 o'clock position in relation to track 84. In this arrangement, once wheel 40*b* is above the 9 o'clock position, wheel 40*b* does more than provide radial guidance to track 84. It holds track 84 down so conveyor 60 and trolley 93*a* cannot tip off of the track 84. As a result, any force and load within the design parameters subjected upon conveyor 60 cannot derail trolley 93*a* from track 84.

Support bar 44*a* can be a separate component connected to or an extension of track 84. The purpose of bar 44*a* is to elevate conveyor 60 or other track-and-trolley guide assemblies above or below (not shown) trolley 93*a* so there is not interference between them. Bar 44*a* needs to be sufficiently narrow to allow trolley 93*a* room to pass by bar 44*a*. Bar 44*a* needs to be sufficiently strong to adequately support conveyor 60 and any loads or forces that might be subjected upon the system components. Support bar 62 can be a separate component connected to or an extension of load bar 51. The purpose of bar 62 is to elevate and support trolley 93*a*. Bar 62 can be adjustable (not shown) to facilitate adjusting the elevation of each trolley at time of installation.

System 236 depicted in FIGS. 1, 2A, and 2B with a two-wheel trolley 93*a* and track 84 is the most basic and economical solution to most of the objectives. Conveyor 60 can rotate freely on a path parallel to track 84 and tolerate unbalanced loads, fast turning speeds, quick stops, overfilling of bins, and other forces and loads without affecting the guidance along a path parallel to track 84. System 236 can serve a plurality of bins using less conveyors than traditional systems. In its simplest embodiment, as presented in FIGS. 1, 2A, and 2B, system 236 cannot move conveyor 60 between support legs of bins for reclaiming material from a bin. This limitation is addressed by additional embodiments, to be discussed later in FIGS. 11A-11D. A second limitation of the embodiment of system 236 presented in FIGS. 1, 2A, and 2B is that conveyor 60 can only serve bins in a radial path. This limitation is addressed in an alternative embodiment (FIGS. 3A-3E), also discussed later.

Operation: FIGS. 1, 2A, and 2B

Conveyor 60 is moved into place, preferably, with assembly 140, and adjusted accordingly so incoming end 72 and discharging end 74 are in adequate positions to convey material into or away from a selected destination. Assembly 140 is adjusted by moving track 84 along first trolleys 93*a*.

FIGS. 3A to 3E: Detailed Example Of Linear Track-And-Trolley Guided Conveyor The apparatus of track-and-trolley conveyor guidance system 238 depicted in FIG. 3A has a similar function as system 236 it overcomes a limitation of system 236 by allowing movement in a linear direction. Such an arrangement allows system 238 to serve bins that are arranged in a linear array. This apparatus can serve a plurality of bins by moving a conveyor linearly for distributing materials into or away from bins. Conveyor 60 of system 238 can move back and forth linearly on a track-and-trolley guide assembly. Four different guide assemblies 142, 144, 146, and 148 are shown in FIG. 3A to illustrate four different variations of trolleys 93*b*, 95, 102, 108 on a linear tubular track 81. All four of these assemblies 142, 144, 146, and 148 and the functions they employ are also applicable to the arcuate track of system 236. Assemblies 144, 146, and 148 are three variations of a two-wheel guide assembly that can be used on either a linear or an arcuate track. Assembly 142 has a first trolley 108 with three wheels 40*a*, 40*b*, and 40*c*. A linear guidance apparatus, such as system 238, are shown with two linear tracks 81 with each track 81 being a component at least one assembly 142, 144, 146, and/or 148. A more simple approach, not shown, is for one linear track with three trolleys to combine to create a guide assembly, but since two linear tracks are more practical for a conveying device that is what is depicted. Multiple assemblies 142, 144, 146, and 148 can share a common track 81 as shown in FIG. 3A. In this instance, at least two assemblies 142, 144, 146, or 148 are required with each guide assembly consisting of at least two trolleys 93*b*, 95, 102, or 108 that share a common track 81.

FIG. 3B is an enlarged isometric view of the area indicated by line 3B of FIG. 3A showing guide assembly 142. Assembly 142 comprises a three-wheel trolley 108 and track 81. Trolley 108 comprises a support bar 62, load bar 58, three wheels 40*a*, 40*b*, and 40*c*, and three wheel rods 42*a*, 42*b*, and 42*c*. These three wheels 40*a*, 40*b*, and 40*c* are spaced about 120° apart from each other around track 81. Wheels 40*a*, 40*b*, and 40*c* are tangent to track 81. Relative to track 81 wheel 40*a* is at about the 2 o'clock position, wheel 40*b* is at about the 6 o'clock position, and wheel 40*c* is at about the 10 o'clock position. Although trolley 108 requires one more wheel than two-wheel trolleys 93*a*, 93*b*, 95, and 102, I personally prefer a three-wheel trolley 108 as it more uniformly spreads the loads and forces onto track 81, or vise versa. The three wheels of trolley 108 do not have to have be evenly spaced 120° apart as a wide range of other configurations is possible. However, the 120° spacing of three wheels will generally divide the load or forces on to at least two wheels.

FIG. 3C is an enlarged isometric view of the area indicated by line 3C of FIG. 3A showing guide assembly 144. Assembly 144 comprises a two-wheel trolley 102 and track 81. Trolley 102 comprises a support bar 62, load bar 55, wheels 40*a* and 40*b*, and wheel rods 42*a* and 42*b*. These two wheels 40*a* and 40*b* are spaced 120° apart around tubular track 81. Wheels 40*a* and 40*b* are tangent to track 81. Wheel 40*a* is at the 4 o'clock position and wheel 40*b* is at the 8 o'clock position. Unlike trolleys 108, 93*a*, and 93*b*, assembly 144 does not provide a wheel arrangement that will retain track 81 on trolley 102 when conveyor 60 is subjected to all types of uneven loads or forces. However, for applications where it is not foreseen for conveyor 60 to encounter uneven loads or forces, assembly 144 is suitable as it divides the guidance and load between two wheels 40*a* and 40*b*. The angle of separation between wheels 40*a* and 40*b* of trolley 102 can vary from 60° to 160°.

FIG. 3D is an enlarged isometric view of the area in FIG. 3A indicated by line 3D of FIG. 3A showing guide assembly 146. Assembly 146 comprises a two-wheel trolley 95 and track 81. Trolley 95 comprises a support bar 62, load bar 53, wheels 40*a* and 40*b*, and wheel rods 42*a* and 42*b*. These two wheels 40*a* and 40*b* are spaced 90° apart around tubular track 81. Wheels 40*a* and 40*b* are tangent to track 81. Relative to track 81 wheel 40*a* is at about the 6 o'clock position and wheel 40*b* is at about the 9 o'clock position. Assembly 146 does not provide a wheel arrangement that will retain track 81 on trolley 102 when conveyor 60 is subjected to all types uneven loads or forces. However, wheel 42*b* is able to provide the greatest amount of linear guidance compared to other two-wheel trolleys 93*a*, 93*b*, 95, 102. The angle of separation between wheel 40*a* (at about the 6 o'clock position) and wheel 40*b* of trolley 95 can vary from 30° to 90°.

FIG. 3E is an enlarged isometric view of the area in FIG. 3A indicated by line 3E of FIG. 3A showing guide assembly 148. Assembly 148 includes a two-wheel trolley 93b and track 81. Trolley 93b comprises a support bar 62, load bar 51, wheels 40a and 40b, and wheel rods 42a and 42b. Its two wheels 40a and 40b are also spaced about 120° apart around tubular track 81. Wheels 40a and 40b are tangent to track 84. Wheel 40a is at about the 6 o'clock position and wheel 40b is at about the 10 o'clock position. Assembly 148 provides an obtuse angle between wheels arrangement that will retain track 81 on trolley 102 when conveyor 60 is subjected to uneven loads or forces like trolley 93b of system 146. The angle of separation between wheel 40a at the 6 o'clock position and wheel 40b of trolley 93b can vary from 91° to 179°. Assembly 148 is similar to assembly 140 except assembly 140 is for an arcuate track 84 and assembly 148 is for a linear track 81.

Another embodiment (not shown) allows two wheels to be spaced 180° apart on a tubular track. One wheel is located at about a 6 o'clock position and the second wheel is located at about the 12 o'clock position. The track support bar must connect to and extend out from the side of track instead of upward from the track, so the support does not interfere with trolley. The second wheel at the 12 o'clock position would provide for good linear guidance and hold against upward forces, but it would not provide significant strength against horizontal lateral forces on a linear track or radial forces on an arcuate track.

The conveyor guidance system depicted in FIGS. 3A to 3E, system 238, with two and three-wheel first trolley assemblies 142, 144, 146, and 148, is another basic and economical solution to most of the objectives of this invention. Conveyor 60 can freely move linearly on track 81 and, depending upon which assembly is used, conveyor 60 can tolerate various amounts of unbalanced loads, fast speeds, quick stops, overfilling of bins, and other forces and loads without affecting the guidance along a path parallel to track 81. A plurality of bins can be served with system 238, using fewer conveyors than traditional systems. An advantage with system 238 is its ability to move between support legs of bins for reclaiming material from a bin. The disadvantage with system 238 is that it can only move linearly due mainly to restrictions imposed by bin support legs.

Operation: FIG. 3A

Conveyor 60 is moved into place, preferably, with assemblies 142, 144, 146, and/or 148 and adjusted accordingly so incoming and discharging ends 72 and 74 are in adequate positions to convey material into or away from a selected destination. Conveyor 60 is moved along guide assemblies 142, 144, 146, and/or 148 into a position that aligns conveyor 60 with the desired incoming and discharging locations.

Figure 4A:
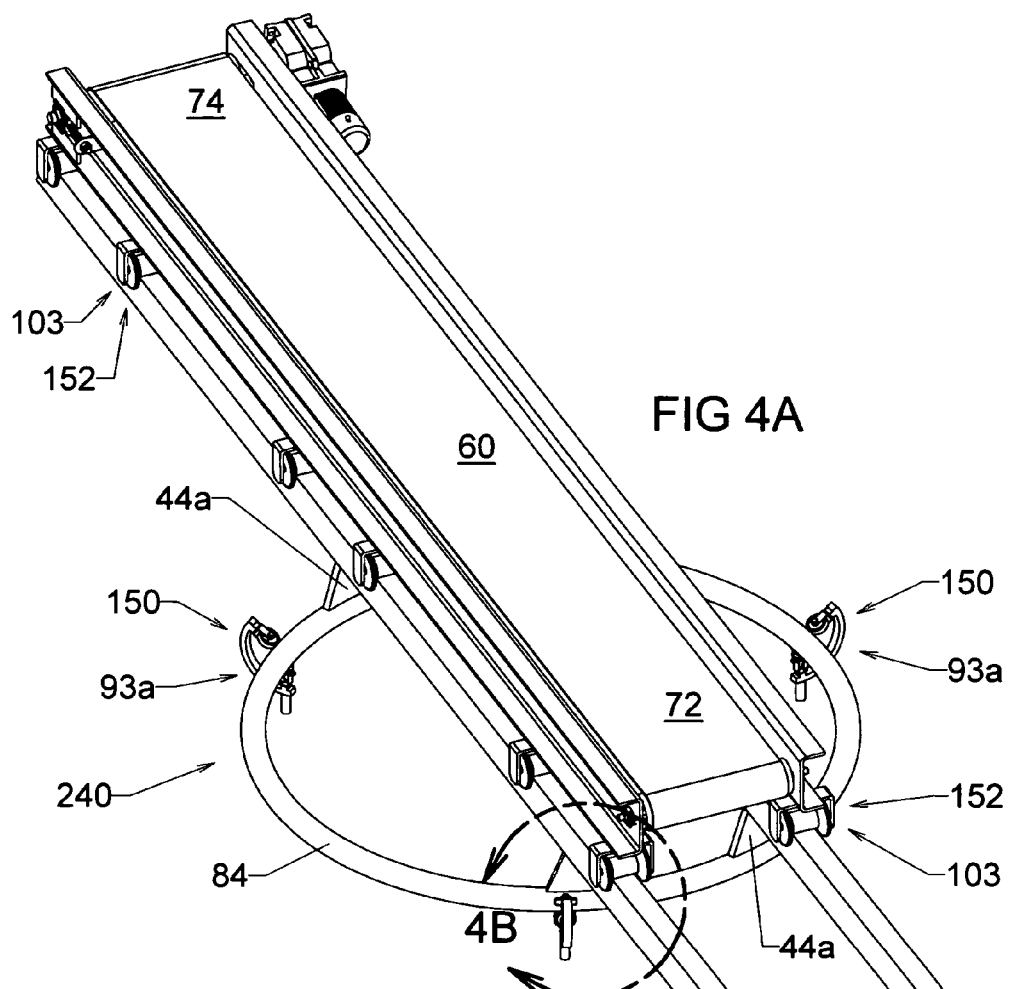
FIG. 4A is an isometric view of a conveying system according to the invention showing a multiple track-and-trolley system that has an arcuate guiding assembly with two wheeled trolley assemblies and a linear guiding assembly with one wheeled trolley assemblies, in a resting position.
Figure 4B:
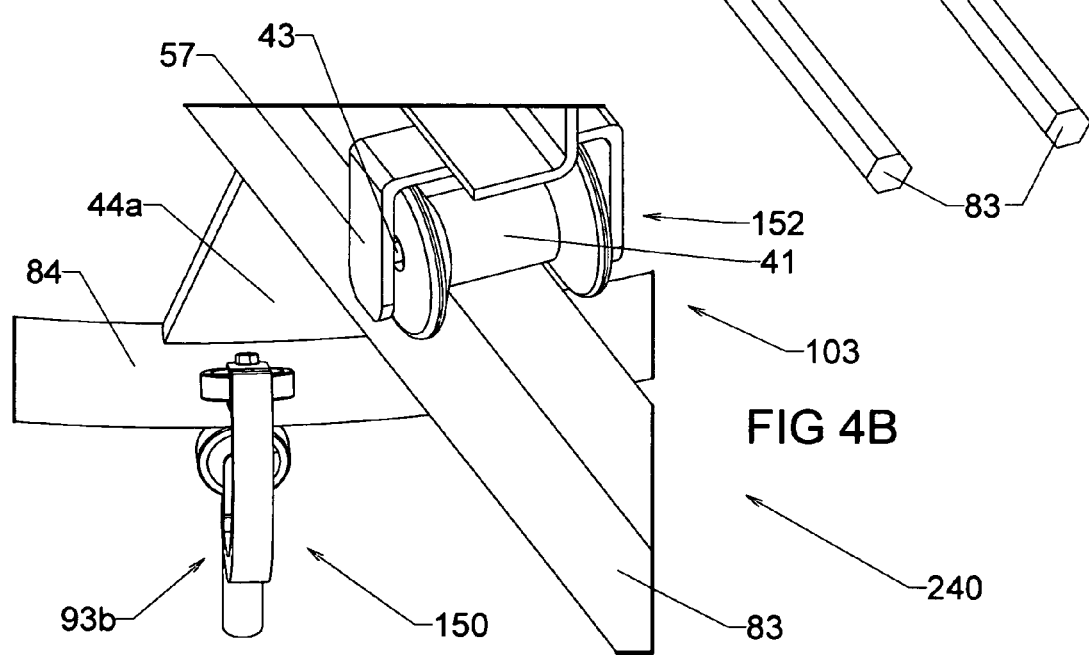
FIG. 4B is an enlarged isometric view of the area indicated by line 4B of FIG. 4A, to more clearly show the lower arcuate and upper linear guide assemblies.

FIGS. 4A and 4B: Detailed Example Of Dual Layer Conveyor Guidance System

FIG. 4A is an isometric view that shows a dual layer conveyor guidance system 240 that is created from mounting guide assembly 152 on to guide assembly 150. Assembly 150 is similar to assembly 140. Assembly 152 by itself is a perfect example of a prior art one-wheel shuttle conveying system. However, the mounting of a prior art one-wheel linear track-and-trolley to an assembly consisting of at least three two-wheel track-and-trolley assemblies creates a dual track-and-trolley configuration with radial and linear movement of conveyor 60. This apparatus can serve a plurality of bins by rotating a conveyor and moving a conveyor linearly for distributing materials into bins or away from bins.

If a two-wheel trolley (not shown) were used in place of trolley 93a in assembly 150, then the lack of ability to constrain track 84 to trolley 95 or 102 would limit how far conveyor 60 could move beyond arcuate track 84 without creating downward and upward forces that lift track 84 off of trolley 95 or 102. However, a trolley with at least two wheels arranged such as trolley 93b that confines movement of assembly 152 and conveyor 60 to a radial path parallel to arcuate track 84 allows conveyor 60 to shuttle linearly without disrupting the support and guidance provided by assembly 150.

Operation: FIGS. 4A and 4B

To use dual layer conveyor guidance system 240 shown in FIGS. 4A and 4B, conveyor 60 is moved into place, preferably, with lower and upper assemblies 150 and 152, and adjusted accordingly so incoming and discharging ends 72 and 74 are in adequate positions to convey material to a selected destination. Assembly 152 and conveyor 60 are moved along assembly 150 into a position that aligns conveyor 60 with the desired incoming and discharging locations. Conveyor 60 is then moved along assembly 152 to position discharging end 74 and incoming end 72 to the desired locations.

Figure 5A:
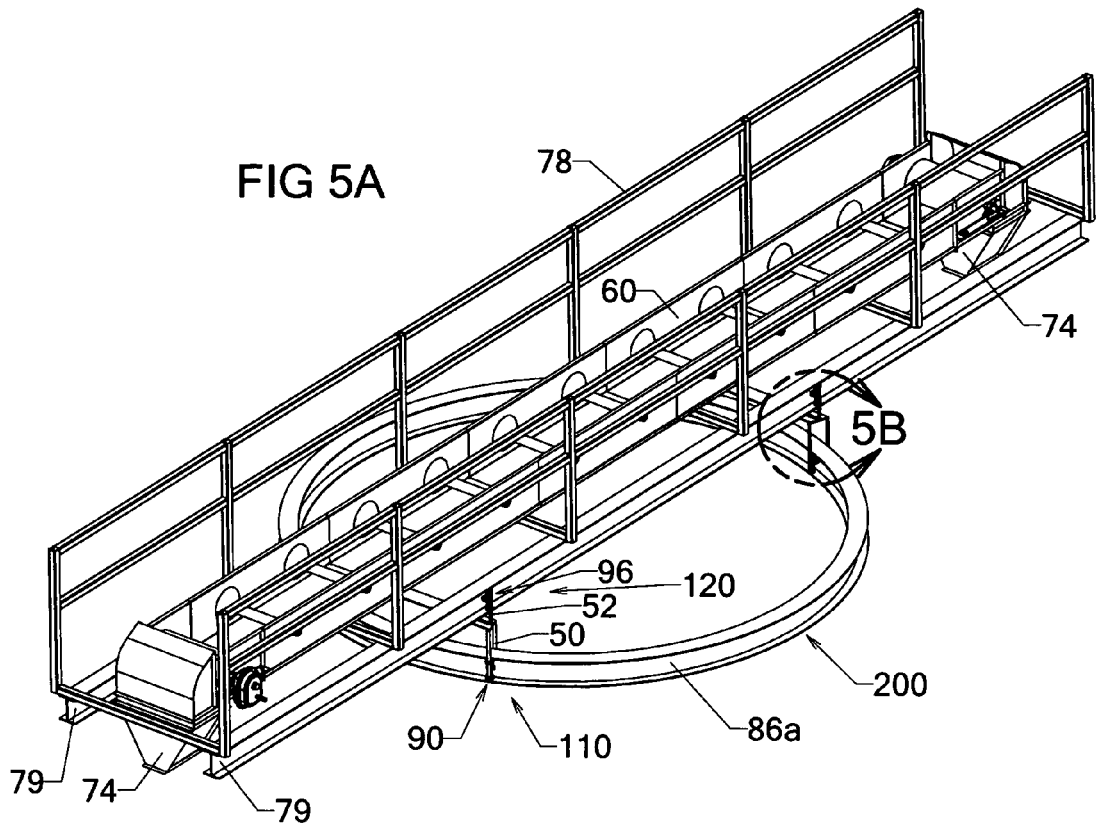
FIG. 5A is an isometric view of a conveying system according to the invention showing a dual layer track-and-trolley conveyor guidance system that combines an arcuate guiding system and a linear guiding system.
Figure 5B:
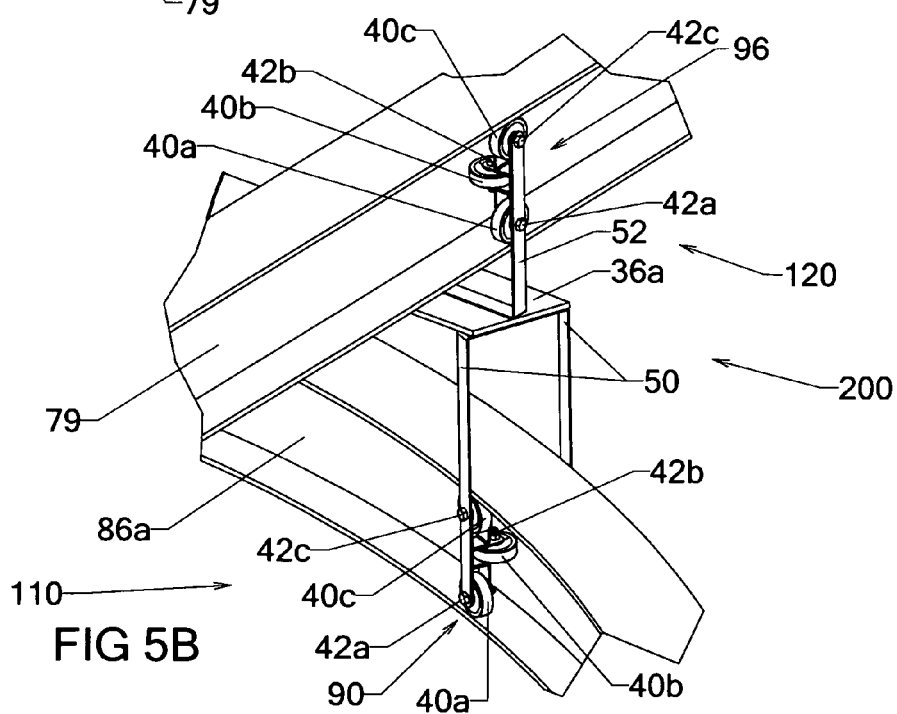
FIG. 5B is an enlarged isometric view of the area indicated by line 5B of FIG. 5A, to more clearly show the tracks and trolleys.

FIGS. 5A and 5B: Detailed Example Of Dual Layer Conveyor Guidance System

FIG. 5A is an isometric view of a dual layer conveyor guidance system 200 that consists of an arcuate and linear guide assemblies similar to system 240. However, in FIGS. 5A and 5B upper linear assembly 120 uses a second trolley 96 with three wheels so it can withstand loads or forces associated or not associated with the linear movement of conveyor 60 while maintaining guidance and support. This apparatus can serve a plurality of bins by rotating and moving a conveyor linearly for distributing materials into bins. Arcuate track 86a and linear track 79 each have an I-beam shape. FIG. 5A shows the components of lower assembly 110 and upper assembly 120. Lower assembly 110 comprises first trolley 90 mounted on lower arcuate track 86. Trolley 90 is guided by track 86a in a radial path. Assembly 120 comprises an upper linear track 79 mounted on second trolley 96. Conveyor 60 is attached to track 79 and shuttles along trolley 96. Trolley 96 guides linear track 79, and linear track 79 guides conveyor 60 in a linear direction. These guide assemblies 110 and 120 works in conjunction with each other to position discharge end 74 of conveyor 60 to the selected destination.

FIG. 5B is an enlarged isometric cut-out view of the area indicated by line 5B of FIG. 5A showing more clearly dual layer conveyor guidance system 200 and its components. First trolley 90 of lower assembly 110 comprises first load bar 50 and two pairs of three wheels 40a, 40b, 40c and three wheel rods 42a, 42b, 42c. Bar 50 in this example is a U shape with each end of bar 50 connected to a pair of three wheel rods 42a, 42b, 42c, which support three wheels 40a, 40b, 40c. Second trolley 96 of upper assembly 120 comprises second load bar 52 and two pairs of three wheels 40a, 40b, 40c and three wheel rods 42a, 42b, 42c. Bar 52 in this example is a U shape. Each end of bar 52 is pointed upwards and connects to a pair of three wheel rods 42a, 42b, 42c, which support three wheels 40a, 40b, 40c. Bar 52 of trolley 96 attaches to and is supported by bar 50 of trolley 90, thus connecting trolleys 90 and 96 and assemblies 110 and 120 to each other.

As shown in FIG. 5B, as a component of assembly 110 and trolley 90, wheel 40a makes contact with or is tangent to the lower, generally horizontal portion of arcuate track 86a. Its wheel rod 42a is generally perpendicular to the axis of arcuate track 86a. A second wheel 40b makes contact with or is tangent to the generally vertical portion of arcuate track 86*a*. Wheel rod 42*b* is parallel to the axis of track 86*a*. A third wheel 40*c* makes contact with or is tangent to the upper portion of track 86*a* with its wheel rod 42*c* perpendicular to the axis of track 86*a*. As a component of assembly 120 and trolley 96, wheel 40*a* makes contact with or is tangent to the lower, generally horizontal portion of linear track 79. Its wheel rod 42*a* is generally perpendicular to a portion of linear track 79. A second wheel 40*b* makes contact with or is tangent to the generally vertical portion of track 79. Wheel rod 42*b* is generally perpendicular to a portion of track 79. A third wheel 40*c* makes contact with or is tangent to the upper portion of track 79 with its wheel rod 42*c* is generally perpendicular to a portion of track 79.

Figure 6:
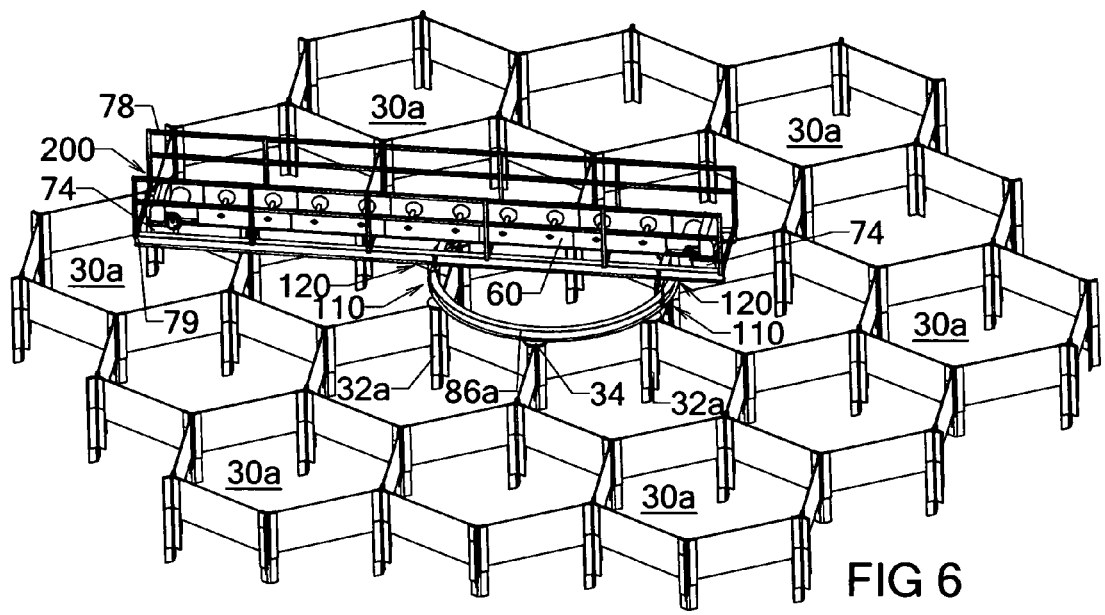
FIG. 6 is an isometric view showing the conveying system of FIG. 5A above shared wall polygonal bins.
Figure 7:
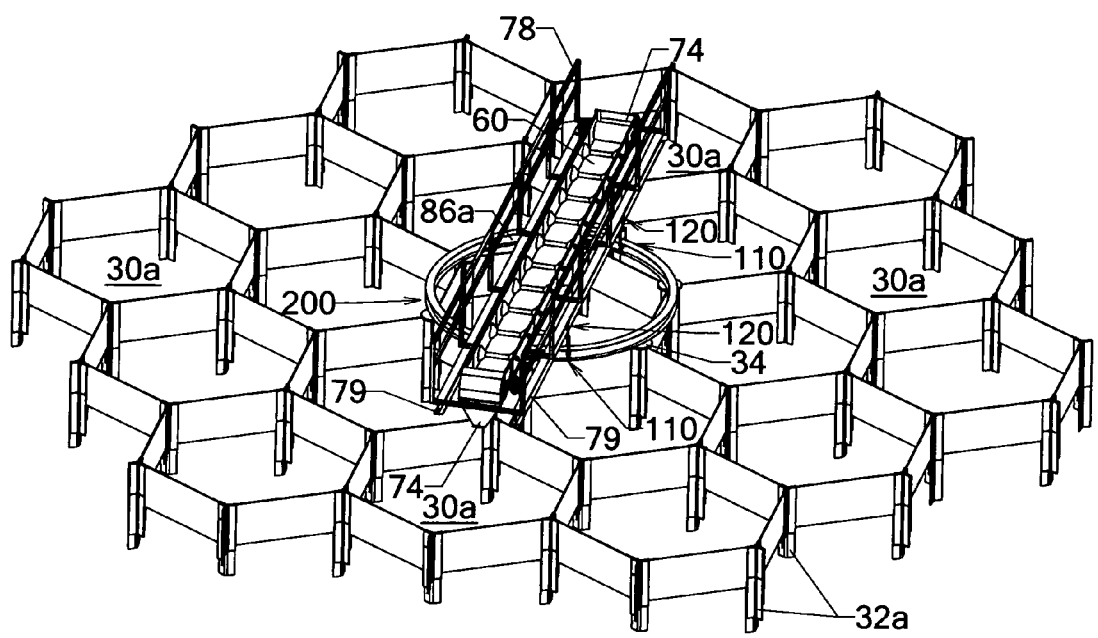
FIG. 7 is an isometric view showing the conveying system of FIG. 6 rotated about 90 degrees and retracted over a bin.

FIGS. 6 and 7: Dual Layer Track-And-Trolley Conveyor Guidance System

FIGS. 6 and 7 illustrate the embodiment of a dual layer track-and-trolley conveyor guidance system 200. This apparatus can serve a plurality of bins 30*b* by rotating and moving a conveyor linearly for distributing materials into bins 30. Conveyor guidance system 200 comprises a lower arcuate guide assembly 110 supporting and guiding an upper linear guide assembly 120 that is attached to a conveyor 60. A lower arcuate track 86*a* is stationary and anchored to a bin supporting means, such as a column 32*a* and/or a column cap 34. Lower assembly 110 comprises a first trolley 90 mounted on track 86*a*. Upper assembly 120 comprises a second trolley 94 mounted on a linear track 79. Conveyor 60 is mounted to an upper linear track 79. Assembly 120 is mounted on top of assembly 110. Assembly 110 supports conveyor 60, upper track 79, and trolley 94. Conveyor 60 and the assembly 120 are guided in a radial path along track 86*a*. Assembly 120 supports conveyor 60 and guides conveyor 60 in a linear path along track 82*a*. These upper and lower guide assemblies 120 and 110 move conveyor 60 in radial and linear paths to position a discharge end 74 of conveyor 60 to a designated location for filling any bin 30*a*, or to position an incoming end 72 of conveyor 60 to a designated location for receiving materials. End 72 of conveyor 60 can be a location anywhere along the length of conveyor 60 prior to discharge end 74. Discharge end 74 discharges material from conveyor 60.

FIG. 6 shows the conveying system in a position ready to fill an underlying bin 30*a*. FIG. 7 shows conveyor 60 in a new position, rotated about 90 degrees from its position in FIG. 6 and moved linearly to a bin 30*a* that is ready to be filled. While means of powering movement along the tracks are not shown, I presently prefer one motor for linear movement and another for rotational movement.

In the embodiments of FIGS. 6 and 7, the horizontal length of conveyor 60 is slightly less than the collective radius of the bin cluster. Conveyor 60 is reversible, or bi-directional, in the example, so it has two discharging ends 74, but only one discharge end is required. Only one discharge end 74 can be used at a time, since conveyor 60 conveys material in one direction at a time. In this example, conveyor 60 is in a fixed horizontal plane and cannot incline. Alternatively, conveyor 60 can incline or incline with a plurality of conveyors in a stacked arrangement to extend the reach of conveyance, which will be discussed later.

As seen in FIGS. 6 and 7, linear tracks 79 are about the same length as conveyor 60. Alternatively, tracks 79 can be significantly shorter than conveyor 60, such that discharge end 74 of conveyor 60 can extend beyond the end of tracks 79 as will be shown later. In such instances, the weight of the product being conveyed, along with the weight of the equipment (not shown), can be counterbalanced. Or, tracks 79 can be significantly longer than conveyor 60, as shown later in FIG. 8A.

Operation: FIGS. 6 and 7

System 200 is shown in a resting position in FIG. 6, before it is moved to convey materials into bin 30*a* in FIG. 7. In FIG. 7, conveyor 60 of FIG. 6 has been rotated 90° along arcuate track 86*a*, and conveyor 60 is extended along linear track 79 until discharge end 74 is positioned above bin 30*a*. Conveyor 60 is now ready to receive product (such as grain, minerals, or ingredients) from a feed system (not shown) and convey materials to bin 30*a*. The feed system can have any suitable configuration, such as another conveyor, bucket elevator, down spouting, or process equipment. Generally, the feed system will not send material to conveyor 60 until conveyor 60 is in a resting position ready to feed bin 30*a*.

When using a reversible conveyor, such as the one shown in FIGS. 6 and 7, conveyor 60 need rotate only 180° or less to be able to access any given bin 30*a* within the cluster. If a non-reversible, or uni-directional, conveyor is used, then it will need to rotate about 360 degrees.

To use system 200 shown in FIGS. 6 and 7 for distribution, it must first be determined which bin 30*a* is to be filled. Conveyor 60 is moved into place, preferably, with guide assemblies 110 and 120, and adjusted accordingly so incoming end 72 and discharging end 74 are in positions adequate to convey material into selected bin 30*a* or convey the material along the length of conveyor 60 to a selected destination. Assembly 120 and conveyor 60 are moved along assembly 110 into a position that aligns conveyor 60 with the desired incoming and discharging locations. Conveyor 60 is then moved along assembly 110 to position discharging end 74 and incoming end 72 to the desired locations.

Bin

Storage bins 30*a* all have hexagonal cross sections and shared walls with the adjacent bins. The track-and-trolley conveyor guidance systems shown in this disclosure can be employed with a wide array of storage systems. Instead of shared-wall bins that are of polygonal shapes, such as square, rectangular, hexagonal, or octagonal, and as shown later, the configurations of bins can be a plurality of individual round bins 30*b* and 30*c* or storage silos. Bins 30*a*, 30*b*, and 30*c* can be stationary or can be easily relocated. Bins 30*a*, 30*b*, and 30*c* can represent bulk silos, bottles, overseas shipping containers, dump bins, hoppers, receptacles, or a sealable package. Bins 30*a*, 30*b*, and 30*c* can also represent process equipment or another method of conveyance that needs to receive incoming material from a conveying system or discharges material into a conveying system. Further, bins 30*a*, 30*b*, and 30*c* can represent a workstation or a location where a box or piece is distributed to or reclaimed away from. Thus, bins 30*a*, 30*b*, and 30*c* represent any type of container, storage bin or device, method of conveyance, location, work area, or process equipment that can be fed material, or that can dispense material.

Column and Column Cap

Column 32*a* (FIGS. 6 and 7) is the structural support and stability for lower arcuate tracks 86 and, as will be discussed later, lower linear tracks 79. Column cap 34 has an auxiliary function of increasing the surface area for lower tracks 86*a* to rest upon when they connect to column 32*a*. In the absence of columns 32*a* and caps 34, conventional supporting means such as a roof of bin 30a can be used. As will be shown later, 32b, 32c, and 32d are variations of column support.

Catwalk

As seen in FIGS. 5A, 6, and 7, catwalk 78 is optionally attached to conveyor 60 for maintenance and service access. Catwalk 78 may be not required when conveyor 60 is easily and safely accessible.

Wheels

Wheels 40a, 40b, and 40c shown in FIG. 2B and later, and wheel 41 shown in FIG. 4B and later, all serve similar purposes. These wheels are used as means of guidance on tracks 81, 83, 84, and 86a, and, as shown later, on tracks 79, 80, 82, 86b, 86c, 86d, 86e, 86f, 87a, 87b, 88a, 88b and 89. Also, these wheels must support and transmit the loads and forces imposed upon them by conveyor 60, and as shown later, on groups of conveyors. Weight loads and other forces can also be imposed on wheels 40a, 40b, 40c and 41 from radial, or linear, or both radial and linear movement of individual conveyors 60, groups of conveyors, or assemblies 110, 120, 140, 142, 144, 146, 148, 150, and 152, and, as shown later, on assemblies 112, 114, 122, 124, 126, 128, 130, 132, 134, 136, 138, 154, 156, 158, 160, and 162, to position incoming and discharging ends 72 and 74.

Wheels 40a, 40b, 40c and 41 must also reduce friction between tracks and trolley assemblies during guidance and transmittal of weight loads and forces. These wheels will generally be rounded, circular, or spherical. Also the wheels will generally have a hole at their central axes. Wheel rods 42a, 42b, 42c or 43 are inserted into the holes of wheels 40a, 40b, 40c and 41 to hold these wheels in position while allowing them to turn freely or spin around the rods. Also the wheels can be shaped to fit corrugations or grooves of tracks as illustrated with wheel 41 and track 83. The wheels can have a bearing to reduce friction and increase durability. The wheels can be powered to create movement to trolleys. Furthermore, the wheels can have a brake mechanism to control or stop movement of the trolleys and can be of various sizes and shapes to accommodate tracks of various sizes and shapes. While means of powering movement along the tracks are not shown, I presently prefer one motor for linear movement and another for rotational movement.

A one-layer guide assembly like that shown in systems 236 and 238 require at least two wheels 40a and 40b to have contact with tracks 81 or 84. If there is more than one layer of guide assemblies like that shown in system 240, then at least two wheels 40a and 40b have to be in contact with lower track 84. However, only one wheel 41 is required to be in contact with the uppermost track 83 when it is a component of uppermost guide assembly 152. The wheels will generally range from 30° to 120° apart from each other. Wheels 40a, 40b, 40c and 41 can have grooves or gears built into the surface to assist with movement or transmission of energy to tracks. The wheels can also have a friction surface or comprise a bull gear, bevel gear, miter gear, or pinion gear.

Load Bar

Bars 50 and 52, shown in FIG. 5B, and as will be shown later, connect three wheels 40a, 40b, and 40c with wheel rods 42a, 42b, and 42c. In FIGS. 2B, 3C, 3D, and 3E, bars 51, 53, and 55 connect two wheels 40a and 40b with wheel rods 42a and 42b. Bar 57 of FIG. 4B connects one wheel 41 with wheel rod 43. The bars can connect many variations of wheels 40a, 40b, 40c and 41 and wheel rods 42a, 42b, 42c and 43 to create trolleys 90, 93a, 93b, 95, 96, 102, and 103, and as will be shown later, trolleys 91, 92, 94, 97, 98, 99, 100, 101, 104, 105, 106, 107, and 108.

Bars 50, 51, 52, 53, 55, 57 and bars 54 and 56 that will be discussed later, all serve the purpose of transmitting loads and forces to another component of the trolleys. The bars and wheel rods 42a, 42b, 42c and 43, hold wheels 40a, 40b, 40c and 41 tangent to track. The bars can be of any configuration or shape required to support the weight loads and transmit the forces imposed upon them. The bars can be U-shaped or straight. Typically, the bars will be made from fabricated steel, or cast iron, but any material, such as metal, composite or plastic that can support and transmit the loads can be used.

Wheel Rods 42a, 42b, 42c and 43 will generally be a connection pin or shaft. The rods can allow the wheels to rotate or spin freely. Or, the rods can be fastened directly to wheels. The rods can either maintain wheels in a fixed position or the rods can allow wheels to swivel on bars. The rods must be designed to support and transmit all weight loads and forces transmitted to them from wheels, or bars. The rods within the same trolley will generally range from 30° to 120° apart. Wheel 40c is generally needed only for unbalanced loads or forces, as illustrated by trolley 90 of FIGS. 6 and 7.

Tracks

Tracks 81 (FIG. 2A) and track 84 (FIGS. 3A to 3E) are illustrated as a tubular. Track 83 (FIG. 4A and 4B) is shown as a track with a hexagonal cross-section to illustrate that the track can have a shape that corresponds to the wheel being used to maximize the guidance and load capacity capabilities. Track 86a (FIG. 5B) and tracks 79, 80, 82, 86b, 86c, 86d, 86e, 86f, 87a, 87b, 88a, 88b and 89 (shown later) are illustrated as standard I-beam style. Track 82 (FIGS. 5A, 5B, 6, and 7) is illustrated as a C-beam. Any suitable standard configuration can alternatively be used for tracks. For example, flat bar, C-beam, I-beam, L-beam, double-channel, enclosed tubular, bolted angle, pipe, formed tubular, and T-track are suitable for tracks. The C-beam and I-beam provides three separate planes or surfaces, lower horizontal, upright vertical, and upper horizontal, on which wheels 40a, 40b, or 40c can make contact.

Tracks 79, 80, 82, 86a, 86b, 86c, 86d, 86e, 86f, 87a, 87b, 88a, 88b and 89 all serve similar purposes. Tracks are used to guide trolleys 90, 93a, 93b, 95a, 96, 102, 103, and 108, and as shown later, trolleys 91, 92, 94, 95b, 97, 98, 99, 100, 101, 102, 103, 104, 105, 106, and 107. The tracks also support and transmit the loads and forces imposed upon them by conveyors 60, and conveyor groups (shown later) 67, 68, 69, and 70, and other guide assemblies. Weight loads and forces might also be imposed from the movement of individual or any combination of conveyors 60, conveyor groups 67, 68, 69, and 70, guide assemblies 110, 120, 140, 142, 144, 146, 148, 150, and 152 and as shown later guide assemblies 112, 114, 122, 124, 126, 128, 130, 132, 134, 136, 138, 154, 156, 158, 160, and 162.

Linear tracks 79, 81, and 83, and, as shown later, tracks 80 and 82 are intended to guide or be guided by trolleys in a linear movement along tracks. Arcuate tracks 82, 84, and 86a, and, as shown later, arcuate tracks 86b, 86c, 86d, 86e, 86f, 87a, 87b, 88a, 88b, and 89 guide or are guided by trolleys in radial movement along tracks. Tracks 79, 80, 81, 82, 83, 84, 86a, 86b, 86c, 86d, 86e, 86f, 87a, 87b, 88a, 88b, and 89 provide surfaces conducive for contact with wheels 40a, 40b, 40c or 41 of trolleys. Thus, tracks are to provide contact guidance and transmittal of loads and forces from or to wheels of trolleys.

The C-beam and I-beam tracks have a lower generally horizontal portion for contact with first wheel 40a. These tracks have a generally upright portion for contact with second wheel 40b. These tracks have an upper generally horizontal portion for contact with third wheel 40c. The lower horizontal surface of tracks is tangent to wheel 40a. Arcuate tracks have an imaginary center axis, which is typically perpendicular to wheel rod 42a and 42c. Linear tracks have a vertical portion that is typically perpendicular to the central axis of wheel rods 42a and 42c. The generally upright portion of these tracks is tangent to wheel 40b. The generally vertical portion of linear tracks is parallel to wheel rod 42b. The upper horizontal surface of these tracks is tangent to wheel 40c.

Lower tracks of a multiple layer conveyor guidance system are the main load-bearing tracks. FIGS. 6 and 7 show track 86a supported directly by portions of the underlying multiple bin array, namely load-bearing columns 32a with caps 34. Struts (not shown) can be added where required. Other track support means are possible. For example, the tracks can be suspended from above, as will be discussed elsewhere, or supported by other suitable means, such as structural columns, with or without struts, that are independent of the underlying bin array. Tracks can also be mounted on the roof of bins 30a.

Tracks can have grooves or gears built into the surface to assist with movement or transmission of energy to wheels. Tracks can also have a friction surface for contact with wheels.

Conveyors

Conveyor 60 (FIGS. 5A, 6, and 7) preferable is a belt conveyor. Alternatively, conveyor 60 can be of the standard screw, belt, drag-chain, roller, or other mechanical types. However, belt conveyors provide more complete product cleanout. Consequently, belt-type conveyors are usually preferable, especially if reducing cross-contamination is a priority. Belt-type conveyors also generally have a lower height requirement. When a more elaborate conveying system is required, such as a screw conveyor for semi-free flowing materials, the track-and-trolley conveyor guidance system will reduce the cost of the project, by reducing the amount of expensive conveyance required.

Trolleys

Trolleys 90, 93a, 93b, 95a, 96, 102, 103, and 108, and as will be discussed later, trolleys 91, 92, 94, 95b, 97, 98, 99, 100, 101, 102, 103, 104, 105, 106, and 107 all serve similar purposes. The trolleys are used as guidance for, or are to be guided by, the tracks. They are also intended to support and transmit the loads and forces imposed upon them by conveyors 60, the tracks, and the trolleys. Weight loads and other forces can also be imposed on trolleys from the radial and/or linear movement of individual conveyors or any combination of conveyors, tracks, and trolleys to position incoming and discharging ends 72 and 74 to designated locations.

Trolleys 90, 91, 92, 93a, 93b, 94, 95a, 95b, 96, 97, 98, 99, 100, 101, 102, 103, 104, 105, 106, 107, and 108 move linearly or radially along a path parallel to tracks. The purpose of the trolleys is to provide contact guidance and transmittal of loads and forces to tracks so one or more conveyors 60 can be moved to fill one or more bins 30a or remain in position while one or more conveyors 60 are moving material into bins 30a.

In the examples provided, the components of trolleys are comprised of wheels that each connects to wheel rods that connects to a bar. Wheels of trolleys are arranged so the contact point for each wheel remains tangent to its respective track. Trolleys are shown with one, two, three, and six wheels. For reasons of economy, trolleys have multiple wheels attached to bars. In a less economical alternative, each bar can each have one wheel to create a one-wheeled trolley, of which two or more of these trolleys can serve the same function as one multi-wheeled trolley. Load bar, or a load plate 36a is required to tie these independent trolleys together. There are instances where it is advantageous to add a single-wheeled trolley for additional load or force support.

There are numerous possible combinations of trolleys and tracks that can be used for the guide assemblies. These assemblies can have various configurations of wheels and wheel rods, such as various sized wheels, cam bearings, rollers, guides, connection pins, number of wheels and wheel rods, and so on.

Trolleys can be powered, or they can be moved manually along the track. Wheels of trolleys can be powered (not shown). Trolleys can have a separate power system (not shown) to provide movement on tracks. Such power systems can be electrical, pneumatic, or hydraulic. Trolleys can have a brake system to stop or control movement on tracks.

The diameter of arcuate track 86a (FIGS. 6 and 7) is much smaller than the collective diameters of the bin cluster in the example. Consequently, trolleys 90 and 96 are designed to prevent conveyor 60 and guide assemblies 110 and 120 from derailing due to potentially severely unbalanced loads. A multi-wheel trolley assembly, such as trolleys 90 and 96 (FIG. 5B), is usually sufficient to prevent such a calamity. Multiple wheels 40a, 40b, and 40c in trolleys 90 and 96 are used to restrict freedom of movement to a path along tracks 79 and 86a. Multiple wheels 40a, 40b, and 40c in trolleys 90 and 96 allow the guidance system to withstand loads and forces beyond downward load bearing, such as radial, lateral, upward, or uneven downward forces. Other trolley assemblies or methods can be engineered to withstand the weight of the equipment and the product being conveyed, while preventing conveyor 60 from tipping off the track system.

Figure 8A:
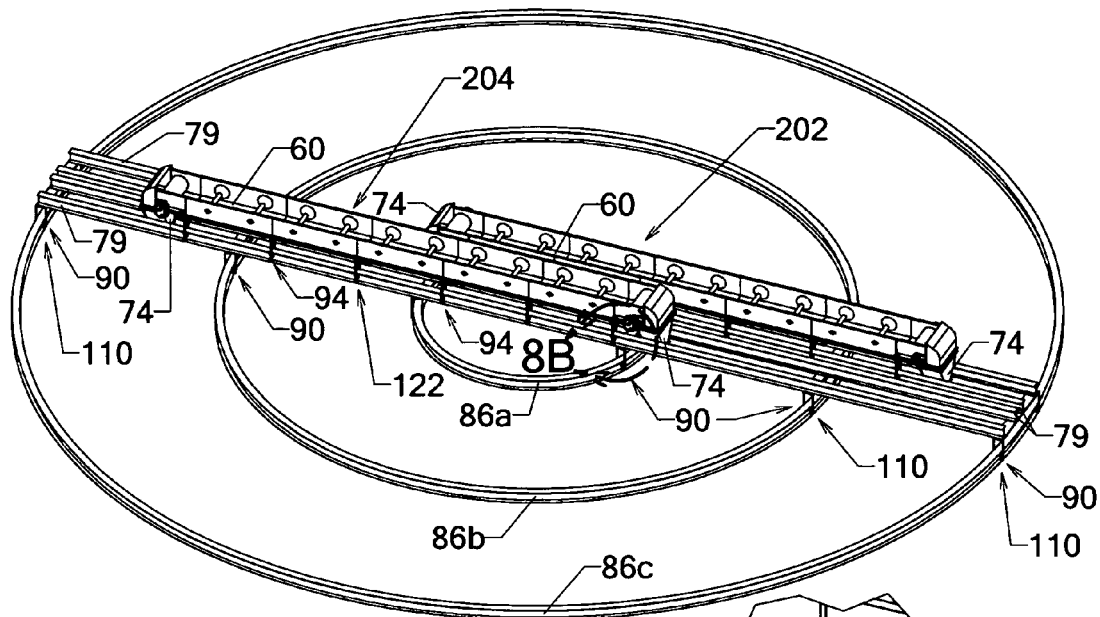
FIG. 8A is an isometric view showing an additional embodiment, which differs from that in FIGS. 5-7 in that it has multiple concentric arcuate tracks, two linear guiding systems and corresponding conveyors, and a different trolley system.
Figure 8B:
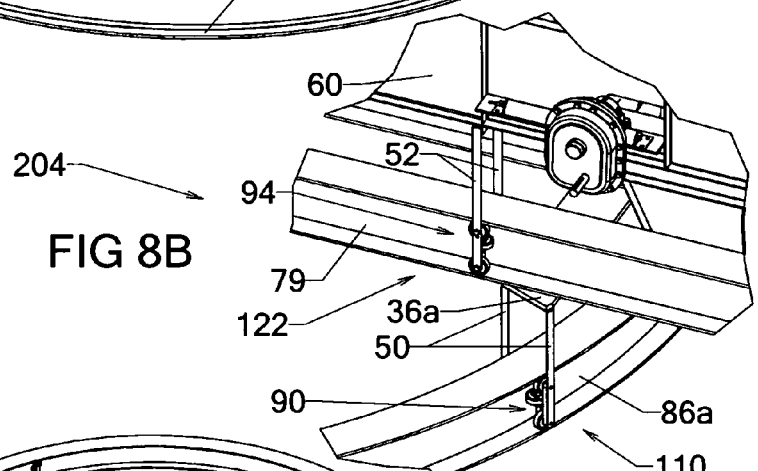
FIG. 8B is an enlarged isometric cut-out view of the area indicated by line 8B of FIG. 8A that more clearly shows the upper track-and-trolley assembly with a reverse arrangement compared to FIG. 5B.

Additional Embodiment—FIGS. 8A and 8B: Multiple Tracks And Multiple Conveyors

FIG. 8A shows two systems 202 and 204 that can operate simultaneously on multiple concentric tracks 86a, 86b, and 86c. Concentric tracks 86a, 86b, and 86c can be added, if additional support or balancing of linear track 79 or conveyor 60 is needed. In general, the number of concentric arcuate tracks can range from one to several, depending upon the type of track used, the weight of items to be conveyed, and the distance that items will be conveyed, as will be discussed elsewhere. In this example, linear tracks 79 extend about the full diameter of outermost concentric arcuate track 86c.

Conveyor guidance systems 202 and 204 each comprise a lower guide assembly 110 supporting and guiding an upper linear guide assembly 122 that is attached to a conveyor 60. Lower tracks 86a, 86b, and 86c of assembly 110 are stationary and anchored to a bin supporting means, such as a column and/or column cap. Assembly 122 comprises a second trolley 94 mounted on a linear track 79. Conveyor 60 is mounted to bar 52 of trolley 94. Assembly 122 is mounted on top of lower arcuate assembly 110. Conveyor 60 and assembly 122 are guided in a radial path along tracks 86a, 86b, and 86c. Assembly 120 supports conveyor 60 and guides conveyor 60 in a linear path along track 79. These upper and lower guide assemblies 122 and 110 move conveyor 60 in radial and linear paths to position a discharge end 74 of conveyor 60 to a designated location for filling any bin, or to position an incoming end 72 of conveyor 60 to a designated location for receiving materials. Incoming end 72 of conveyor 60 can be positioned anywhere along the length of conveyor 60 prior to discharge end 74.

As also shown in FIG. 8A, more than one conveyor and linear track system can be incorporated on the same arcuate track system. System 204 and its associated embodiments, such as linear track system, conveyor 60, or both, are arranged in parallel to system 202. Thus, more than one bin can be filled simultaneously.

FIG. 8B is an enlarged isometric cut-out view of the area indicated by line 8B of FIG. 8A. Second trolley 96 of upper assembly 122 comprises second load bar 52 and two pairs of three wheels 40a, 40b, 40c and three wheel rods 42a, 42b, 42c. Bar 52 in this example is a U shape. Each end of bar 52 is pointed downward and connects to a pair of three wheel rods 42a, 42b, 42c, which support three wheels 40a, 40b, 40c. As a component of assembly 122 and trolley 96, wheel 40a makes contact with or is tangent to the lower, generally horizontal portion of linear track 79. Its wheel rod 42a is generally perpendicular to a portion of linear track 79. A second wheel 40b makes contact with or is tangent to the generally vertical portion of track 79. Wheel rod 42b is generally perpendicular to a portion of track 79. A third wheel 40c makes contact with or is tangent to the upper portion of track 79 with its wheel rod 42c is generally perpendicular to a portion of track 79.

In assembly 122, conveyor 60 is attached to track 79 that shuttles along trolley 96. In assembly 122, however, trolley 96 attaches to conveyor 60 (or conveyor 60 with catwalk 78, not shown) and is mounted on track 79 so that conveyor 60 and trolley 96 shuttle along track 79. Load plate 36a is optionally mounted on load bar 50. Track 79 is mounted on load plate 36a or (not shown) on bar 50, thus connecting trolleys 90 and 96 and assemblies 110 and 122 to each other.

Operation: FIG. 8A

In FIG. 8A, each conveyor 60 is operated according to the same general principles previously discussed for FIGS. 6 and 7, except that consideration must be given for two systems 202 and 204 that each have at least one conveyor 60. When using a reversible conveyor, such as the one shown in FIG. 8A, conveyors 60 need rotate only 1800 or less to be able to access any given silo within a cluster of silos.

To use systems 202 and 204 shown in FIG. 8A for distribution, it must first be determined which bin is to be filled. Each conveyor 60 of systems 202 and 204 is moved into place, preferably, with assemblies 110 and 122, and adjusted accordingly so incoming and discharging ends 72 and 74 are in positions sufficient to convey material into one or more selected bins or convey the material along the lengths of the conveyors to one or more selected destinations. Assembly 122 and conveyor 60 are moved along assembly 110 into a position that aligns conveyor 60 with the desired incoming and discharging locations. Conveyor 60 is then moved along assembly 122 to position discharging and incoming ends 72 and 74 to the desired locations.

Figure 9:
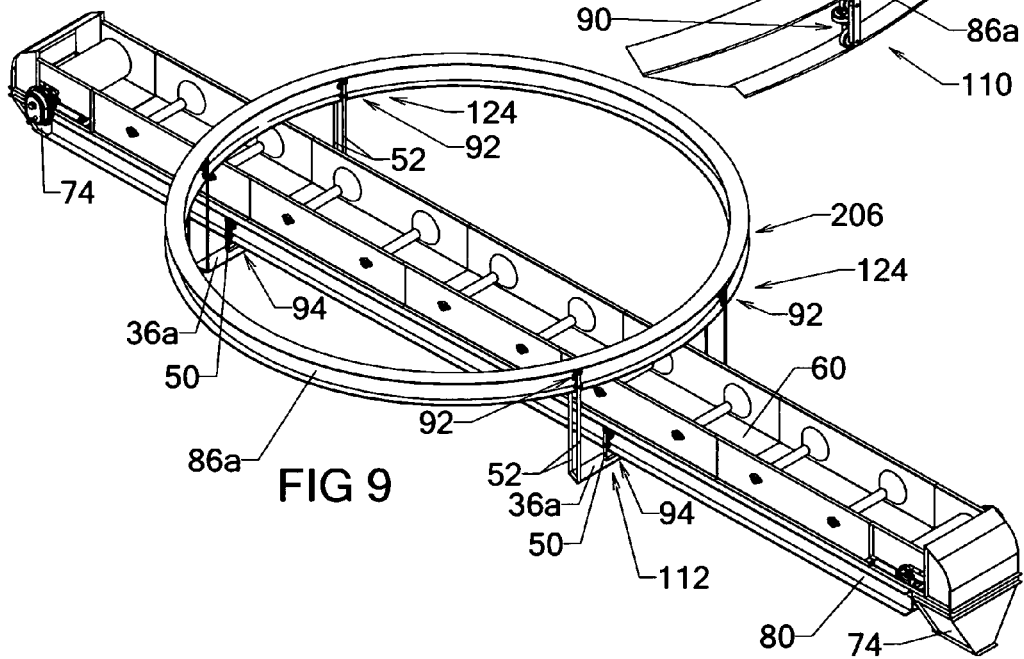
FIG. 9 is an isometric view showing an additional embodiment, which differs from that in FIGS. 5-7 in that linear tracks are suspended from the arcuate track.

FIG. 9: Conveyor Guidance Suspended from Roof

In another embodiment, shown as system 206 in FIG. 9, track 86a can be suspended from above, such as from roof rafters (not shown), with linear tracks 80 of assembly 112 suspended below arcuate track 86a of assembly 124. The arrangement of trolley 94 differs slightly from previously described trolley 90 in that bars 50 are inverted to support trolley 94, linear track 80, and conveyor 60 below arcuate track 86a. Such track-and-trolley guide assemblies and conveyor guidance systems can vary, depending upon the location and operational requirements, and so the embodiment is not limited to the example shown here.

A suspended embodiment, like the one shown in FIG. 9, can exist alone or co-exist in the same structure with other embodiments such as those shown in FIGS. 6, 7, and 8A. This suspended variation can also be used alone or at the same time as the preferred embodiment previously discussed, to fill more than one bin simultaneously. In such a suspended system, telescoping spouts (not shown) with adequate length to reach underlying bins may be required at discharge end 74 of conveyor 60. The suspended system can be fed by a feeding system that is the same or different from that feeding the first system.

Operation: FIG. 9

In FIG. 9, conveyor 60 is operated with the same general principles as previously discussed for FIGS. 6 and 7, except that consideration must be given if system 206 co-exists with another system (not shown). When using a reversible conveyor, such as the one shown in system 206, conveyor 60 need rotate only 180° or less to be able to access any given silo within a cluster of silos. System 206 operates similarly to that of system 200.

FIGS. 10A, 10B, and 10C: Arcuate Inclinable and/or Stackable Distribution Systems FIGS. 10A, 10B, and 10C illustrate an additional embodiment with conveyor guidance systems 208 and 210. These apparatuses serve a plurality of bins 30b by each rotating and linearly moving one or more conveyors 60 for distributing materials into one of bins 30b. System 208 has a single conveyor 60 that can adjust in angle, making it inclinable. System 210 is composed of a group of conveyors 60 that can be inclinable, partially or fully extended, and stacked, to form conveyor group 70. In this example, both conveyor 60 of system 208 and conveyor 70 of system 210 can be inclined and can vary the elevation of incoming end 72 and discharging end 74 of any of conveyors 60.

Conveyor guidance systems 208 and 210 each comprise a lower arcuate guide assembly 110 supporting and guiding an upper linear guide assembly 126 or 128 that supports and guides an inclinable conveyor 60. Lower arcuate tracks 86a, 86b, and 86c are stationary and anchored to a supporting means, such as column 32b with column cap 34. Assembly 126 comprises a track 82 mounted on a second trolley 99. Assembly 128 comprises a linear track 82 mounted on a second trolley 101. Conveyor 60 is mounted to track 82 of trolley 99 or 101. Assembly 126 or 128 is mounted on top of assembly 110. Conveyor 60 and assembly 126 or 128 are guided in a radial path along tracks 86a, 86b, and 86c. Assembly 126 or 128 supports conveyor 60 and guides conveyor 60 in a linear path along track 82. These upper and lower guide assemblies 126 or 128 and 110 move conveyor 60 in radial and linear paths to position a discharge end 74 of conveyor 60 to a designated location for filling any bin 30b, or to position an incoming end 72 of conveyor 60 to a designated location for receiving materials.

FIG. 10B is an enlarged isometric cut-out view of the area indicated by line 10B of FIG. 10A showing more clearly the two layers of guide assemblies 110 and 126 that comprise guidance system 208 and its components. Trolley 99 of upper assembly 126 comprises an adjustable load bar 56, pivot point 38, three wheels 40a, 40b, and 40c, and three wheel rods 42a, 42b, and 42c. Bar 56 connects to three wheel rods 42a, 42b, and 42c, which position wheels 40a, 40b, and 40c tangent to track 82. Track 82 is mounted on and guided by trolley 99. Bar 50 connects to pivot point 38 and/or adjustable load bar 56, thus connecting trolleys 90 and 99 and assemblies 110 and 126 to each other.

FIG. 10C is an enlarged isometric cut-out view of the area indicated by line 10C of FIG. 10A showing more clearly system 210 and its components. Trolley 101 of assembly 128 comprises a bar 56, pivot point 38, three wheels 40a, 40b, and 40c, and three wheel rods 42a, 42b, and 42c. Bar 56 with rods 42a, 42b, and 42c position wheels 40a, 40b, and 40c tangent to track 82. Track 82 is mounted on and guided by trolley 101. Trolley 101 has additional wheel rods 42a, 42b, and 42c and wheels 40a, 40b, and 40c for three conveyors 60 each with track 82. Bar 50 connects to pivot point 38 and bar 56, thus connecting trolleys 90 and 101 and assemblies 110 and 128.

Adjustable Load Bar

Adjustable load bar 56 shown in FIGS. 10B and 10C varies in length to adjust the angle of incline of conveyor 60. Bar 56 can optionally have at least one pivot point 38. Bar 56 can be manually adjusted or it can be adjusted with electric, pneumatic, or hydraulic actuators or motors. When selecting a power method for bar 56, one must consider a number of factors, such as, but not limited to, the amount of load, the best available power source, the environment, maintenance issues, and duty cycle. Bar 56 in assemblies 126 and 128 show a simple slip joint to adjust length. Bar 56 can represent a variety of mechanisms, such as carriage lift, scissor lift, and screw-actuated mechanisms to adjust the angle of incline of conveyor 60.

Pivot Point

Pivot point 38, shown in FIGS. 10B and 10C, can be used to adjust the angle of incline of conveyors 60 and/or track 82. Pivot point 38 can be used with adjustable bar 56 to adjust conveyor 60 angle of incline. Also, point 38 can be used independently, or, as will be discussed later, it can be used with any of bars 50, 52, 54, and 56 to adjust the elevation or position of conveyor 60.

Stackable Conveyors

Stackable conveyor group 70, and, as will be discussed later, groups 67, 68, 69 of FIG. 10A comprises conveyors 60 that are stacked upon each other that can move linearly and in parallel to about the length of one or more conveyors 60. Stackable conveyor group 70 (and 67, 68, and 69) can retract ends 72 and 74, rotate into a new location and/or position, and extend ends 72 and 74, to a new location and/or position. Conveyor group 70 has greater versatility for positioning ends 72 and 74 of conveyor 60 to designated locations. Group 70 also increases the linear length of conveyance that can be guided by a guidance system with a track-and-trolley guide assembly. Conveyor group 70 can generally move bi-directionally to adjust the conveyance reach. Group 70 can comprise a single belt conveyor using a serpentine belt arrangement. Or, group 70 can alternatively comprise multiple conveyors 60 with independent power or with a common slave drive power. FIG. 10A shows group 70, which is only partially extended. Group 68, as shown later, is similar to group 70, except its conveyors 60 are in a retracted position. Groups 68 and 70 each have three conveyors 60. Groups 67 and 69 each have two conveyors 60. Group 67, as shown later, is similar to group 69, except its conveyors 67 are in a retracted position and group 69 is in an extended position.

Operation: FIGS. 10A, 10B, and 10C

To use systems 208 and 210 shown in FIGS. 10A, 10B, and 10C for distributing material into any selected bin 30b or for feeding another conveyor 60, it must first be determined which bin 30b is to be filled with material, or which conveyor 60 is to receive material and predetermine its location. Conveyor 60 of system 208 and group 70 of system 210 are moved into place, preferably with assemblies 110 and 126 or 128, and adjusted accordingly so ends 72 and 74 are in positions sufficient to convey material into any selected bin 30b or convey the material to another destination, such as another conveyor. Assembly 126 or 128, conveyor 60, and group 70 are moved along their respective assembly 110 into a position that aligns conveyor 60 and/or group 70 with the desired incoming and discharging locations.

Bar 56 of system 208 is adjusted to change the elevation of its end 72 of conveyor 60 so it can receive material. Bar 56 of system 208 is adjusted to change the elevation of conveyor 60 discharging end 74 so conveyor 60 can transfer material to end 72 of group 70 of system 210 or to fill bin 30b. When transferring to another conveyor system, such as group 70 of system 210, then bar 56 of system 210 is adjusted to change the elevation of its end 72 of conveyor group 70 so it can receive material from end 74 of conveyor 60 of system 208. Conveyor 60 of system 208, and when necessary conveyor group 70 of system 210, are moved along their respective upper assemblies 126 or 128 to position ends 72 and 74 to desired locations. Top conveyor 60 is a component of group 70 and is moved accordingly so its end 72 can receive material from end 74 of conveyor 60 of system 208. Bottom conveyor 60 is a component of group 70 of system 210 and is moved accordingly so its end 74 can transfer material into one of bins 30b. Systems 208 and 210 can work independently or in conjunction with each other, depending on the conveying needs.

FIGS. 11A to 11D: Arcuate Inclinable and Stackable Reclaim Systems

FIGS. 11A to 11D show arcuate and inclinable linear dual guide assembly conveyor guidance systems 212, 214, and 216 for serving a plurality of bins 30b. These apparatuses serve bins 30b by reclaiming material and moving it away from bins 30b. Systems 212, 214 and 216 are similar to systems 208 and 210 except that they are intended to reclaim or recover material and move it away from bins 30b.

FIG. 11B is an enlarged isometric cut-out view of the area indicated by line 11B of FIG. 11A showing more clearly system 216 and its components. System 216 is similar to system 208 except that it replaces assembly 126 with assembly 130. Assembly 130 is similar to assembly 126 except that it has second trolley 101. Trolley 101 of assembly 130 consists of adjustable load bar 56, pivot point 38, at least four of wheels 40a, 40b, or 40c, and at least four of wheel rods 42a, 42b, or 42c. Bar 56 connects to at least four of wheel rods 42a, 42b, or 42c, which position at least four of wheels 40a, 40b, or 40c tangent to track 82. Track 82 is mounted on and guided by trolley 101. Bar 50 connects to pivot point 38 and/or adjustable load bar 56, thus connecting trolleys 90 and 101 and assemblies 110 and 130 to each other.

Another difference between systems 214 and 216 and system 210 is they have enough wheels 40a, 40b, and 40c, and wheel rods 42a, 42b, and 42c to accommodate two conveyors 60. System 214 has a fully extended stackable conveyor group 69, and system 216 has a stackable conveyor group 67, which is shown in a retracted position. In this instance, conveyor 60, and conveyor groups 67 and 69 can be inclined. FIG. 11C is a front view taken in the direction of the area indicated by line 11C-11C of FIG. 11A that shows conveyors 60 of system 216 functioning as a stackable inclinable conveyor group 67 that is retracted and in a horizontal position ready to be moved to another silo 30b. Even though group 67 of system 216 does not appear to be centered between support legs 31 of bin 30b in FIG. 11C, this is an illusion due to the conveyor being centered under bin 30b on lower arcuate tracks 86a and 86b. As conveyor group 67 of system 216 moves on track 86a and 86b, it will fit between support legs 31 of bin 30b. FIG. 11D is an enlarged cut-out view of the area indicated by line 11D of FIG. 11A that more clearly shows assemblies 110 and 130 of system 214.

Operation: FIGS. 11A to 11D

To use dual layer conveyor guidance systems 212, 214, and 216 shown in FIGS. 11A to 11D for reclaiming material from bins 30b or for feeding another one of conveyors 60, it must first be determined which bin 30b is to discharge material or which conveyor 60 is to receive material and predetermine its location. Conveyor 60 of system 212, conveyor group 69 of system 214, and conveyor group 67 of system 216, are moved into place, preferably with, assemblies 110 and 126 or 130, and adjusted accordingly so incoming end 72 and discharging end 74 are in a position to be able to collect and convey material away from bins 30b or convey the material to another conveyor. Assemblies 126 and 130 and its conveyors 60 are moved along their respective assembly 110 into positions that aligns conveyors 60 with the desired reclaiming and discharging locations.

Conveyor 60 of system 212, conveyor group 69 of system 214, or conveyor group 67 of system 216 is moved accordingly so its end 72 can reclaim material from bin 30b. If transfer to another conveyor is required, then a procedure can be employed, such as adjusting bar 56 of system 212 to change the elevation of end 74 so of conveyor 60 can transfer material to end 72 of conveyor group 69 of system 214. Bar 56 of system 214 is adjusted to change the elevation of end 72 of conveyor 69 so it can receive material from end 74 of conveyor 60 of system 212. Bar 56 of system 214 can be adjusted to change the elevation of end 74 of group 69 so it can transfer material to end 72 of group 67 of system 216. Bar 56 of system 216 is adjusted to change the elevation of end 72 of group 67 so it can receive material from end 74 of conveyor group 70 of system 214. Bar 56 of system 216 is adjusted to change the elevation of end 74 of group 67 so it can transfer material to a desired location.

Conveyor 60 of system 212, group 69 of system 214, and group 67 of system 216 are moved along their respective assemblies 126 and 130 to position ends 72 and 74 to desired locations, such as end 72 under a discharge hopper 33 opening of bin 30b. Conveyor 60 of system 212 is moved accordingly so its end 74 can transfer material to end 72 of group 69 of system 214. Top conveyor 60, as a component of group 69 is moved accordingly so its end 72 can receive material from end 74 of conveyor 60 system 212. Bottom conveyor 60, as a component of group 69 is moved accordingly so its end 74 can transfer material onto end 72 of group 67. Top conveyor 60, as a component of system 216, is moved accordingly so its end 72 can receive material from end 74 of group 69. Bottom conveyor 60, as a component of group 67, is moved accordingly so its end 74 can transfer material to a desired location. Systems 212, 214, and 216 can work independently or in conjunction with each other, depending on the conveying needs.

Conveyor 60 of system 212, group 69 of system 214, and group 67 of system 216 must each be centered between support legs 31 of bin 30b when it is necessary for conveyors 60 to pass between legs 31. This is best illustrated in FIG. 7C as it shows system 216 with a retracted group 67 in a position that will allow it to pass between legs 31 as it moves along tracks 86a and 86b.

Figure 12A:
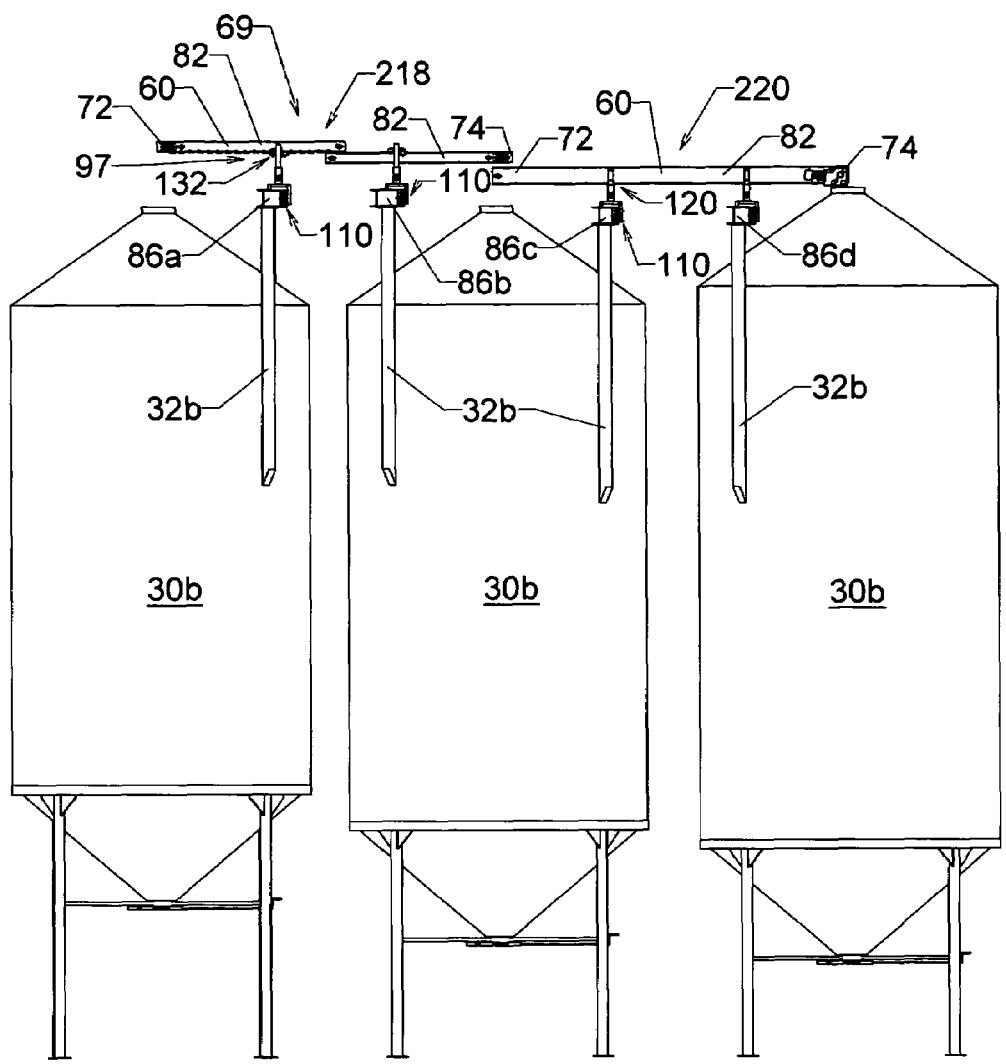
FIG. 12A is a front elevation view of the additional embodiment showing a plurality of round bins with a two layer track-and-trolley system that comprises a lower layer arcuate track-and-trolley assembly guiding an upper layer linear track-and-trolley assembly with conveyors.
Figure 12B:
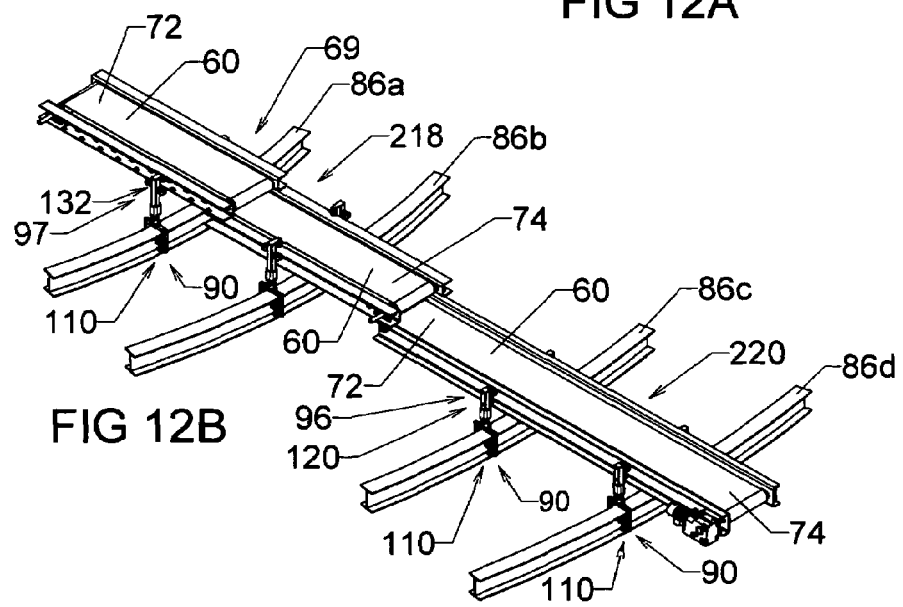
FIG. 12B is an isometric view of the track-and-trolley guided conveying system shown in FIG. 12A with the underlying bins removed for clarity.

FIGS. 12A, 12B, and 12C: Arcuate Fixed Elevation Distribution Conveyors

FIGS. 12A, 12B, and 12C illustrates two dual layer conveyor guidance systems 218 and 220 that can each rotate and linearly move conveyor 60 and conveyor group 69 for distributing materials into one of bins 30b. Systems 218 and 220 are similar to systems 208, 210, 212, 214, and 216 except that conveyors 60 are not inclinable, thus conveyor 60 incoming end 72 and discharging end 74 are at fixed elevations. Another difference between system 218 and system 210 is it has wheels 40a, 40b, and 40c, and wheel rods 42a, 42b, and 42c to accommodate two conveyors 60. System 218 has a fully extended stackable conveyor group 69. In this instance, conveyor 60, and conveyor groups 67 and 69 cannot be inclined. Thus consequently, group 69 of system 218 should be at a higher elevation than conveyor 60 of system 220. As a result, discharge end 74 of group 69 of system 218 is located above end 72 of conveyor 60 of system 220. System 218, located at a higher elevation than system 220, eliminates the need for group 69 to incline. System 218 has an extended group 69 that feeds end 72 of conveyor 60 of system 220 that feeds bin 30. System 218 must be at a higher elevation than system 220 or system 218 must be at a fixed incline sufficient for it to discharge onto conveyor 60 of system 220.

Conveyor guidance systems 218 and 220 each comprise a lower layer guide assembly 110 supporting and guiding an upper layer linear guide assembly 120 or 132 that supports and guides conveyor 60. Lower arcuate tracks 86a, 86b, 86c, and 86d are stationary and anchored to a supporting column cap 34 and an underlying column 32b. System 220 assembly 120 comprises an upper linear track 82 mounted on second trolley 96. System 218 assembly 132 comprises a track 82 mounted on second trolley 97. Conveyor 60 is mounted to track 82. Assembly 110 supports the weight load of assembly 120 or 132 and conveyor 60, and guides conveyor 60 in a radial path along tracks 86a, 86b, 86c, and 86d. Assembly 120 or 132 supports the weight load of conveyor 60 and guides conveyor 60 in a linear path along track 82. These two guide assemblies 110 and 120 or 132 move conveyor 60 in radial and linear paths to position a discharge end 74 of conveyor 60 to a desired location for filling a bin 30b, and/or to position an incoming end 72 of conveyor 60 to a desired location for receiving materials. System 218 has a group 69 that can retract and extend ends 72 and 74 to adjust the reach of conveyors 60. Horizontally mounted conveyor 60 of system 218 feeds horizontally mounted conveyor 60 of system 220. In this example, system 218 must be at a higher elevation than system 220, or, system 218 must have a fixed incline sufficient to discharge into conveyor 60 of system 220.

FIG. 12B is an enlarged isometric cut-out view of the area indicated by line 12B of FIG. 12A showing systems 218 and 220 without underlying bins. System 218 is similar to system 214 except that it replaces assembly 130 with assembly 132. Assembly 132 is similar to assembly 130 except that second trolley 96 replaces trolley 99. Track 82 is mounted on and guided by trolley 96. Bar 50 connects to bar 52, thus connecting trolleys 90 and 96 and assemblies 110 and 132 to each other. System 220 is similar to system 212 except that it replaces assembly 126 with assembly 120. Assembly 120 is similar to assembly 126 except that trolley 96 replaces trolley 99.

Operation: FIGS. 12A, 12B, and 12C

To use dual guide assemblies for conveyor guidance systems 216, 218, and 220 shown in FIGS. 12A, 12B, and 12C for distributing material into any desired bin 30b or for feeding another conveyor 60, it must first be determined which bin 30b is to be filled with material and/or which conveyor 60 is to receive material, and predetermine its location. Conveyor 60 of system 218 and group 69 of system 220 are moved into place, preferably, with trolleys 90 and 96, and adjusted accordingly so end 72 can receive material and end 74 is in a position to be able to convey material into any desired bin 30b or convey the material to another conveyor. Assemblies 120 and 132 and conveyors 60 are moved along assembly 110 into a position that aligns conveyors 60 with the desired incoming and discharging locations.

Conveyor 60 of system 218 and group 69 of system 220 are moved along their respective assemblies 120 and 132 to position ends 72 and 74 to desired locations. Top conveyor 60, as a component of group 69, is moved accordingly so its end 72 can receive material. Bottom conveyor 60, as a component of group 69, is moved accordingly so its end 74 can transfer material onto end 72 of conveyor 60 or to transfer material into bin 30b. End 72 of conveyor 60 is moved accordingly so it can receive material from end 74 of group 69. End 74 of conveyor 60 is moved accordingly so it can fill material into bin 30b. Systems 218 and 220 can work independently or in conjunction with each other, depending on the conveying needs.

Figure 13C:
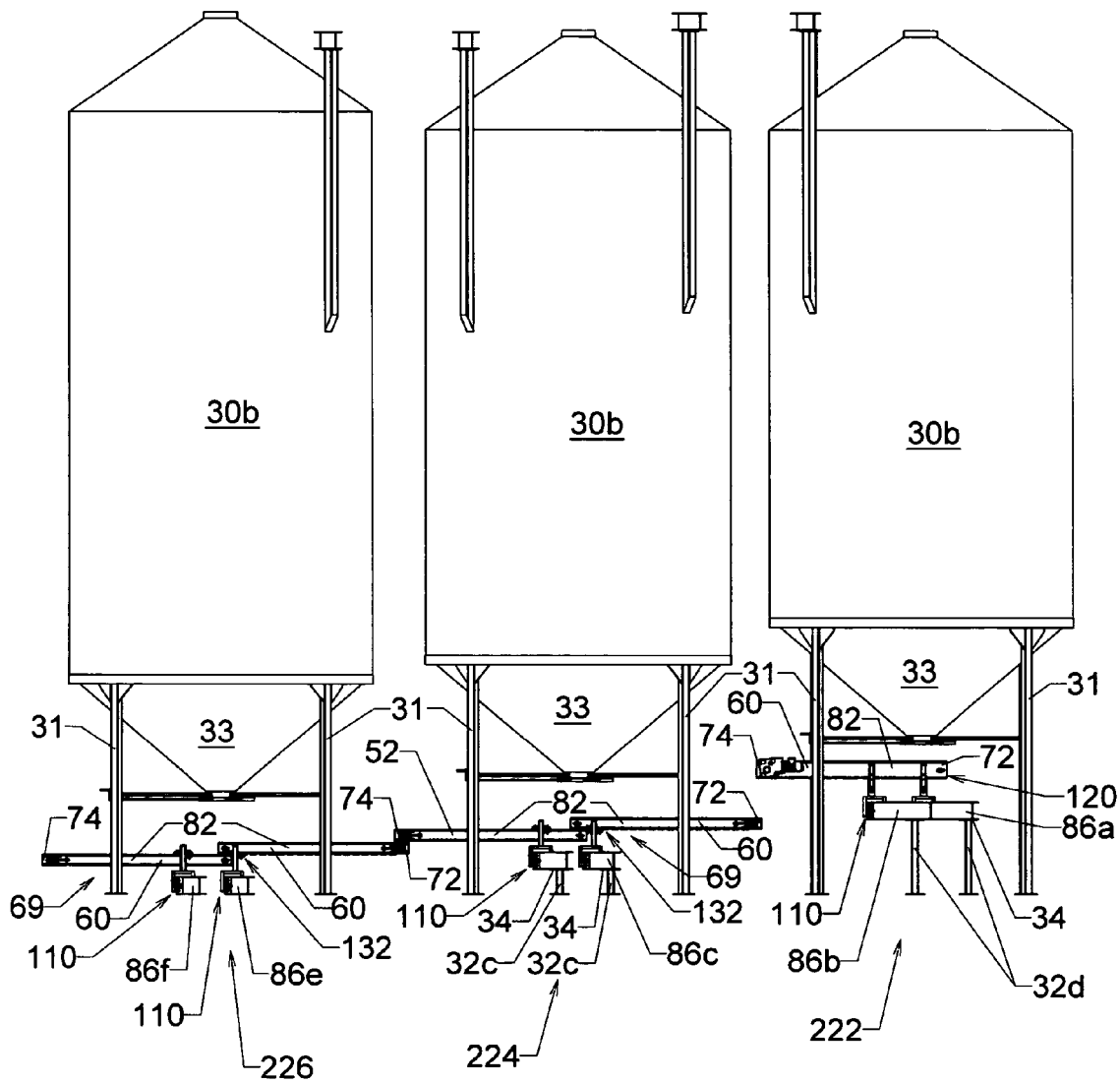
FIG. 13C is a front elevation view taken in the direction of the area indicated by line 13C-13C of FIG. 13A.

FIGS. 13A, 13B, and 13C: Arcuate Fixed Elevation Reclaim Conveyors

FIGS. 13A, 13B, and 13C illustrates three dual layer conveyor guidance systems 222, 224 and 226 that serve a plurality of bins 30b, which can each rotate and linearly move conveyor 60 and conveyor group 69 for reclaiming materials from one of bins 30b. Systems 222 and 224 of FIG. 13A are respectively similar to FIG. 12A systems 220 and 218, except that they are used as a reclaim system. FIG. 13A also shows a system 226 that is similar to system 218 and 224. Conveyors 60 are not inclinable, thus conveyor 60 incoming end 72 and discharging end 74 are at fixed elevations. FIGS. 13A and 13C also show discharge hoppers 33 of bins 30b at different elevations.

FIGS. 13A to 13C show arcuate and linear dual layer conveyor guidance systems 222, 224, and 226 for reclaiming material where conveyors 60 are at a fixed elevation, which in this example, is generally horizontal. FIG. 13A is an isometric view showing conveyor 60 of system 222 at a higher elevation than conveyor 60 of system 224, which must be at a higher elevation than conveyor 60 of system 226, and so on. To accomplish this staggering of heights, support columns 32c and 32d with optional support caps 34 may be used to elevate tracks 86a, 86b, 86c, and 86d. In this instance, conveyor 60, and groups 69 cannot be inclined. Thus consequently, conveyor 60 of system 222 should be at a higher elevation than group 69 of system 224. As a result, discharge end 74 of conveyor 60 of system 222 is located above end 72 of conveyor 60 of system 224. System 222, located at a higher elevation than system 224, eliminates the need for conveyor 60 to incline. Systems 224 and 226 each have an extended stackable conveyor group conveyor group 69. System 224 must be at a higher elevation than system 226 or system 224 must be at a fixed incline sufficient for it to discharge onto conveyor 60 of system 226.

FIG. 13B is an enlarged isometric cut-out view of the area indicated by line 13B of FIG. 13A shows system 224 upper assembly 132 mounted on lower assembly 110. FIG. 13C is a front view taken in the direction of the area indicated by line 13C-13C of FIG. 13A that more clearly shows the positions of conveyors 60. Instead of conveyors 60 being at a fixed horizontal position, they can have a fixed incline position (not shown) that does not require hoppers 33 of bins 30b to have a staggering of heights. When this embodiment is fully retracted, each individual conveyor 60 of group 69 cannot be longer than the distance between two support legs 31 of bins 30b for conveyors 60 to pass between legs 31.

Operation: FIGS. 13A, 13B, and 13C

System 222 operates similarly to system 212 and systems 222 and 224 operate similarly to systems 214 and 216 of FIGS. 11A, 11B, 11C, and 11D except conveyors 60 are not inclinable.

Figure 14A:
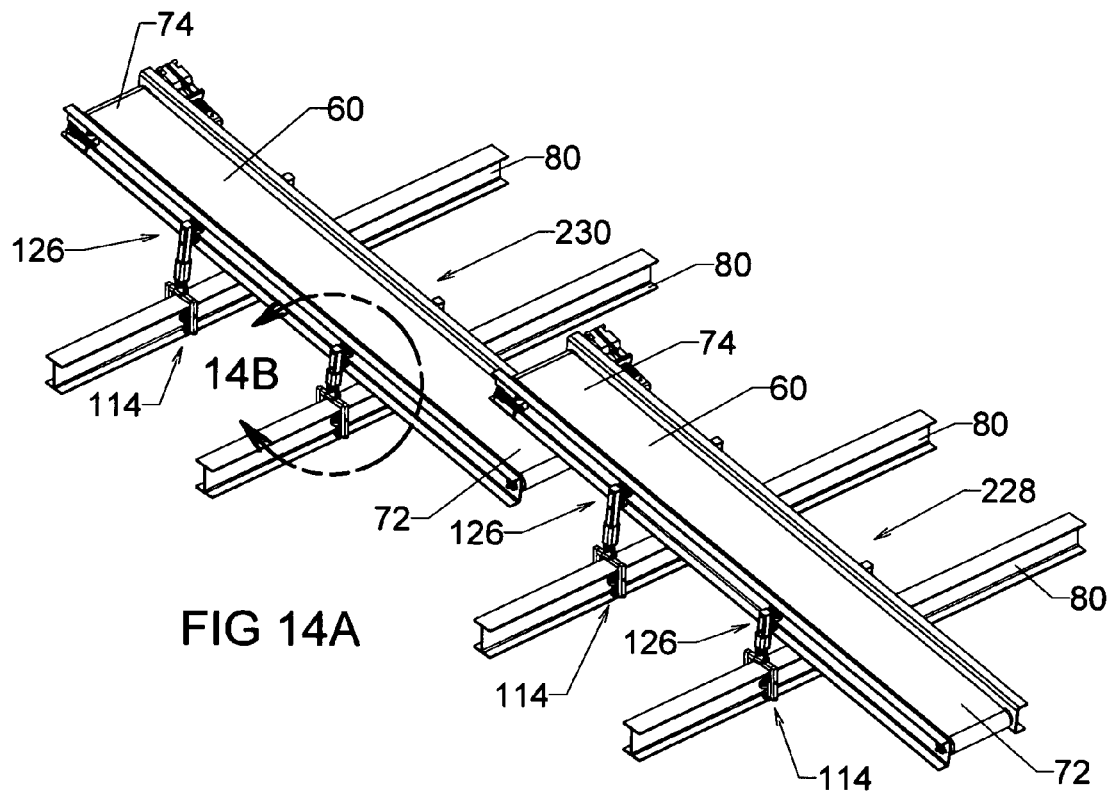
FIG. 14A is an isometric view of an additional embodiment showing a dual layer track-and-trolley system that comprises a linear track supporting an inclinable linear track with a conveyor that can be used for filling into or reclaiming from a plurality of bins.
Figure 14B:
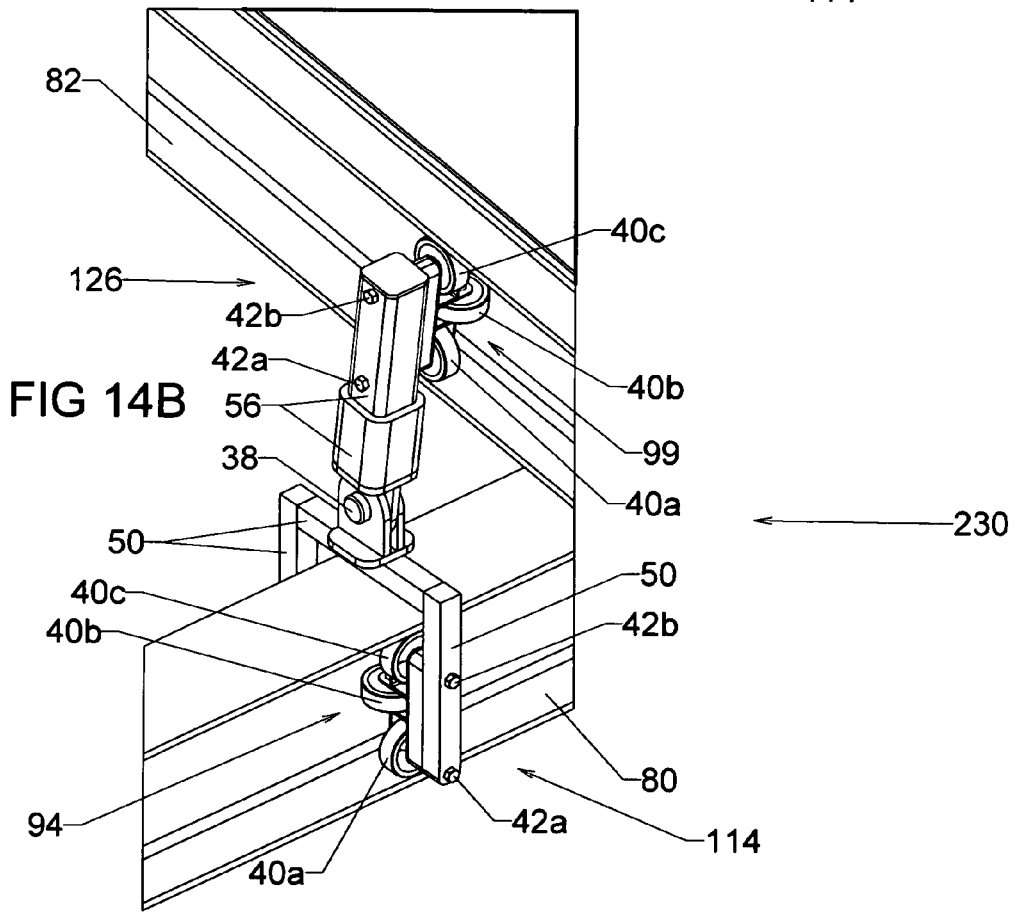
FIG. 14B is an enlarged isometric view of the area indicated by line 14B of FIG. 14A that shows the upper and lower track-and-trolleys of the first guidance system.

FIGS. 14A and 14B: Dual Layer Linear Inclinable Conveyor Guidance

FIGS. 14A and 14B illustrate two dual layer linear conveyor guidance systems 228 and 230 that can each move their respective conveyor 60 linearly in two directions for distributing materials or reclaiming materials. These apparatuses can serve an array of bins by distributing material into bins, or by reclaiming material from bins, by moving its respective conveyor 60 linearly in two directions. Systems 228 and 230 each have a single conveyor 60 that can adjust in angle, making conveyor 60 inclinable and can vary the elevation of incoming and discharging ends 72 and 74.

Systems 228 and 230 are similar to system 208 except that lower linear guide assembly 114 is configured for a linear track 80. Conveyor guidance systems 228 and 230 each comprises an assembly 114 supporting and guiding an upper linear guide assembly 126 that supports and guides a conveyor 60. Track 80 is stationary and anchored. Assembly 114 comprises a first trolley 94 mounted on track 80. Conveyor 60 is mounted to upper linear track 82 of assembly 126. These two assemblies 114 and 126 each move their inclinable conveyor 60 linearly to position end 74 to a designated location for filling any selected bin, or to position end 72 to a designated location for receiving materials. Conveyor 60 can instead be a system of stackable conveyors, such as conveyor groups, that can retract and extend ends to adjust the reach of conveyance.

FIG. 14B is an enlarged isometric cut-out view of the area indicated by line 14B of FIG. 14A showing more clearly system 230 and its components. System 230 is similar to system 208 except that it replaces assembly 110 with assembly 114. Assembly 114 is similar to assembly 110 except that first trolley 94 replaces trolley 90. Trolley 94 of assembly 114 comprises wheels 40a, 40b, and 40c, and wheel rods 42a, 42b, and 42c. Bar 56 connects to wheel rods 42a, 42b, and 42c, which position wheels 40a, 40b, and 40c tangent to track 80. Track 82 is mounted on and guided by second trolley 99. Bar 50 connects to pivot point 38 and/or adjustable load bar 56, thus connecting trolleys 94 and 99 and assemblies 114 and 126 to each other. These components and assemblies work in conjunction with each other to position conveyors 60 of systems 228 and 230 to any desired bin for filling into or reclaiming from bin or another conveyor.

Operation: FIGS. 14A and 14B

Systems 228 and 230 operate similarly to system 208 except assembly 114 moves linearly instead of radially.

FIGS. 15A, 15B, and 15C: Dual Layer Linear Fixed Elevation Conveyor Guidance

FIGS. 15A, 15B, and 15C illustrate two conveyor guidance systems 232 and 234 each consisting of dual assemblies 114 and 120. These apparatuses can serve an array of bins by distributing material into bins, or by reclaiming material from bins, by moving its respective conveyor 60 linearly in two directions. Systems 232 and 234 each have a single conveyor 60 that has a fixed elevation of horizontal or at an angle. In this example, both conveyors 60 of systems 232 and 234 have a fixed horizontal orientation.

Systems 232 and 234 are similar to system 228 and 230 except that upper assembly 120 is not adjustable. Systems 232 and 234 each comprises a lower linear track-and-trolley assembly 114 supporting and guiding an upper linear guide assembly 120 that supports and guides a conveyor 60. Track 80 is stationary and anchored. Conveyor 60 is mounted to track 82. These two assemblies 114 and 120 each move their inclinable conveyor 60 linearly to position end 74 to a designated location for filling any selected bin, or to position end 72 to a designated location for receiving materials. Conveyor 60 can instead be a system of stackable conveyors, such as conveyor groups, that can retract and extend ends to adjust the reach of conveyance.

FIG. 15B is an enlarged isometric cut-out view of the area indicated by line 15B of FIG. 15A showing more system 232 and its components. System 232 is similar to system 230 except that it replaces assembly 126 with assembly 120. Assembly 120 is similar to assembly 126 except that bar 52 replaces bar 56. Assembly 120 comprises an upper linear track 82 mounted on second trolley 96. Track 82 is mounted on and guided by trolley 96. Bar 50 connects to bar 52, thus connecting trolleys 94 and 96 and assemblies 114 and 120 to each other. These components and assemblies work in conjunction with each other to position conveyors 60 of systems 232 and 234 to any desired bin for filling into or reclaiming from bin or another conveyor.

FIG. 15C is a front view taken in the direction of the area indicated by line 15C-15C of FIG. 15A that more clearly shows system 232 mounted at a higher elevation than system 234. This staggered relationship in elevation between conveyors eliminates the need for an inclinable conveyor.

Operation: FIGS. 15A, 15B, and 15C

Systems 232 and 234 operate similarly to system 208 except assembly 114 moves linearly instead of radially and conveyor 60 is not inclinable.

Alternative Embodiment—FIGS. 16A to 16D: Detailed Example Of Triple Layer Conveyor Guidance FIGS. 16A to 16D illustrate two triple layer conveyor guidance systems 242 and 244 for distributing materials into bins. Either of these two apparatuses can serve a plurality of bins 30b by distributing material into bins 30b or to another system. Systems 242 and 244 move conveyors 60 in arcuate and linear paths. Systems 242 and 244 comprise a lower guide assembly 110 supporting and guiding a middle layer or second guide assembly 136a or 138a, which in turn supports and guides an upper or third linear guide assembly 134 that supports and guides conveyor 60. Tracks 86a, 86b, 86c, and 86d are stationary and anchored to a supporting column cap 34 and/or a column 32b. Conveyor 60 is mounted to track 82. Assembly 110 supports the weight load of conveyor 60, middle assembly 136a or 138a, and upper assembly 134. Assembly 114 guides conveyor 60 and assemblies 134, 136a or 138a in a radial path along tracks 86a, 86b, 86c, and 86d. Assembly 136a or 138a supports the weight load of conveyor 60 and assembly 134 and guides conveyor 60 in a radial path along track 88a. Assembly 134 supports the weight load of conveyor 60 and guides it in a linear path along track 82. These three guide assemblies 114, 134, and 136a or 138a move conveyors 60 in radial and linear paths to position discharge ends 74 to a location for filling any desired bin 30b, or to a designated location to transfer material into another conveyor, or to position incoming ends 72 to a designated location for receiving materials.

FIG. 16B is an enlarged isometric cut-out view of the area indicated by line 16B of FIG. 16A showing more clearly system 244 lower and middle guide assemblies 110 and 136a and their components. Middle assembly 136a of system 244 comprises a trolley 91 mounted on track 88a. Second trolley 91 of assembly 136a comprises second load bar 52 and two pairs of three wheels 40a, 40b, 40c and three wheel rods 42a, 42b, 42c. Bar 52 of trolley 91 attaches to and is supported by bar 50 of first trolley 90 of assembly 110, thus connecting trolleys 90 and 91 and assemblies 110 and 136a to each other.

As shown in FIG. 16B, as a component of trolley 91 of assembly 136, wheel 40a makes contact with or is tangent to the lower, generally horizontal portion of arcuate track 88a. Its wheel rod 42a is generally perpendicular to the axis of arcuate track 88a. A second wheel 40b makes contact with or is tangent to the generally vertical portion of track 88a. Wheel rod 42b is parallel to the axis of track 88a. A third wheel 40c makes contact with or is tangent to the upper portion of track 88a with its wheel rod 42c perpendicular to the axis of track 88a.

FIG. 16C is an enlarged isometric cut-out view of the area indicated by line 16C of FIG. 16A that more clearly shows system 242 upper two guide assemblies 138a and 134 and their components. Assembly 138a of system 242 comprises a second trolley 92 mounted on arcuate track 88a. Assembly 134 comprises a linear track 82 mounted on a third trolley 98. Second trolley 92 of assembly 138a comprises bar 52 and two pairs of three wheels 40a, 40b, 40c and three wheel rods 42a, 42b, 42c. Bar 52 of trolley 92 attaches to and supports load plate 36b. Load plate 36b supports third load bar 54 of third trolley 98 of assembly 134. Thus connecting trolleys 92 and 98 and assemblies 138a and 134.

FIG. 16C shows a load plate 36b connecting together bar 52 of trolley 92 and bar 54 of trolley 98. Load plate 36b is used to connect multiple trolleys 92 and 98, so trolleys move in unison on tracks 82 and 88a, or, as will discussed later, tracks 80 and 86a, 86b, 86c, and 86d. In this example, trolleys 92 and 98, connected to load plate 36b, move in unison on tracks 82 and 88a. Should several trolleys, such as trolleys 90, 91, 92, 93a, 93b, 94, 95a, 95b, 96, 97, 98, 99, 100, 101, 102, 103, 104, 105, 106, 107, and 108 be needed to be connected, then at least one load plate 36b can be used to connect multiple trolleys together and transmit the weight load and forces to bars 52 and 54, and as will discussed in other sections, to bars 50 and 56. Another use (not shown) for load plate 36b is to tie together trolleys of assembly 110 and assembly 138a. An example (not shown) of this would be to connect together bar 50 of trolley 90 and bar 52 of trolley 92 that are shown in FIG. 16B with a load plate 36b. Load plate 36b holds trolleys such as one or more trolleys 90, 91, 92, 93a, 93b, 94, 95a, 95b, 96, 97, 98, 99, 100, 101, 102, 103, 104, 105, 106, 107, and 108, together in at least one position that is fixed in relation to each other.

FIG. 16C shows that bar 54 can be connected directly to bar 52 (not shown), but for many instances this is not practical. For example, should there need to be several trolleys 92, then one plate 36b could be used to tie all trolleys together and transmit the load to bar 54. Being attached to plate 36b so they will move in unison around arcuate track 88a unifies movements of trolleys 92. Bar 54 rests on and is attached to load plate 36b so that it rotates with plate 36b. Plate 36b attaches to and supports bar 54 that is a component of third trolley 98.

As a component of trolley 98 of assembly 134, wheel 40a makes contact with or is tangent to the lower, generally horizontal portion of linear track 82. Its wheel rod 42a is generally perpendicular to the generally vertical portion of linear track 82. A second wheel 40b makes contact with or is tangent to the generally vertical portion of track 82. Wheel rod 42b is generally parallel to the generally vertical portion of track 82. A third wheel 40c makes contact with or is tangent to the upper portion of track 82 with its wheel rod 42c is generally perpendicular to the generally vertical portion of track 82.

Figure 16D:
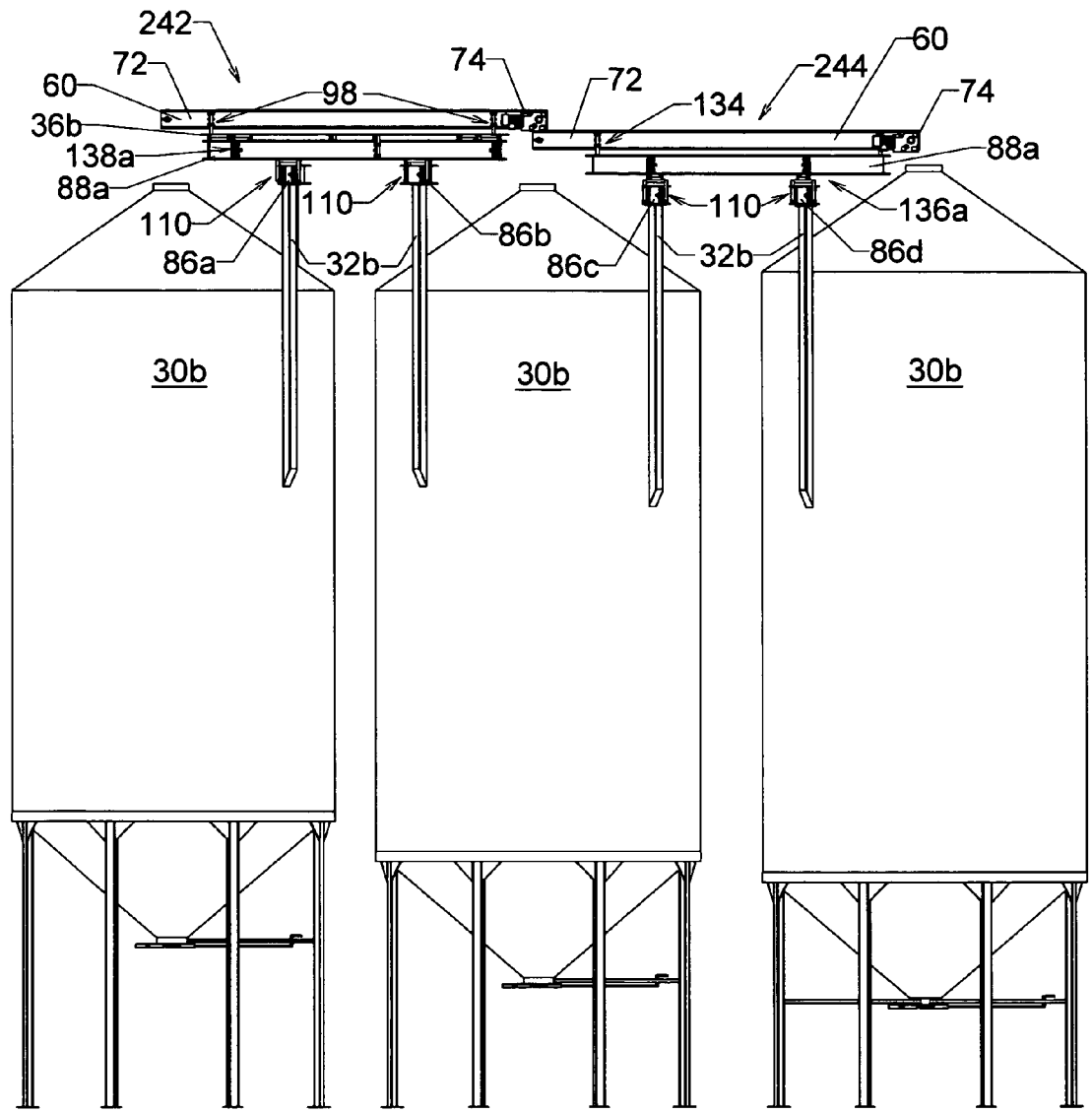
FIG. 16D is a front elevation view taken in the direction of the area indicated by line 16D-16D of FIG. 16A.

FIG. 16D is a front view taken in the direction of the area indicated by line 16D-16D of FIG. 16A that more clearly shows conveyor 60 of system 242 at a higher elevation than conveyor 60 of system 244. System 242 is at a higher elevation than system 244 so end 74 of conveyor 60 of system 242 is located above end 72 of conveyor 60 of system 244, thus eliminating the need for conveyors 60 to incline. Conveyor 60 of system 242 feeds conveyor 60 of system 244. However, conveyor 60 of system 242 can be at a fixed incline (not shown) sufficient to feed conveyor 60 of system 244, thus eliminating the need for systems 242 and 244 to be at different elevations.

FIGS. 16A through 16D have shown two systems 242 and 244 with a single conveyor 60 mounted horizontally. As systems 210 and 230 have previously demonstrated, conveyor 60 of systems 242 and 244 can be inclinable. Also a group of conveyors 60 that extend and retract, which are horizontal or inclinable can also be employed on systems 242 and 244.

Operation: FIGS. 16A to 16D

To use systems 242 and 244 shown in FIGS. 16A to 16D for distributing material into any desired bin 30b or for feeding another conveyor 60, it must first be determined which bin 30b is to be filled with material or which conveyor 60 is to receive material. Conveyors 60 of systems 242 and 244 are moved into place, preferably, with assemblies 110, 136a or 138a, and 134, and adjusted accordingly so ends 72 and 74 are in positions adequate to convey material into any desired bin 30b or convey the material to another conveyor.

Assemblies 134 and 136a or 138a, and conveyors 60 are moved along assembly 110 into a position that aligns the imaginary center axis of track 88a with the desired incoming and discharging locations. Assembly 134 and its conveyor 60 are moved along assembly 136a or 138a into a position that aligns its conveyor 60 with the desired incoming and discharging locations. Conveyors 60 of systems 242 and 244 are each moved along their respective assembly 134 to position ends 72 and 74 to desired locations. Conveyor 60 of system 242 is moved accordingly so its end 72 can receive material. Conveyor 60 of system 242 is moved accordingly so its end 74 can transfer material to end 72 of conveyor 60 of system 244 or to bin 30b. Conveyor 60 of system 244 is moved accordingly so its end 72 can receive material from end 74 of conveyor 60 of system 242. End 74 of conveyor 60 of system 244 is moved accordingly so it can fill material into bin 30b. Systems 242 and 244 can work independently or in conjunction with each other, depending on the conveying needs.

FIGS. 17A to 17D: Detailed Example of Triple Layer Conveyor Guidance

FIGS. 17A to 17C show arcuate and linear triple layer conveyor guidance systems 246, 248, and 250 that can serve a plurality of bins 30b. These apparatuses can serve a plurality of bins 30b by reclaiming material from the discharge opening of bins 30b and moving material away from bins 30b. Systems 246 and 248 are similar to system 246 and system 250 is similar to system 242, except that they are intended to reclaim or recover material and move it away from bins 30b. FIGS. 17A to 17C show three systems 246, 248, and 250 under bins 30b with discharge hoppers 33 at different elevations with conveyors 60 of systems 246, 248, and 250 progressively elevated higher. However, conveyors 60 in each of systems 246, 248, and 250 can have a fixed incline sufficient to feed the next conveyor, which eliminates the need to stagger conveyor of heights (not shown). As shown in this example, for conveyors 60 to remain horizontal and feed one another, conveyor 60 of system 246 must be higher than conveyor 60 of system 248, which must be higher than conveyor 60 of system 250, and so on. To accomplish this staggering of conveyor heights, support columns 32c and 32d with support caps 34 may be used to elevate arcuate tracks 86c, 86d, 86e, and 86f and their supported assemblies. Support columns 32c and 32d represent any means of elevating tracks 86c, 86d, 86e, and 86f.

FIG. 17B is an enlarged isometric cut-out view of the area indicated by line 17B of FIG. 17A showing more clearly system 248 assemblies 110, 136b, and 134 and their components. FIG. 17C is an enlarged isometric cut-out view of the area indicated by line 17C of FIG. 17A showing more clearly system 250 three assemblies 110, 138b, and 134 and their components. Guide assembly 136b is similar to assembly 136a except that track 88b replaces track 88a and second trolley 95a replaces trolley 92. Track 88b is similar to track 88a except track 88b is smaller in diameter to fit between bin 30b support legs. Trolley 95a is similar to trolley 91 except trolley 95a is configured for track 88b. Guide assembly 138b is similar to assembly 138a except that track 88b replaces track 88a, second trolley 95b replaces trolley 92, and load bar 36c replaces load bar 36b. Trolley 95b is similar to trolley 92 except trolley 95b is configured for track 88b. Load bar 36c is similar to load bar 36b except load bar 36c is smaller in diameter to correspond to track 88b. Load bar 36c does not have to be circular in shape as long as it provides the function of connecting multiple trolleys.

Operation: FIGS. 17A, 17B, and 17C

To use systems 246, 248, and 250 shown in FIGS. 17A, 17B, and 17C for reclaiming material from a bin 30b or for feeding another conveyor 60, it must first be determined which bin 30b is to have material moved away or which conveyor 60 is to receive material. Conveyors 60 of systems 246, 248, and 250 are moved into place, preferably, with assemblies 110, 136b or 138b, and 134, and adjusted accordingly so incoming end 72 and discharging end 74 are in positions sufficient to convey material away from any desired bin 30b, or convey the material to another conveyor.

Assemblies 134 and 136b or 138b and conveyor 60 are moved along assembly 110 into a position that aligns the imaginary center axis of middle track 88b with the desired reclaim and conveyor discharging locations. Assembly 134 with its conveyor 60 is moved along assembly 136b or 138b into a position that aligns conveyor 60 with the desired incoming and discharging locations. Conveyors 60 of systems 246, 248, and 250 are each moved along their respective assembly 134 to position ends 72 and 74 to desired locations. As dictated by bin 30b that is to discharge material, conveyors 60 of systems 246, 248, and 250 are each moved along their respective assembly 134 to position end 72 under discharge hopper opening that is designated to dispense material. As required to further transfer material, conveyor 60 of system 246 is moved accordingly so its end 74 can transfer material to end 72 of conveyor 60 of system 248. Conveyor 60 of system 248 is moved accordingly so its end 72 can receive material, when required, from end 74 of conveyor 60 of system 246. End 74 of conveyor 60 of system 248 is moved accordingly so it can transfer material to end 72 of conveyor 60 of system 250. Conveyor 60 of system 250 is moved accordingly so its end 72 can receive material from end 74 of conveyor 60 of system 248. End 74 of conveyor 60 of system 250 is moved accordingly so it can transfer material to the desired location. Systems 246, 248, and 250 can work independently or in conjunction with each other, depending on the conveying needs.

Figure 18:
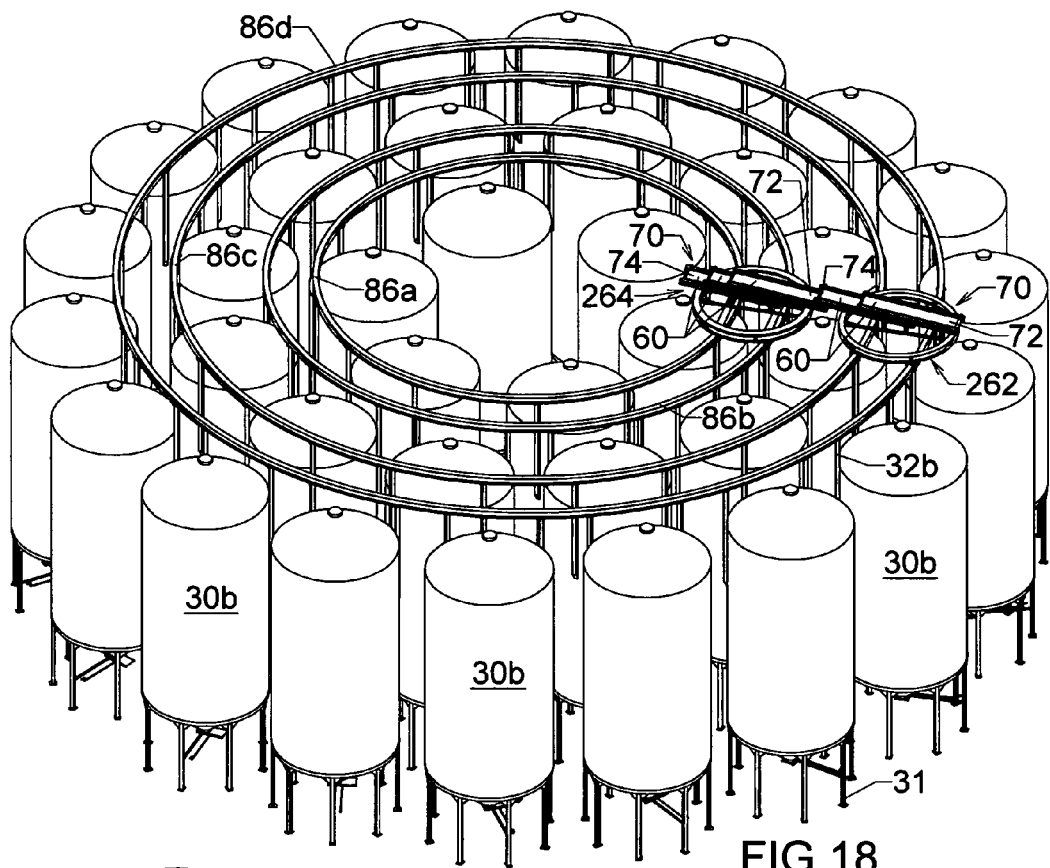
FIG. 18 is an isometric view showing a plurality of round bins with two triple layer track-and-trolley guidance systems, for distributing material, each system comprising a lower layer arcuate track supporting a middle layer arcuate track, which in turn supports an inclinable upper layer linear track with stackable conveyors.

FIG. 18: Triple Guide Assembly Conveyor Guidance System for Distribution

FIG. 18 illustrates two conveyor guidance systems 262 and 264 comprised of three guide assemblies mounted on one another. These two apparatuses serve a plurality of bins by moving a conveyor group 70 comprising conveyors 60 that can incline and are stacked, one conveyor atop another, in arcuate and linear paths above bins 30b, to distribute material into bins 30b. System 262 is similar to system 244 and system 264 is similar to system 242 except that conveyor 60 is replaced with conveyor group 70. In this example, conveyors 60 of both systems 262 and 264 are inclinable and can vary the elevation of incoming and discharging ends 72 and 74.

There are many other possible combinations of guide assemblies, how they are mounted on one another, how they are mounted to a supporting means, and how they are mounted to one or more conveyors. For example, there could be a plurality of middle assemblies and their corresponding upper assemblies, conveyor(s) 60, or conveyor groups sharing a lower assembly.

Operation: FIG. 18

Systems 262 and 264 operate similarly to system 242 except conveyors 60 are inclinable and are in groups 70, which have similar operating procedures to those in system 210.

Figure 19:
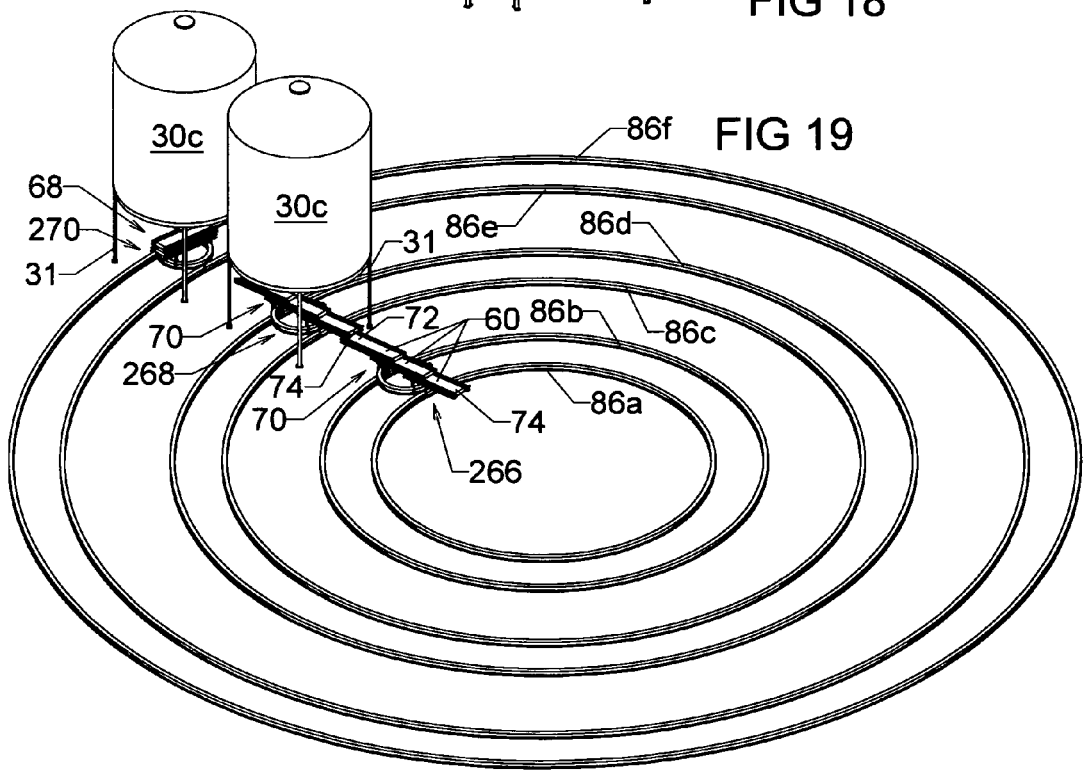
FIG. 19 is an isometric view similar to FIG. 18 except that all but two bins have been removed to better show the alternative embodiment.

FIG. 19: Triple Guide Assembly Conveyor Guidance System for Reclaim

FIG. 19 shows three conveyor guidance systems 266, 268, and 270, each with triple layer guide assemblies, with hoppers 33 of bins 30c at the same height. FIG. 19 is an isometric view of three systems 266, 268, and 270 under an array of bins 30c similar to FIG. 18, except that all but two bins 30c have been removed to better show the alternative embodiment. Assembly 270 shows a conveyor group 68, which is identical to conveyor group 70, except its conveyors 60 is in a retracted position. Systems 266, 268, and 270 are similar to system 248 except that conveyor 60 and assembly 134 are replaced with assembly 128 and conveyor group 68 or 70. These two apparatuses serve a plurality of bins by moving groups 68 and/or 70 comprising conveyors 60 that can incline and are stacked, one conveyor atop another, in arcuate and linear paths below bins 30c, to reclaim material from bins 30b.

System 266 and system 268 shown in FIG. 19 have conveyor groups 70 that are extended and ready for operation. System 270 shown in FIGS. 19 has a conveyor group 68 in a retracted position and ready to be moved to another silo 30c. Conveyor groups 68 and 70 can move to a retracted position, rotate, move into a new location, and adjust lengthwise to extended their lengths, thus allowing a discharging end 74 (where material is released from a conveyor) and an incoming end 72 (where material is received onto a conveyor) to be moved to new positions. Retracting conveyors 60 of conveyor groups 68 and 70 allows conveyor groups 68 and 70 to pass lengthwise between silo support legs 31, and the retracted and extended configuration of conveyor groups 68 and 70 provide greater versatility for positioning ends 72 and 74 of the conveyor. Bin 30c is similar to bin 30b except bin 30c has four support legs 31 instead of eight support legs.

Operation: FIG. 19

Systems 268 and 270 operate similarly to system 246 except conveyors 60 are inclinable and are in groups 68 or 70, which have similar operating procedures to those in system 214 and 216.

FIGS. 20A to 20D: Fixed Elevation Triple Track-And-Trolley Distribution And Reclaim FIGS. 20A to 20D illustrate two triple layer conveyor guidance systems 282 and 284 that can each move their conveyor 60 in linear and circular paths for distributing or reclaiming materials. Systems 282 and 284 each have a single conveyor 60 that has a fixed elevation of horizontal or at an angle. Systems 282 and 284 comprise a lower linear guide assembly 114 that supports and guides a middle layer or second guide assembly 140 or 142. Assembly 140 or 142 supports and guides an assembly 134, which supports and guides a conveyor 60. Track 80 is stationary and anchored to a supporting means, such as column cap and/or a column, roof (not shown) of bin, or foundation (not shown). These two systems 282 and 284 each move their conveyor 60 linearly and radial to position end 74 to a designated location for filling any selected bin, or to position end 72 to a designated location for receiving materials.

In this example, system 282 must be at a higher elevation than system 284 for conveyor 60 of system 282 to discharge into conveyor 60 of system 284. Or, conveyor 60 of system 282 can be at a fixed incline (not shown) sufficient for discharging into conveyor 60 of system 284. Conveyor 60 can instead be a system of stackable conveyors, such as conveyor groups, that can retract and extend ends 72 and 74 to adjust the reach of conveyance.

FIG. 20B is an enlarged isometric cut-out view of the area indicated by line 20B of FIG. 20A showing more clearly system 284 and its components. System 284 is similar to systems 244 and 248 except that it replaces assembly 110 with assembly 114. FIG. 21B shows lower, middle, and upper layer guide assemblies 114, 140, and 134 mounted onto one another. Assembly 140 comprises a track 88a mounted on and guided by a second trolley 91. These components and assemblies work in conjunction with each other to position conveyor 60 of system 284 to any desired bin for filling into or reclaiming from bin or another conveyor.

FIG. 20C is an enlarged isometric cut-out view of the area indicated by line 20C of FIG. 20A showing more clearly system 282 and its components. System 282 is similar to systems 242 and 250 except that it replaces assembly 110 with assembly 114. FIG. 20C shows lower, middle, and upper layer guide assemblies 114, 142, and 134 mounted onto one another. Assembly 142 comprises a track 88a mounted on and guided by a second trolley 92. These components and assemblies work in conjunction with each other to position conveyor 60 of system 282 to any desired bin for filling into or reclaiming from bin or another conveyor. FIG. 20D is a front view taken in the direction of the area indicated by line 20D-20D of FIG. 20A that provides a front elevation perspective of systems 282 and 284.

Operation: FIG. 20A to 20D

Systems 282 and 284 operate similarly to systems 208 and 212 except assembly 114 moves linearly instead of radial and conveyor 60 is not inclinable.

FIGS. 21A to 21C: Three Layers of Guide Assemblies with Tubular Tracks

FIGS. 21A, 21B, and 21C introduces a conveyor guidance system 286 with three layers of guide assemblies that is similar to systems 244 and 248 with respect to its capabilities and operation. This apparatus serves a plurality of bins by moving a conveyor 60 that is either above or below a group of bins in a linear and rotational manner. System 286 is comprised of a lower guide assembly 154, a middle guide assembly 156, and an upper guide assembly 152 with conveyor 60. Assemblies 154 and 156 use tubular tracks 87a, 87b, and 89 and two-wheel trolleys 102 and 104. Assembly 154 uses two-wheel trolleys 102 that do not have their wheels configured to hold down the track. However, track 87a and 87b are much larger in diameter than the length of upper assembly 152. Unless a heavy load (on a section of conveyor 60 located beyond the perimeter of track 87b) that has enough downward force on the discharge end 74 to lift track 87b off of trolleys 102 is a possibility, then the two-wheel trolley depicted by trolley 102 is adequate. Assembly 156 is similar to assembly 150 except there are four trolleys 104 illustrated in assembly 156 instead of three trolleys 93a (as in assembly 150). Although three trolleys can be used for a middle layer guide assembly that rests on two tracks of a lower layer guide assembly, four trolleys better balances the load and centers the middle layer guide assembly on the lower layer guide assembly.

FIGS. 21A, 21B, and 21C demonstrates that a triple layer conveyor guidance system 286 can have a lower layer assembly 154 comprised of an arcuate tubular track 87a and 87b resting on two-wheel trolleys 102. Lower assembly 154 comprises tracks 87a and 87b mounted on two-wheel trolleys 102. Middle assembly 156 comprises tracks 89 mounted on two-wheel trolleys 104. Upper assembly 152 comprises one-wheel trolleys 103 mounted on tracks 83. Assembly 152 is mounted onto support bars 44a.

Assemblies 136a and 134 of systems 244 and 248 independently move along their tracks 86, unlike the assemblies in systems 244 and 248. This allows for multiple systems each comprised of middle and upper assemblies 136a and 134 on one set of tracks 86 that can independently move and operate anywhere along tracks 86. Since tracks 87a and 87b of systems 286 move with middle and upper assemblies 156 and 152, multiple middle and upper assemblies 156 would not be able to independently move on track 87a and 87b. As lower track 87a and 87b turns, everything affixed to those tracks 87a and 87b moves with them.

FIGS. 22A to 22C: Triple Layer Track-And-Trolley with Triple Wheel Trolley

FIGS. 21A, 21B, and 21C introduce a triple layer conveyor guidance system 288. System 288 is comprised of lower guide assembly 158, middle guide assembly 160, and upper guide assembly 162 with conveyor 60. Assemblies 158, 160, and 162 use tubular tracks 87a, 89, and 81 and three-wheel trolleys 105, 106, and 107 that are similar to trolley 108. Trolleys 105, 106, and 107 comprise a support bar 62, load bar 59, three wheels 40a, 40b, and 40c, and wheel rods 42a, 42b, and 42c. These three wheels 40a, 40b, and 40c are tangent to and spaced 120° apart around their respective tubular tracks 81, 87b, and 89 to maintain guidance and load support.

ADVANTAGES

From the description above, a number of advantages of the track-and-trolley conveyor guidance systems become evident:
1. A significant reduction in the amount of linear meters of conveyors needed to distribute materials into and/or reclaim materials from a plurality of bins is realized.
2. The conveyor can withstand multiple forces while maintaining guidance and position from the guide assemblies.
3. The track-and-trolley conveyor guidance system can distribute materials into or reclaim materials from an individual bin, a single row of bins, or multiple rows of bins.
4. A conveyor group with the ability to retract to a length shorter than the distance between the bin support legs so it can pass between bin support legs.
5. The conveyor guidance system can be utilized on multiple bins arranged in arcuate or linear rows or arrays.
6. The track-and-trolley conveyor guidance distribution or reclaim systems can be automated.
7. A central shaft, central support, or control mechanism is not required to support or control the position of conveying system.
8. A central shaft or control mechanism is not required to support or control the movement of the guide assemblies.
9. The conveyor of the conveyor guidance systems can have an infinite number of incoming end and discharge end locations.
10. A reduction in the amount of energy costs required for distributing into or reclaiming from a plurality of bins is realized.
11. A reduction in the amount of maintenance required for the conveyance used to distribute into or reclaim from a plurality of bins is realized.
12. The reduction in conveyance for distributing into or reclaiming from a plurality of bins results in a reduction of cross-contamination points.
13. Material can be conveyed to or away from openings of bins with maximum efficiency.
14. Product quality is preserved.

Accordingly, the reader will see that the track-and-trolley conveyor guidance can be used to move material into or away from a plurality of bins with maximum efficiency since it provides a means for infinite discharge and reclaim locations using a minimal amount of conveyance. The need for intermediate discharge gates, which significantly increase risks of cross-contamination, is eliminated. Furthermore, the track-and-trolley conveyor guidance systems have additional advantages in that they are more economical to build, install, operate, and maintain than conventional conveying systems with or without a center support or trolley guidance.

RAMIFICATIONS AND SCOPE

Although the description above contains many specificities, these should not be construed as limiting the scope of the invention, but as merely providing illustrations of some of the presently preferred embodiments of this invention. Other embodiments are possible. For example, while means of powering movement along the tracks are not shown, one motor for linear movement and another for rotational movement is one possible means. However, use of power chains and drive motor(s), a hydraulic system, manual rotation and shuttling, or a single motor to move the trolleys both linearly and rotationally can be alternatively employed. The system can also be automated (not shown), for example, with electrical location sensors, and/or bin level indicators that indicate when a bin is empty.

In the examples, tracks are standard monorail tubular steel, C-beam, and I-beam tracks, but any suitable standard track configuration can alternatively be used. For example, flat bar, angle beam, double-channel, enclosed tubular, bolted angles, pipe, and formed tubular steel, and T-track are suitable. The type of standard tracking to be used should be based in part on the weight loads and forces and the distance that items will be conveyed.

A dual-wheel trolley or tri-wheel trolley assembly is usually sufficient to withstand multiple forces exerted upon conveyors. Other trolley assemblies or methods can be engineered to withstand the weight of the equipment and the product being conveyed, while preventing conveyors from tipping off of the track-and-trolley assembly. Although a single, dual, triple, and six-wheel trolley assemblies are shown, other known suitable means for allowing movement along the tracks can be used, such as other wheel configurations, bearings, etc. Different wheel and track configurations using at least two wheels each with a wheel rod whose axis are in substantially different planes can provide alternative benefits. The ability of conveyors and conveyor group to withstand a plurality of forces is important as it allows for inclinable conveyors, stackable conveyors, and/or cantilevered conveyors on the track-and-trolley system. Withstanding such forces is generally required in order for one conveyor to discharge onto a next conveyor. It further provides a conveyance system that has utility as an efficient system to move material away from a discharge opening (usually, the bottom of a hopper where a discharge opening is located to remove contents) of a storage bin residing within a plurality of bins.

By reducing freedom of movement of trolleys to the desired linear or radial direction using a trolley with multiple wheels that are tangent to substantially different planes upon a track, the conveyor can withstand uneven, lateral, or radial forces while continuing to be guided without a central support and/or guidance mechanism. The ability of conveyor and conveyor groups and their guidance systems to endure downward, upward, lateral, or radial forces is very important as this ability allows the conveyor to travel faster, to be loaded unevenly, and to be cantilevered to prevent the conveyor from derailing. Enduring such forces also retains conveyor and conveyor groups on their tracks. This ability also ensures guided travel while imparting uneven radial loads, and/or allows for an adjustable incline or decline. A significant reduction in the linear feet of conveying equipment is also achieved, which improves energy efficiency and lowers maintenance costs.

Conveyors and conveyor groups can be positioned horizontally, inclined, or stacked, depending upon the application. Other known types of conveyors, such as drag or chain types or screw augers can replace the belt conveyor. Conveyors and conveyor groups can be of the standard screw, belt, or drag-chain, rollers, or other mechanical types. Consequently, belt-type conveyors are usually preferable due to their low height and their tendency to discharge all materials laying on the belt, especially if reducing cross-contamination is a priority. Conveyors and conveyor groups can be reversible, or bi-directional, so they can have two discharge ends. Normally only one discharge end is used at a time, but a conveyor could feed in both directions to fill two bins simultaneously. Conveyors and conveyor groups can receive product at virtually any point along their length, and they are usually fed from a fixed point close to incoming end.

The track-and-trolley conveyor guidance systems can be used to reclaim from or distribute to a plurality of individual or shared wall bins that have polygonal shapes, such as square, rectangular, hexagonal, or octagonal. The arc of the arcuate track can be less than 360°. More than one conveyor and linear track assembly can be used simultaneously on one arcuate track system, and/or more than one arcuate/linear track/conveyor assembly can co-exist to reclaim material from or distribute material to multiple bins simultaneously. The conveyors and conveyor groups can have telescoping spouts at their discharge ends; they can be non-reversing, having only one discharge end and one tail end; they can incline or decline from horizontal; the system can be automated; and/or the conveyors can be enclosed, with or without telescoping spouts at discharge and/or inlet points; and so on. The conveyor guidance systems can be used for stationary bins, or for packaging systems to fill bottles and other sealable containers or packages. The conveyor guidance systems can be used to move boxes or parts to a workstation. The present invention can be implemented in numerous ways, including as an apparatus, a system, a device, or a method.

Thus, the present invention includes all such modifications as may come within the scope and spirit of the following claims and equivalents thereof, rather than by the examples given.

I claim:

1. A guide apparatus serving a plurality of bins, comprising:
    a guidance system in proximity to said plurality of bins, said proximity being a location above or below said plurality of bins,
    said guidance system comprising a conveying means, said conveying means having at least one incoming end and at least one discharge end,
    said guidance system further comprising at least one lower guide means, and
    said lower guide means comprising at least one arcuate first track and at least three first trolley means, each said first trolley means comprising at least two wheels, at least two wheel rods, and at least one load bar, each said wheel connecting to one of said rods and one of said load bars supporting said rod, at least one of said wheels having an outer radial periphery tangent to said arcuate first track, each of said wheels and wheel rods being at least 30 degrees apart within said first trolley means, said arcuate first track and said first trolley means mounted together and being arranged such that said conveying means moves thereon,
    whereby by adjusting said arcuate first track and said first trolley means of said lower guide means, said incoming end and said discharging end of said conveying means can be positioned proximate to said plurality of bins, whereby serving at least one of said plurality of bins with a said conveyor guidance system for distributing material to said bins or reclaiming material from said bins.

2. The guide apparatus of claim 1, further including a upper guide means, said upper guide means comprising at least two linear upper tracks and about four upper trolley means, said upper trolley means comprising at least one wheel, one wheel rod, and at least one load bar, said wheel being connected to said rod, said load bar supporting said rod, said wheel of said upper trolley having an outer radial periphery tangent to one of said linear upper tracks, said two linear upper tracks and said upper trolley means mounted together and being arranged such that said upper guide means moves thereon, and said upper guide means and first said lower guide means mounted together and being arranged such that said upper guide means moves thereon, said conveying means being mounted on said upper guide means and being arranged such that said conveying means moves thereon, whereby by adjusting said lower guide means and said upper guide means, said conveying means can be positioned to a location above or below said bins, whereby serving said plurality of bins with a said track-and-trolley conveyor guidance system for distributing material to said bins or reclaiming material from said bins.

3. The guide apparatus of claim 1, further including a middle guide means and an upper guide means, said middle guide means comprising at least one arcuate middle track and at least three second trolley means, said second trolley means comprising at least two wheels, two wheel rods, and at least one load bar, each of said wheels being connected to one of said rods and said load bar supporting said rods, at least one of said wheels having an outer radial periphery tangent to said arcuate middle track, each said wheel within said second trolley being at least 30 degrees apart, said middle track and said second trolley means mounted together and being arranged such that said middle guide means moves thereon, said upper guide means comprising at least two linear upper tracks and at least four upper trolley means, said upper trolley means comprising at least one wheel, one wheel rod, and at least one load bar, said wheel being connected to said rod, said load bar supporting said rod, said wheel of said upper trolley having an outer radial periphery tangent to one of said linear upper tracks, said two linear upper tracks and said upper trolley means mounted together and being arranged such that said upper guide means moves thereon, and said middle guide means being mounted on said lower guide means and being arranged such that said middle guide means moves thereon, said upper guide means being mounted on said middle guide means and being arranged such that said upper guide means moves thereon, said conveying means being mounted on said upper guide means and being arranged such that said conveying means moves thereon, whereby by moving said lower guide means, and/or said middle guide means, and/or said upper guide means, said conveying means can be positioned to a location above or below said bins, whereby serving said plurality of bins with a said track-and-trolley conveyor guidance system for distributing material to said bins or reclaiming material from said bins.

4. A guide apparatus serving a plurality of bins, comprising:

a guidance system in proximity to said plurality of bins, said proximity being a location above or below said plurality of bins, said guidance system comprising a conveying means, said conveying means having at least one incoming end and at least one discharge end, said guidance system further comprising at least one lower guide means, and said lower guide means comprising at least two linear first tracks and at least four first trolley means, each said first trolley means comprising at least two wheels, at least two wheel rods, and at least one load bar, each said wheel connecting to one of said rods and one of said load bars supporting said rod, at least one of said wheels having an outer radial periphery tangent to said linear first tracks, each of said wheels and wheel rods being at least 30 degrees apart within said first trolley means, said linear first tracks and said first trolley means mounted together and being arranged such that said conveying means moves thereon, whereby by adjusting said linear first tracks and said first trolley means of said lower guide means, said incoming end and said discharging end of said conveying means can be positioned proximate to said plurality of bins, whereby serving at least one of said plurality of bins with a said track-and-trolley conveyor guidance system for distributing material to said bins or reclaiming material from said bins.

5. The guide apparatus of claim 4, further including a upper guide means, said upper guide means comprising at least two linear upper tracks and at least four upper trolley means, said upper trolley means comprising at least one wheel, one wheel rod, and at least one load bar, said wheel being connected to said rod, said load bar supporting said rod, said wheel of said upper trolley having an outer radial periphery tangent to one of said linear upper tracks, said two linear upper tracks and said upper trolley means mounted together and being arranged such that said upper guide means moves thereon, and said upper guide means and first said lower guide means mounted together and being arranged such that said upper guide means moves thereon, said conveying means being mounted on said upper guide means and being arranged such that said conveying means moves thereon, whereby by adjusting said lower guide means and said upper guide means, said conveying means can be positioned to a location above or below said bins, whereby serving said plurality of bins with a said track-and-trolley conveyor guidance system for distributing material to said bins or reclaiming material from said bins.

6. The guide apparatus of claim 4, further including a middle guide means and an upper guide means, said middle guide means comprising at least one arcuate middle track and at least three second trolley means, said second trolley means comprising at least two wheels, two wheel rods, and at least one load bar, each of said wheels being connected to one of said rods and said load bar supporting said rods, at least one of said wheels having an outer radial periphery tangent to said arcuate middle track, each said wheel within said second trolley being at least 30 degrees apart, said middle track and said second trolley means mounted together and being arranged such that said middle guide means moves thereon, said upper guide means comprising at least two linear upper tracks and at least four upper trolley means, said upper trolley means comprising at least one wheel, one wheel rod, and at least one load bar, said wheel being connected to said rod, said load bar supporting said rod, said wheel of said upper trolley having an outer radial periphery tangent to one of said linear upper tracks, said two linear upper tracks and said upper trolley means mounted together and being arranged such that said upper guide means moves thereon, and said middle guide means being mounted on said lower guide means and being arranged such that said middle guide means moves thereon, said upper guide means being mounted on said middle guide means and being arranged such that said upper guide means moves thereon, said conveying means being mounted on said upper guide means and being arranged such that said conveying means moves thereon, whereby by moving said lower guide means, and/or said middle guide means, and/or said upper guide means, said conveying means can be positioned to a location above or below said bins, whereby serving said plurality of bins with a said track-and-trolley conveyor guidance system for distributing material to said bins or reclaiming material from said bins.

* * * * *